INVENTORS
CARL W. EHRMAN
ROYAL T. McARDELL
BY Thomas J. Nikolai
AGENT

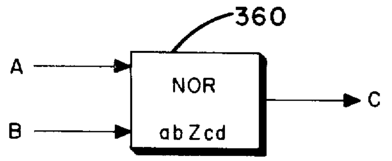
Fig. 6
| C | A | B |
|---|---|---|
| 0 | 1 | 0 |
| 0 | 0 | 1 |
| 0 | 1 | 1 |
| 1 | 0 | 0 |
Fig. 7
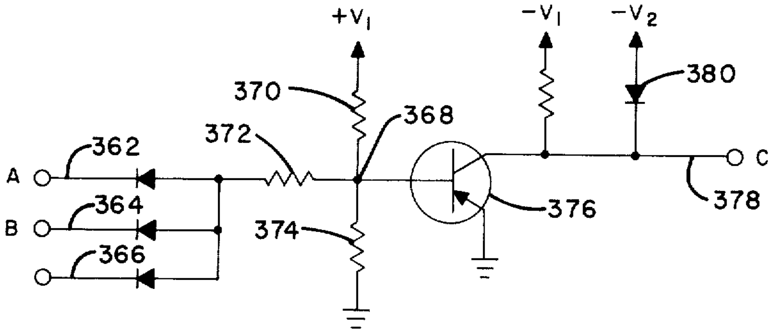
Fig. 8
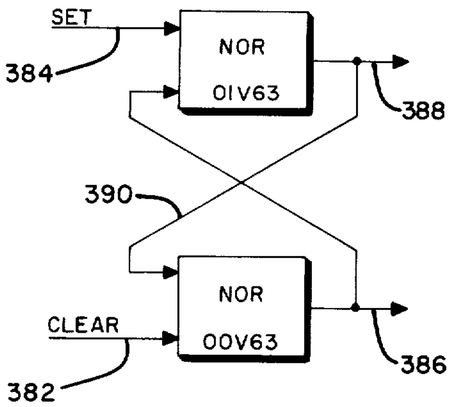
Fig. 9
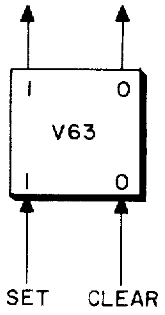
Fig. 10

DIGITAL COMMUNICATION SYSTEM

Filed Oct. 6, 1961

March 29, 1966 C. W. EHRMAN ETAL 3,243,781

DIGITAL COMMUNICATION SYSTEM

Filed Oct. 6, 1961 46 Sheets-Sheet 27

DIGITAL COMMUNICATION SYSTEM

Filed Oct. 6, 1961 46 Sheets-Sheet 37

March 29, 1966 C. W. EHRMAN ETAL 3,243,781

DIGITAL COMMUNICATION SYSTEM

Filed Oct. 6, 1961 46 Sheets-Sheet 46

3,243,781

DIGITAL COMMUNICATION SYSTEM

Carl W. Ehrman, Spring Lake, and Royal T. McArdell, Woodbury Township, Washington County, Minn., assignors to Sperry Rand Corporation, New York, N.Y., a corporation of Delaware Filed Oct. 6, 1961, Ser. No. 143,425

13 Claims. (Cl. 340—172.5)

The present invention relates generally to digital data processing equipment, and more specifically to an improved arrangement for transferring information between a digital computer and its associated peripheral equipment.

In real time communication systems employing digital data processing equipment, a central computer is utilized to perform operations on the digital data which may be supplied to the computer from a plurality of remote stations. At each of the remote stations equipment is located, capable of feeding the digital data into the computer and of receiving the data from the computer after it has performed its operations on the data. Included among the plurality of external devices with which the central computer may communicate, are those operating at comparatively slow speeds, as well as those operating at relatively high speeds. Included in the slow-speed class are devices which require mechanical operations, such as paper tape punches and readers, typewriters, magnetic tape units, magnetic drum units, etc.

Since present day computers are able to perform operations in a few millionths of a second while the peripheral equipment generally functions at a much slower rate (i.e. several thousandths of a second) it would be inefficient to tie up the computer's computation process merely to allow it to communicate with the external equipment.

It is accordingly an object of the present invention to provide a system whereby communication between a high speed computer and remotely located external devices of relatively low speed can be interleaved with the normal high speed computational and data proceeding operations of a digital computer.

In general, each of the external devices is able to maintain two basic types of communication with a central computer; input communication, in which information is fed into the computer, and output communication, in which data is transmitted from the computer to the external devices.

By definition, the two basic types of communication, input and output, are considered as being in reference to the central computer. The term "input" meaning that information is being fed into the computer; "output" meaning that data is being transmitted from the computer to the remote stations. Since all of the external devices are adapted to communicate with the single central computer, it is the job of the central computer to tell the external devices which of the two basic types of communication is to be accepted.

Consequently, another object of this invention is to provide a system wherein a central computer establishes the basic type of communication, input or output, between it and an external device.

The comparatively low speed operation of the external devices mentioned above makes it more efficient to interleave the communication with them. For example, assume that the central computer enters into communication with an external device and the device is capable of sending input information to the computer at the rate of one word of data every 100 milliseconds. After having transmitted one word of data and getting ready to transmit the next, the computer can establish communication with external devices at other locations. In this way, there is a time-sharing or interleaving between the computer and the slower speed external devices.

Hence, another object of the present invention is to provide a system wherein the communication with a central computer is time-shared among a plurality of external devices.

Next consider a real time communication system. This is a system in which the processing of data takes place substantially in synchronism with a physical process in such a fashion that the results of the data processing become immediately useful to the physical operation. Because some information coming from various remote locations may be considered more important that that coming from other remote stations, the system should provide some means for establishing priority between the various connected remote systems.

It is a further object of the present invention to provide a real time communication system wherein the communication between a central computer and a plurality of remotely located external devices is, in part, controlled by a priority system.

Relative to the above priority system, it is the possibility that one of the external devices may wish to take precedence over all of the others. It may want to direct the computer to establish communication with it rather than to wait for the central computer to determine when to establish the communication. In this case, means must be provided whereby the external device may interrupt the normal computer operation and claim priority over all of the other external devices, thereby causing the computer to establish communication with the interrupting external device.

Still another object of this invention is to provide a real time communication system wherein the external devices may interrupt the normal computer operations to establish communication with the central computer.

Once the computer has established communication with an external device, there is no longer a need for the computer to maintain rigid control on this communication. The computer should be free to perform its high speed operation on data that had previously been received and stored in the computer memory. The computer need only be required to note when the external device has finished transmitting or receiving its data from the computer. Once the information has been completely received or completely transmitted, the communication should be able to be automatically terminated.

Thus still another object of this invention is to provide a communication system wherein the communication between the central computer and the peripheral device is self-running and self-terminating.

In the prior art there are described communication system in which data may be transferred between the computer memory and a plurality of remote devices. However, in these prior art arrangements the computer memories generally only communicate with as many discrete external devices as the number of input and output channels provided with the computer. Another limitation is that the program in question has to contain a special reference to this channel in order to establish communication. The present invention removes these restrictions. Here the computer memory can communicate with as many devices as storage allows, using only a single input and output channel. The computer employed in the preferred embodiment of the present invention has a plurality of input and output channels to be used for communications between the computer memory and mass storage units, tape handlers, card readers, punches and other standard peripheral equipment of the computer site. Also, any number of these input and output channels may be used for multiplexing data to and from discrete remote data handling devices.

Accordingly, one of the primary objects of the present invention is to provide a means whereby data handling devices may assume communications with the memory section of a digital computer along one of the plurality of input-output channels.

In the communication system of the present invention, the digital computer employed is designed to operate in any one of three possible data transfer modes. In the first mode—termed the INTERNALLY SPECIFIED INDEX MODE—there is associated with each of input and output channels, words in the memory section of the computer termed index words or buffer control words. These words are used in the INTERNALLY SPECIFIED INDEX mode to designate where the data is to be placed in storage in the case of an input transfer; or where the output data is to be taken from, in the case of an output data transfer.

For example, the index word for output channel number 6 may be kept at the storage location 00126 (octal) in the memory. Two addresses are stored at this location. The lower half of the index word contains the address of the next word of data to be sent out on channel six. The upper half of this index word contains the address of the final word of data which the computer desires to send out on channel six. Whenever the peripheral device on this channel requests a word of data from the computer, the input-output logic of the computer automatically references the index word at location 00126 to find where to get the next word of data for the peripheral device. The remaining output channels may be made to operate similarly, each using its own unique index word.

When the index word is referenced to obtain the address of or for the data, the address stored in the lower part of the index word is incremented by one, as the index word is restored to core memory. The next time a data transfer is requested by the peripheral equipment located on the same channel, the address in the lower half of the index word will be incremented again and replaced in the same storage location. This process of incrementing causes successive data words arriving at a given input channel to be placed in sequential memory locations.

The second mode of communication the computer may assume is the EXTERNALLY SPECIFIED INDEX mode. In this mode of operation, the computer does not use a single unique index word for each channel. The address of the index word for a particular input or output transfer of data is supplied by the peripheral device itself. In this manner, a large number of input and output data transfers may be active at any one time; the channel number being unimportant. The purpose of this mode is to enable the computer to communicate with a large number of peripheral devices connected to a single input and output channel of the computer. In this mode, when a peripheral device desires to transmit a word of data to the computer, it presents it to the computer along with a control signal termed a "request." The lower half of this word contains the address of the index word which is to be used. The upper half of the word contains the information to be placed in the computer memory. The input-output logic of the computer uses the address provided by the peripheral device to locate the index word associated with the data transfer. The input-output logic extracts the index or data control word, increments the lower half, and replaces it in memory. Next, the input-output logic puts the data which is present on the input channel lines in the upper half of the word at the address provided by the index word. The lower half of the word at this address remains undisturbed. It may be noted that the transfer of data is almost identical to that in the INTERNALLY SPECIFIED INDEX MODE—the exception in this case being the peripheral device itself supplies the index word address. It may be seen, then, that each peripheral device may use one or more different index word addresses and have an active data transfer associated with each index word address. In this mode of operation, the number of data transfers which can be active at any one time is not restricted to the number of input and/or output channels, but only by the size of the memory used in the computer.

The final one of the three possible modes of communication that the computer may assume is termed the EXTERNALLY SPECIFIED ADDRESS mode. This operation differs from the foregoing two data transfer modes in that index or buffer control words are not used. When data is transferred from a certain peripheral device to the computer, the peripheral device itself gives the computer information signals and also the address for this information. The computer merely places the information at the specified address in the computer memory. When it is desired to transmit information from the computer memory to a specified peripheral device, the peripheral device again gives the computer an address and the computer sends the data at the given address to the peripheral device. In this data transfer mode, a portion of the computer memory is assigned more or less permanently to each peripheral device employed in the system.

In the present specification, primary consideration will be given to the latter two modes of the three possible data transfer modes.

Still another object of the present invention is to provide means whereby the peripheral equipment employed in the communication system is capable of supplying address signals and data signals to the computer, the address signals being such that a memory reference is made to a specified storage loaction in which is contained an index word which, in turn, specifies where the data signals are to be stored or taken from the memory.

Closely related to the foregoing object is another to provide a mode of communication in which the remotely located peripheral equipment itself supplies the address of a storage location in the memory section of the computer where data signals coming from or going to the computer are to be found.

Other objects of the invention will be pointed out in the following description and claims and illustrated in the accompanying drawings, which disclose, by way of example, the principles of the invention and the best mode, which has been contemplated, of applying these principles.

Figure 5:
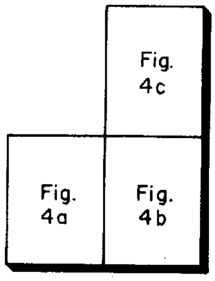
Figure 13:
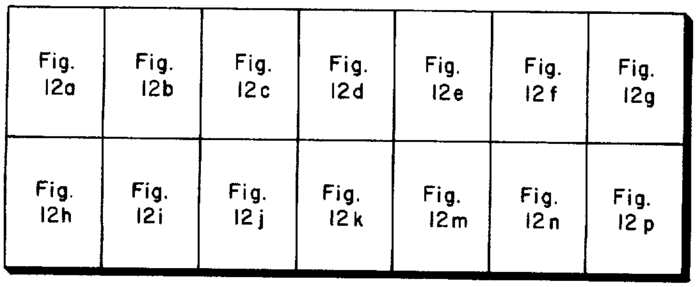
Figure 2:
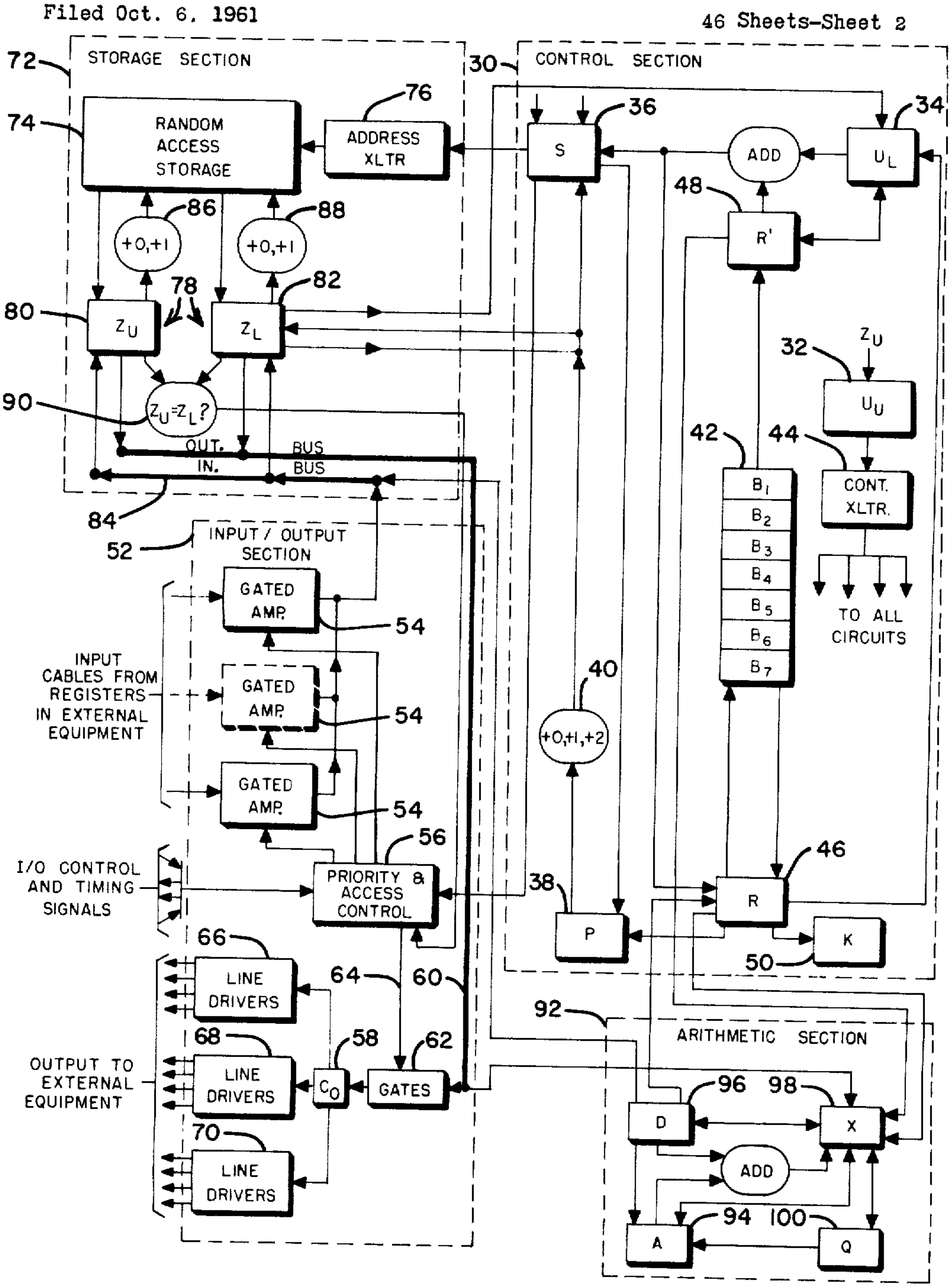
FIG. 2 is a block diagram illustrating the main sections of the computer of the present invention.
Figure 4A:
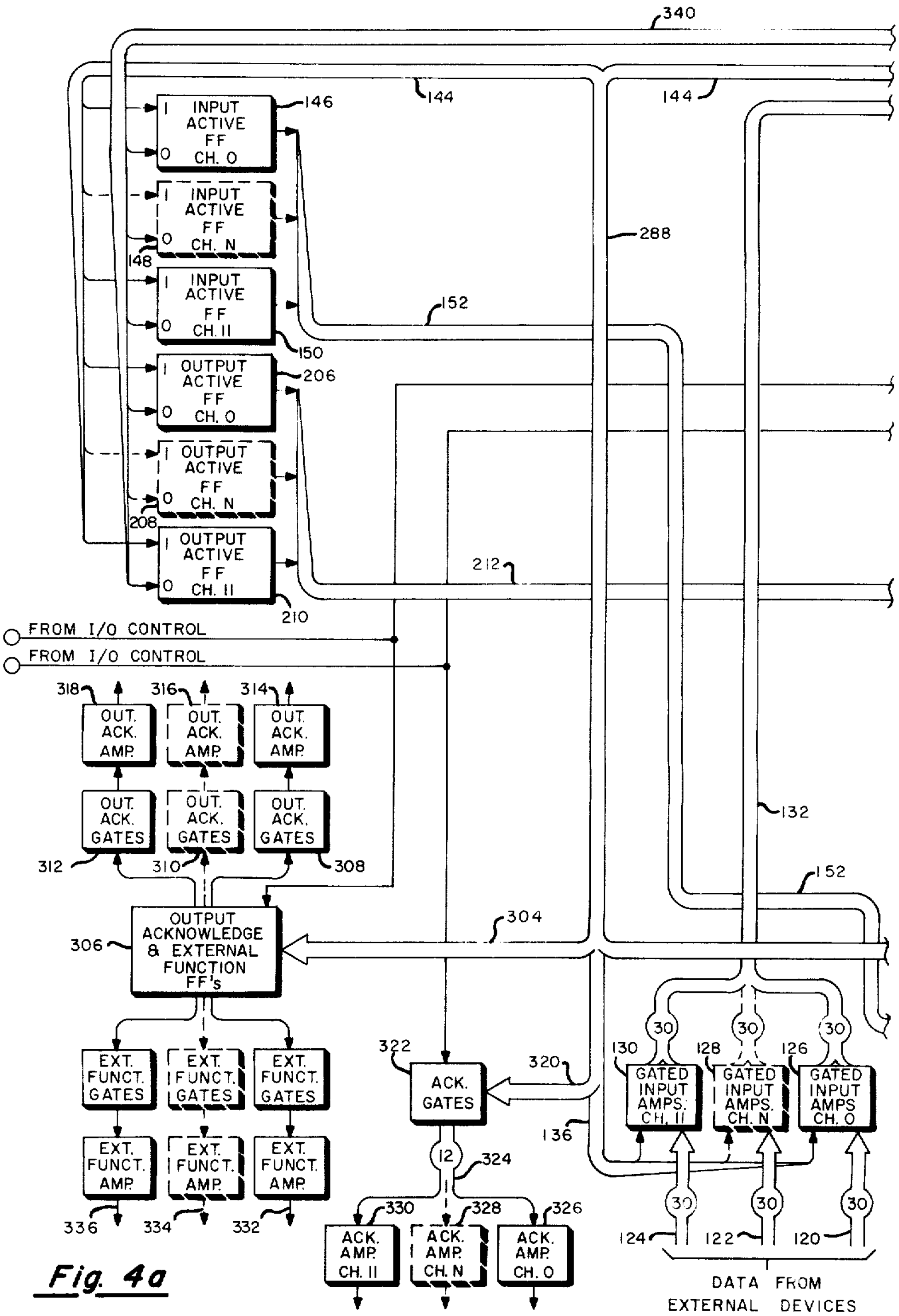
Figure 4B:
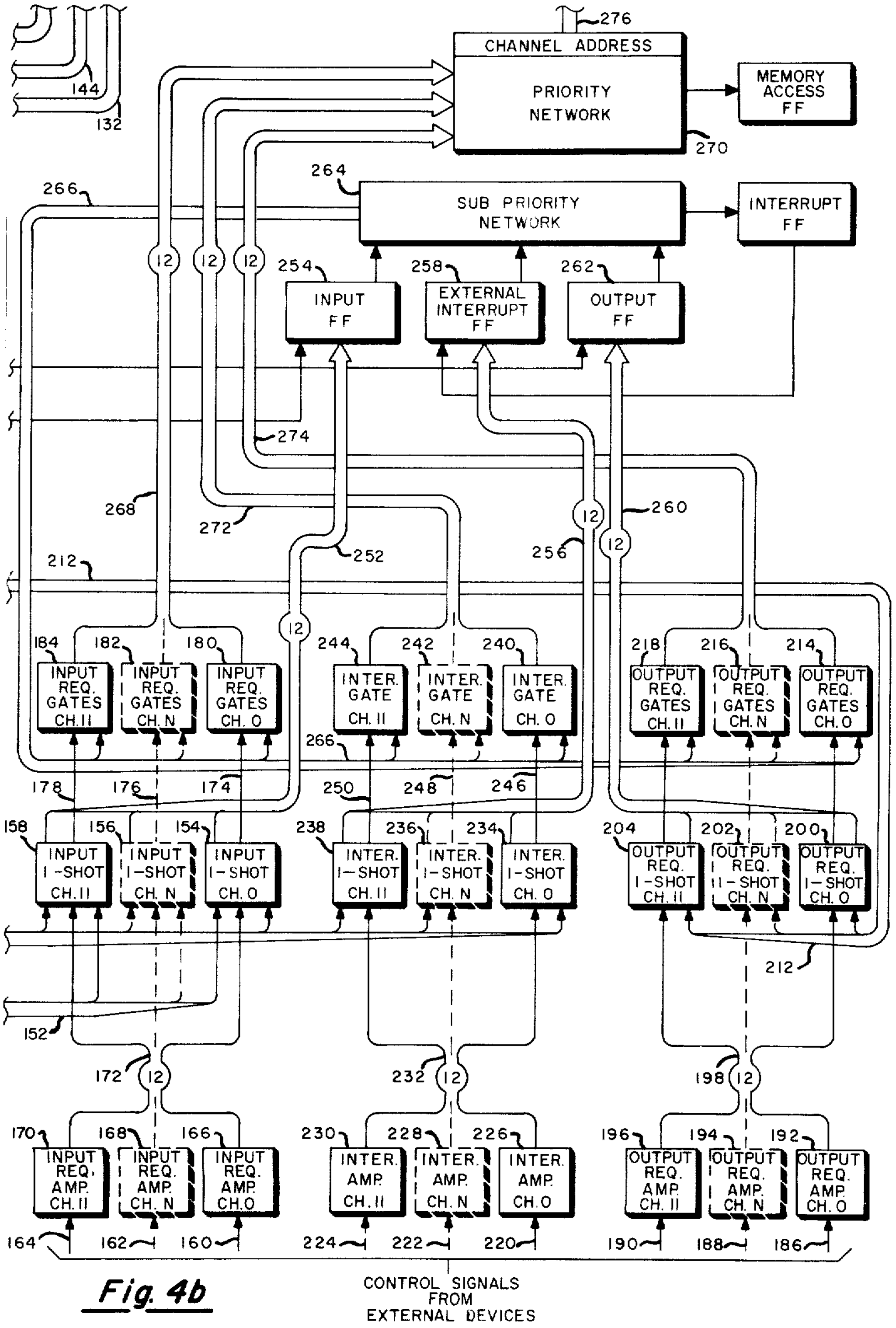
Figure 4C:
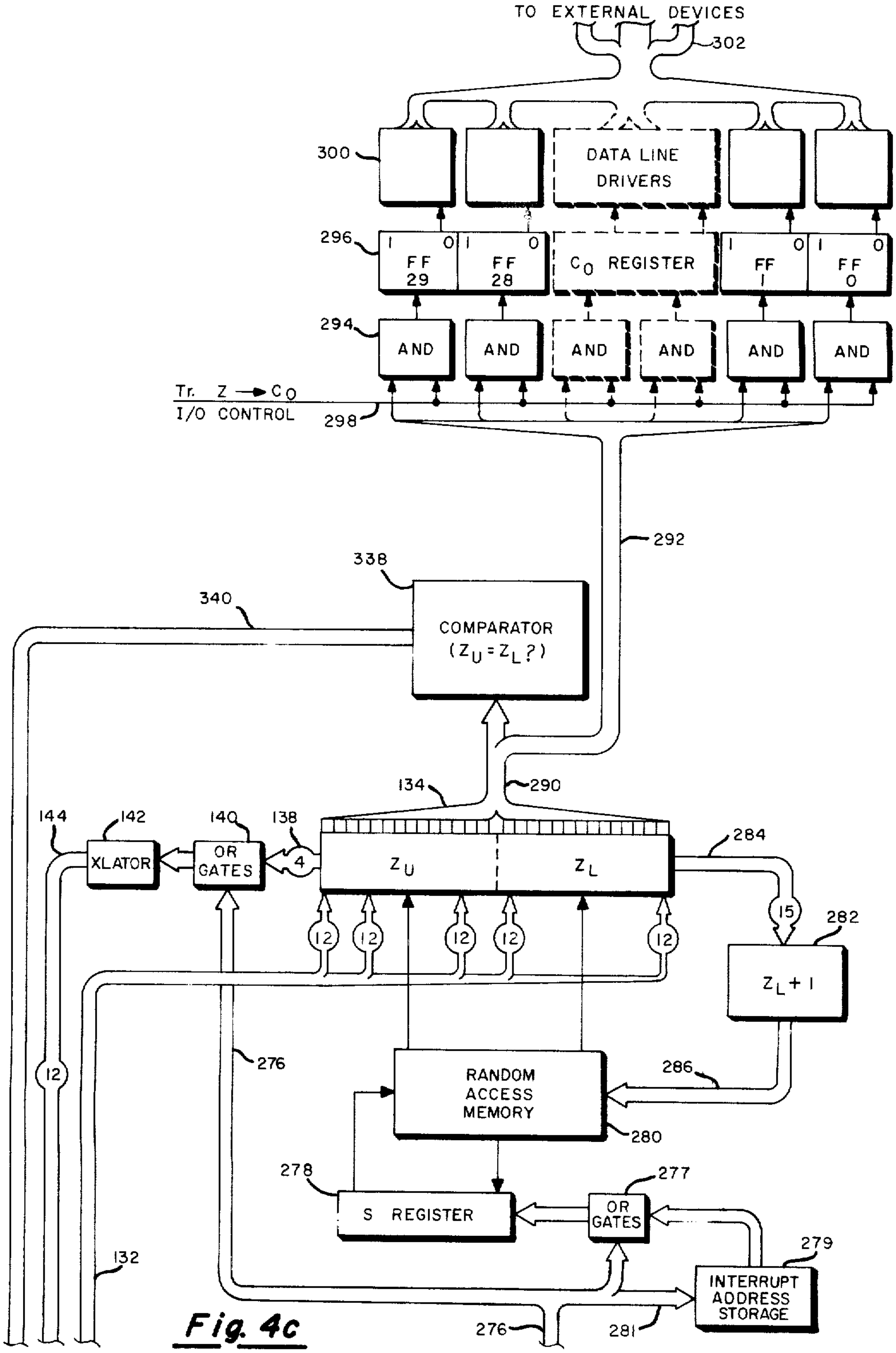
Figure 11A:
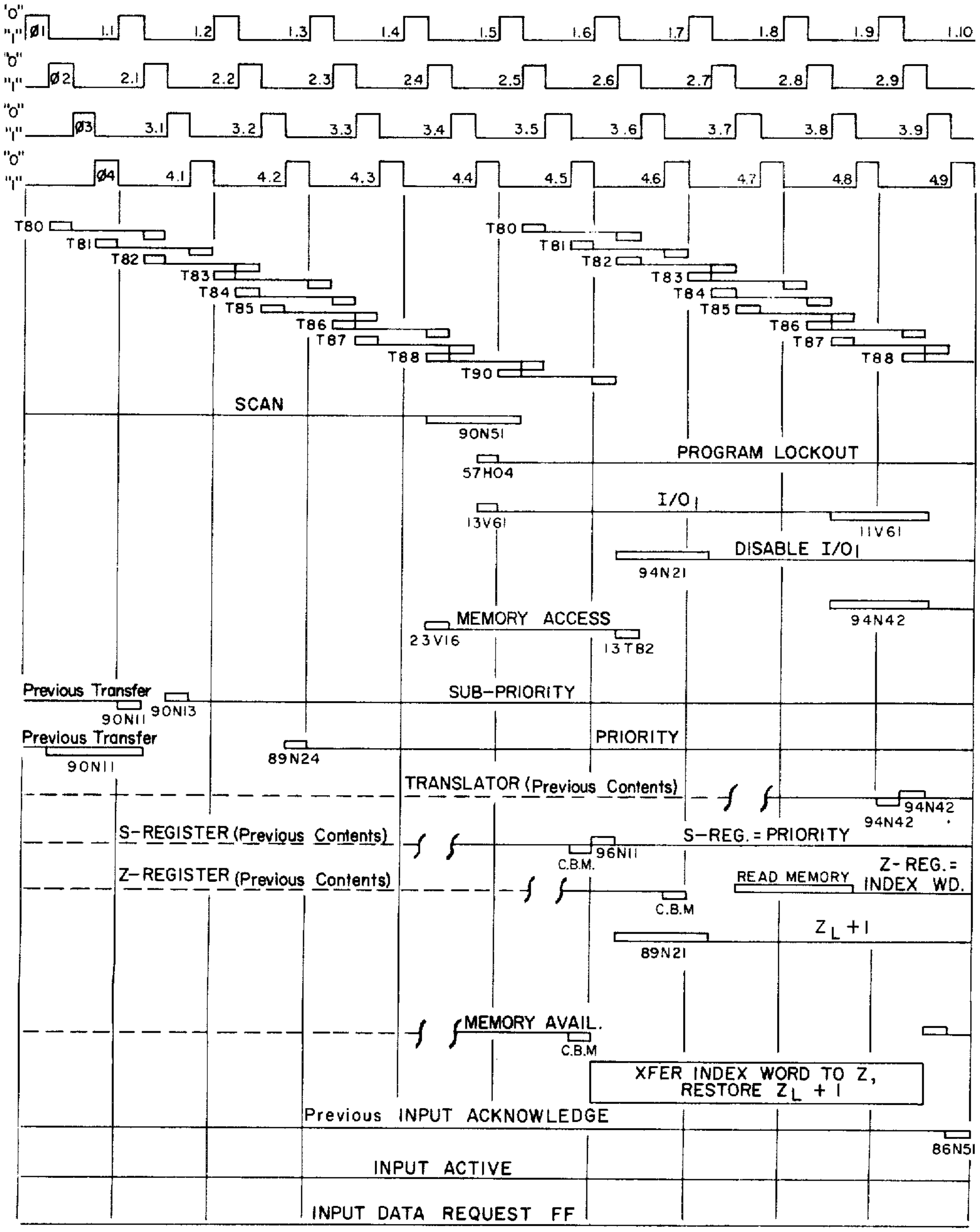
Figure 11B:
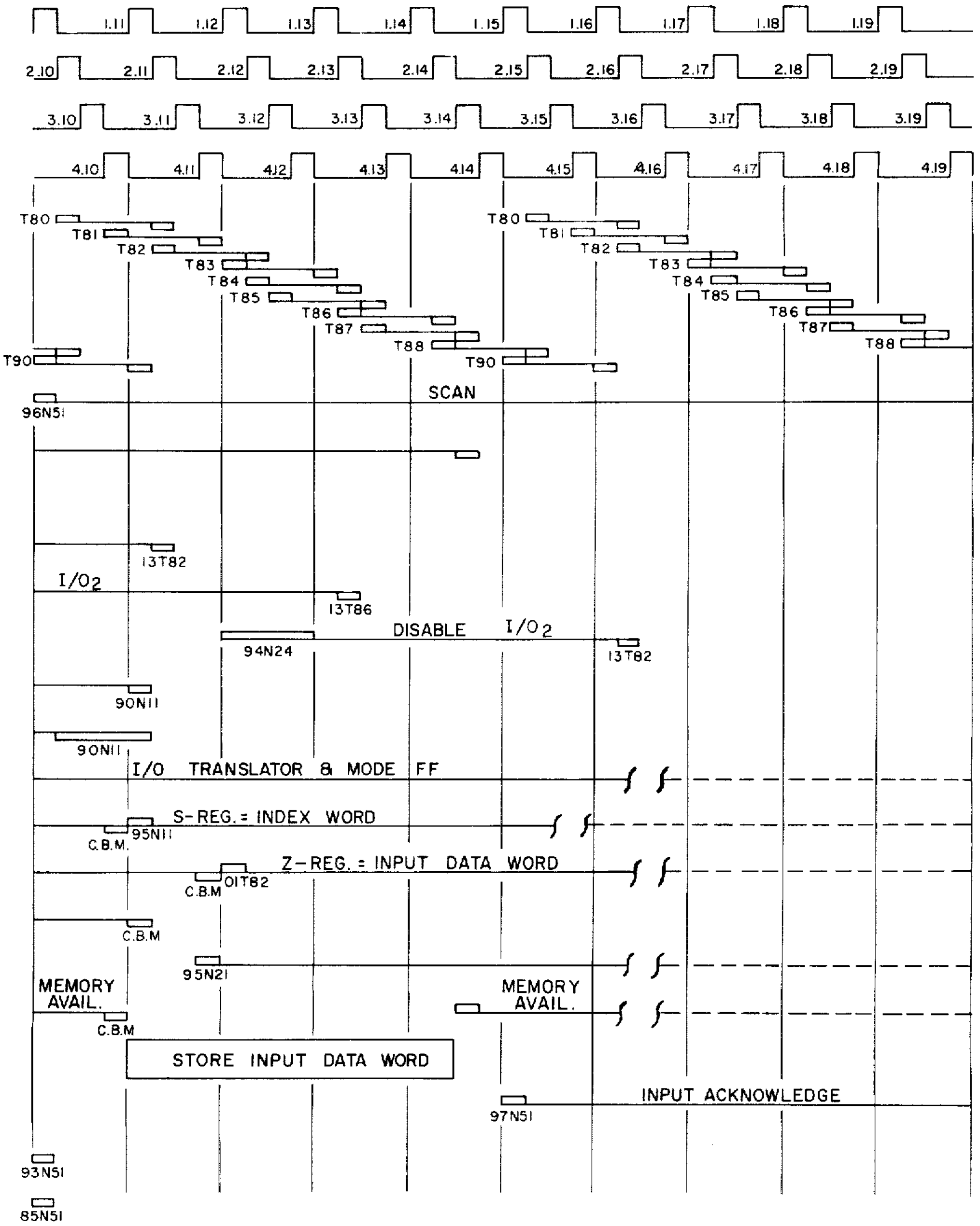
Figure 12A:
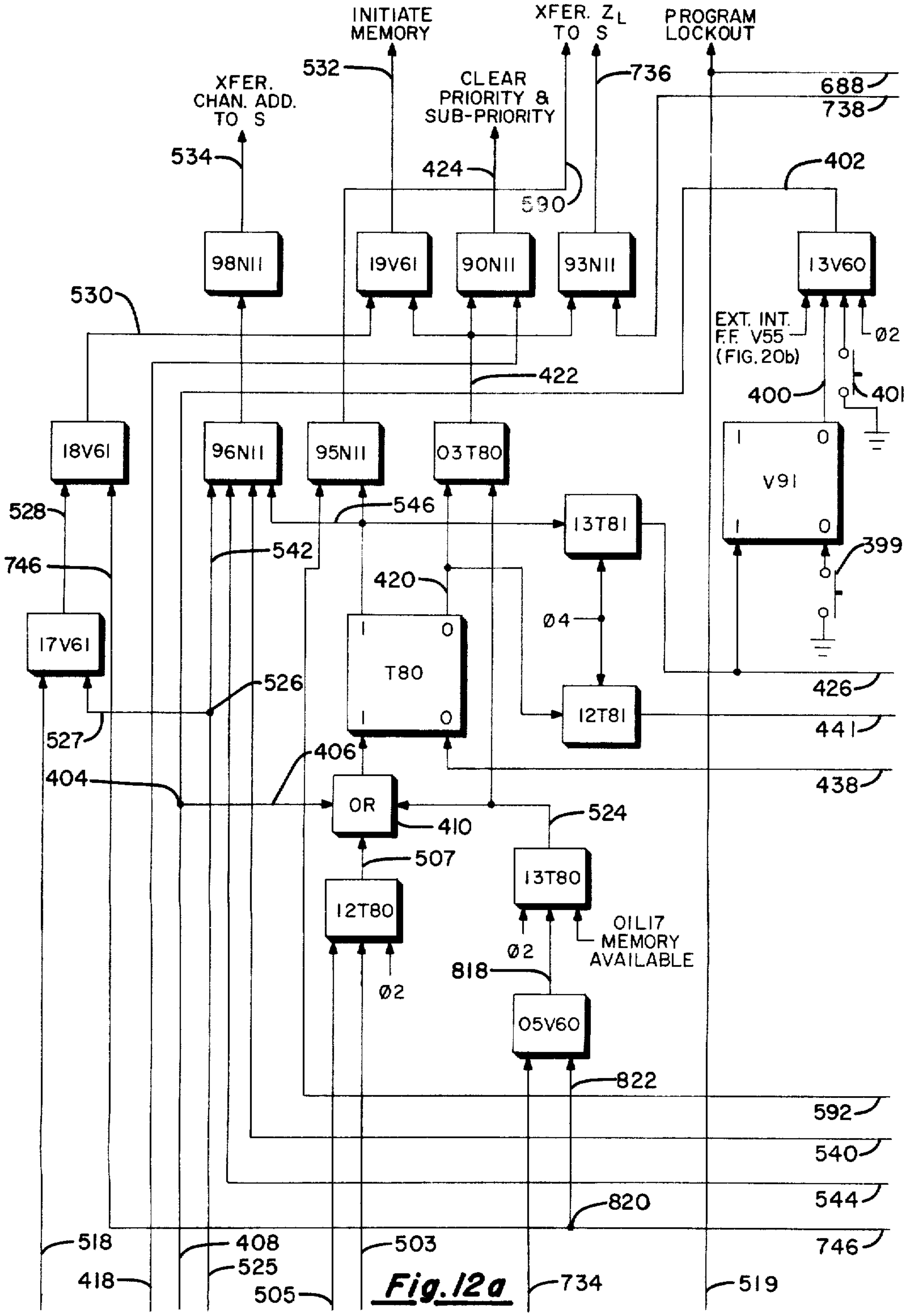
Figure 12B:
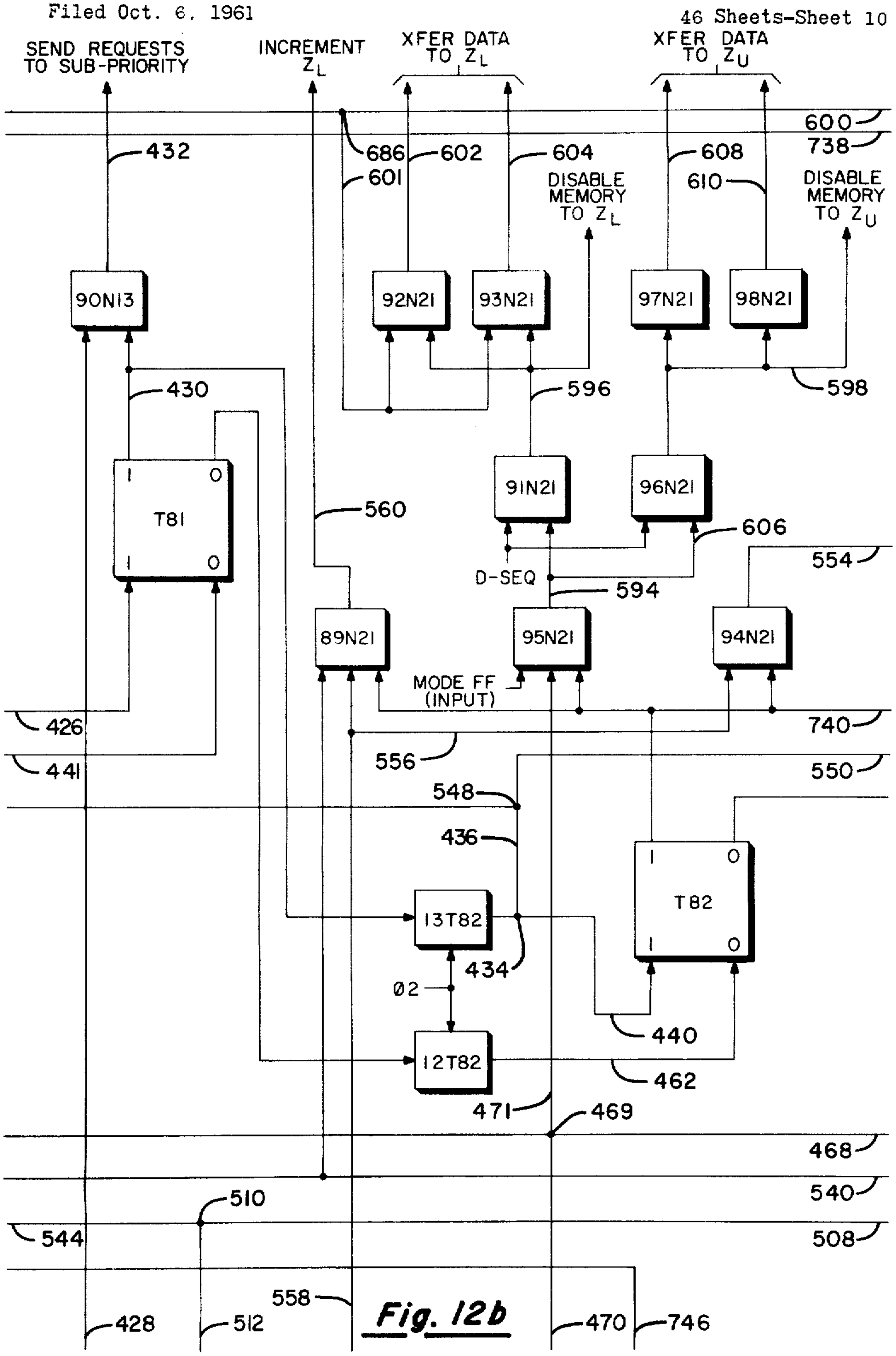
Figure 12C:
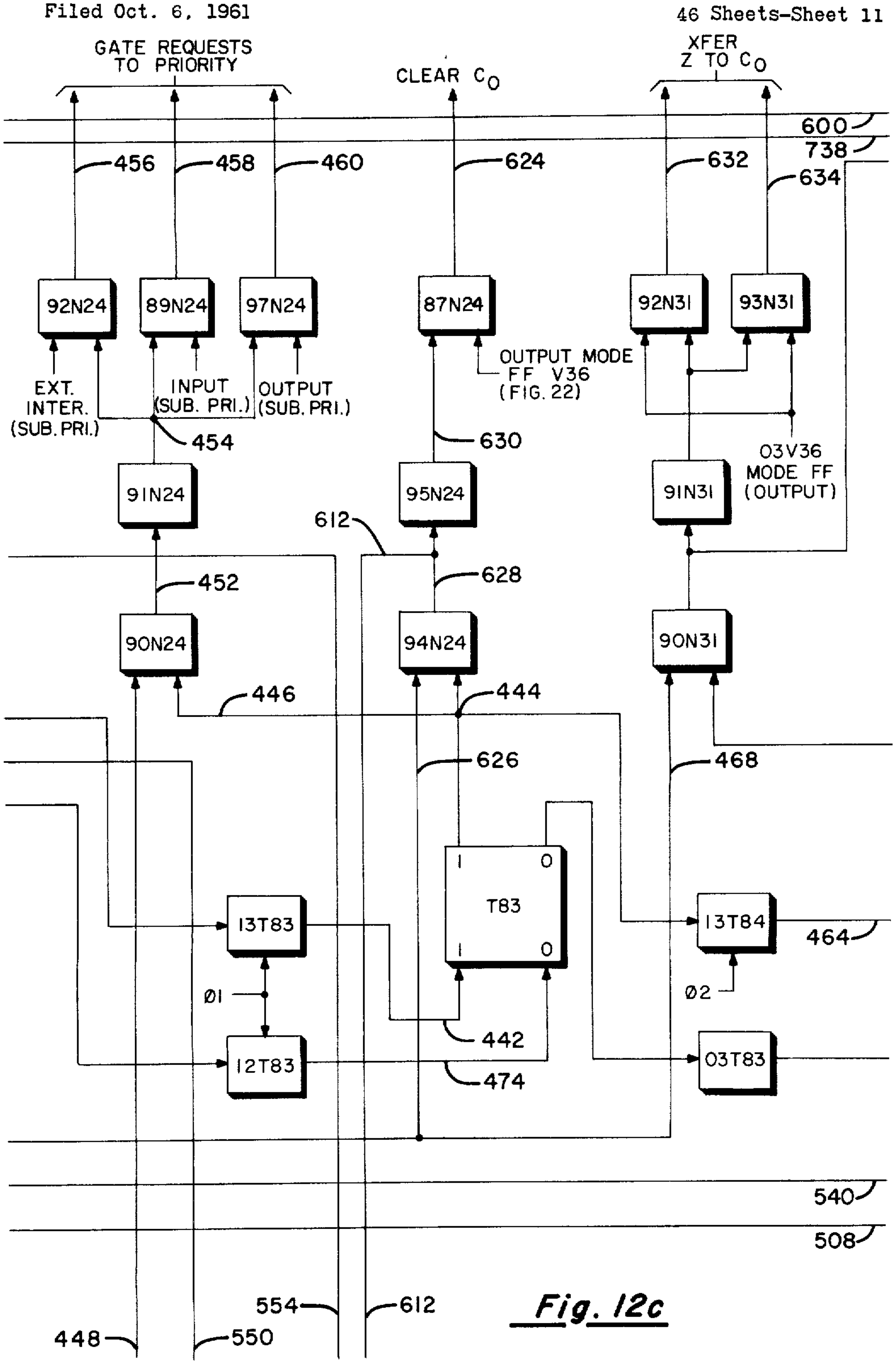
Figure 12D:
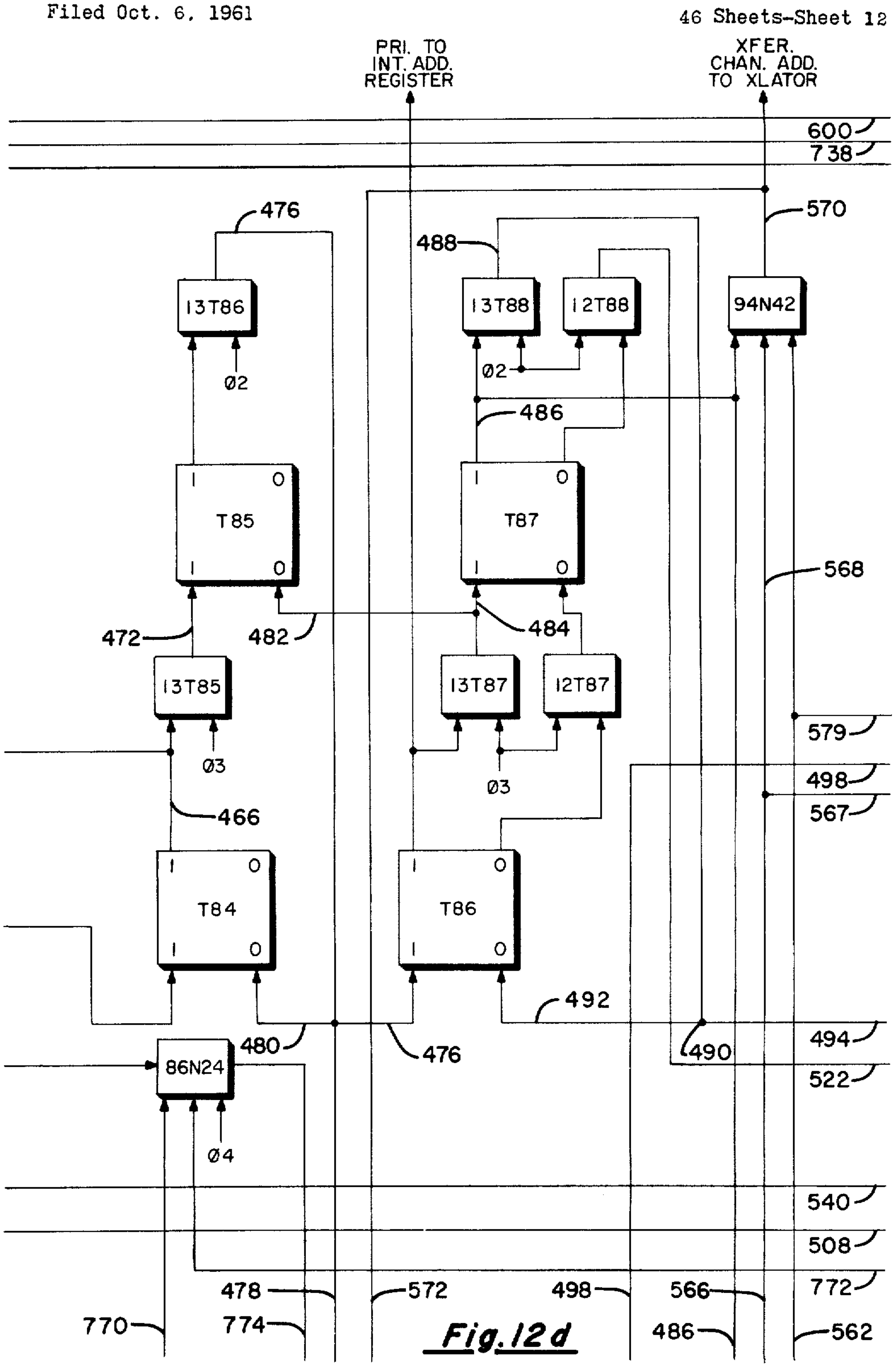
Figure 12E:
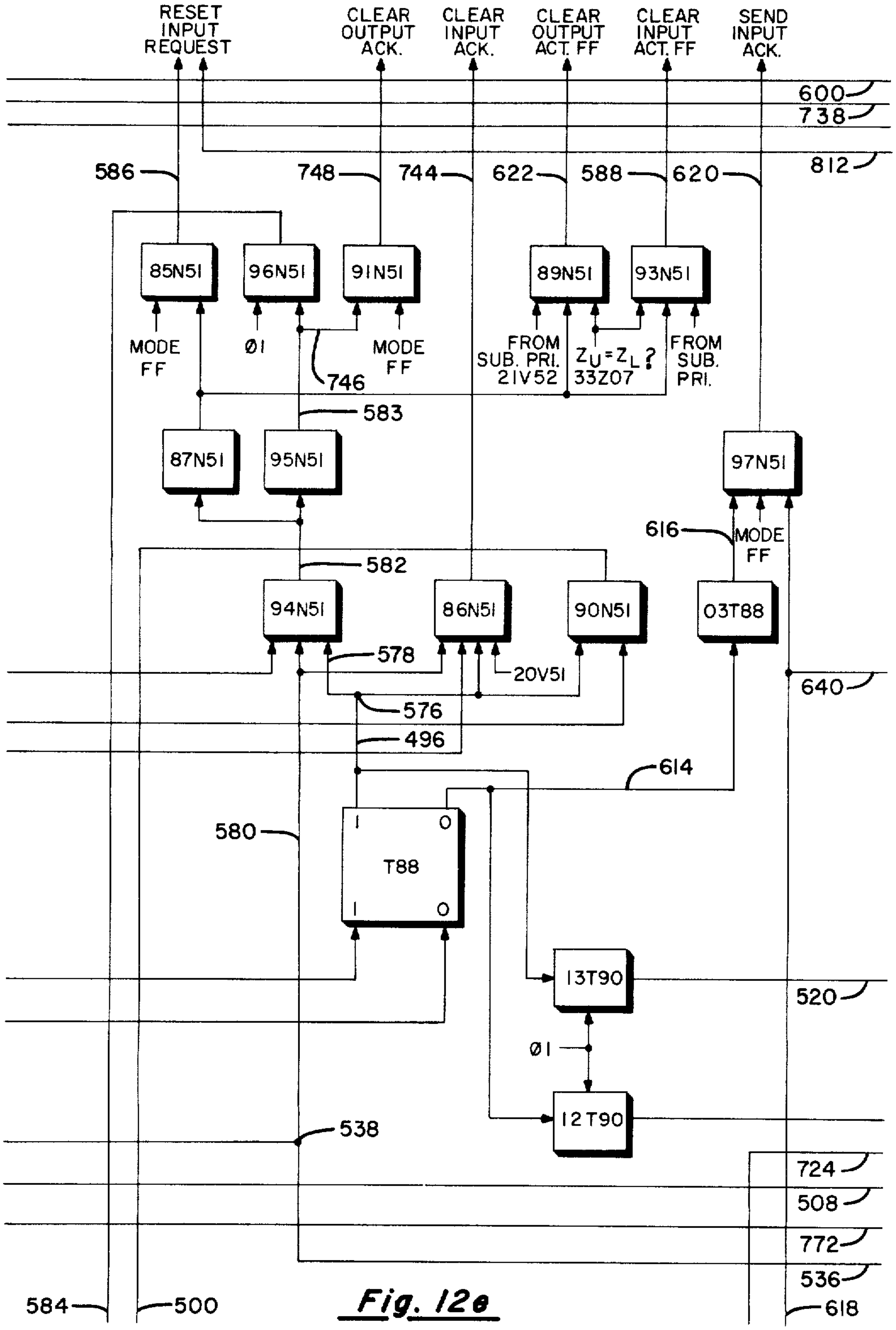
Figure 12F:
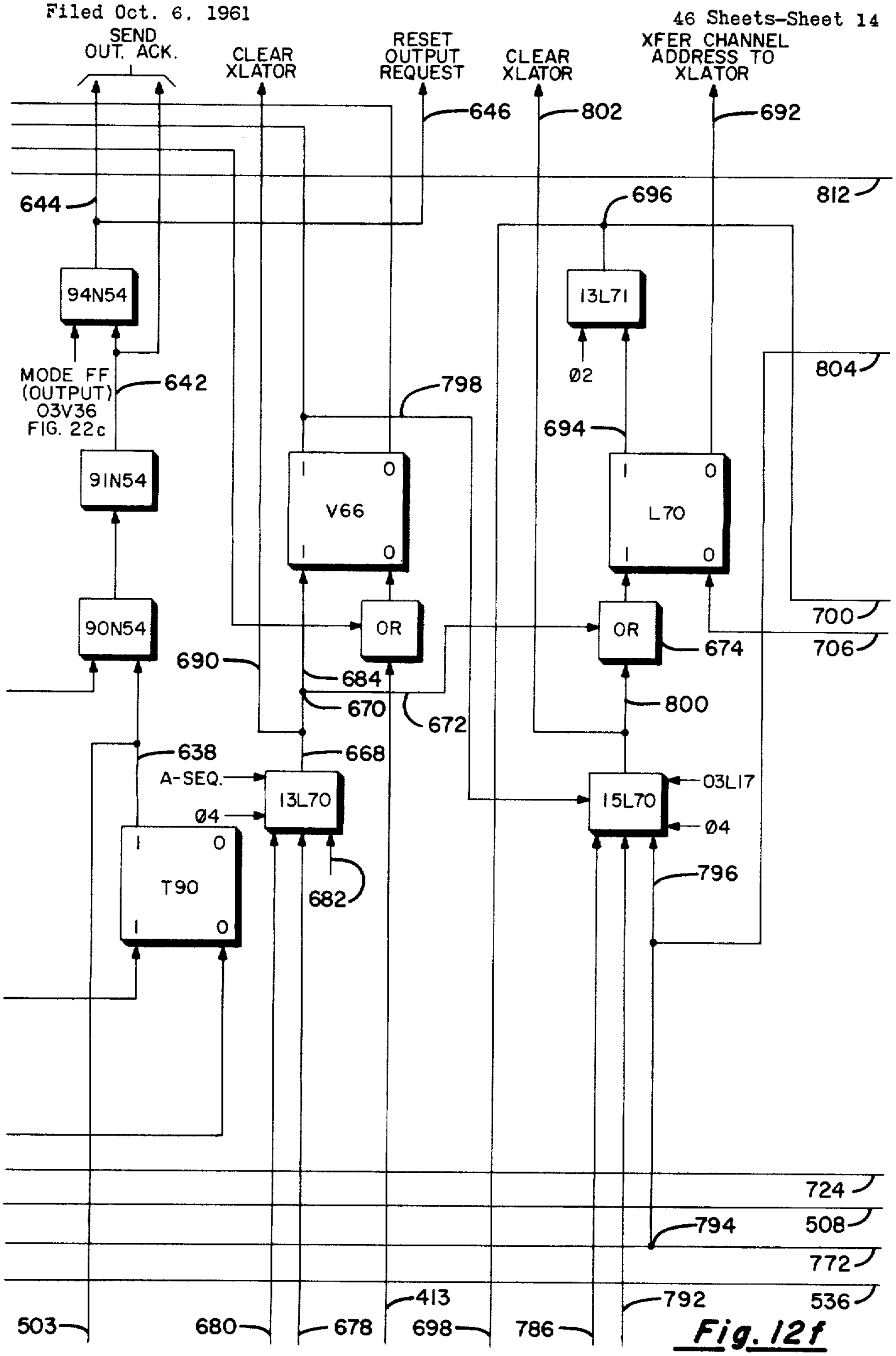
Figure 12G:
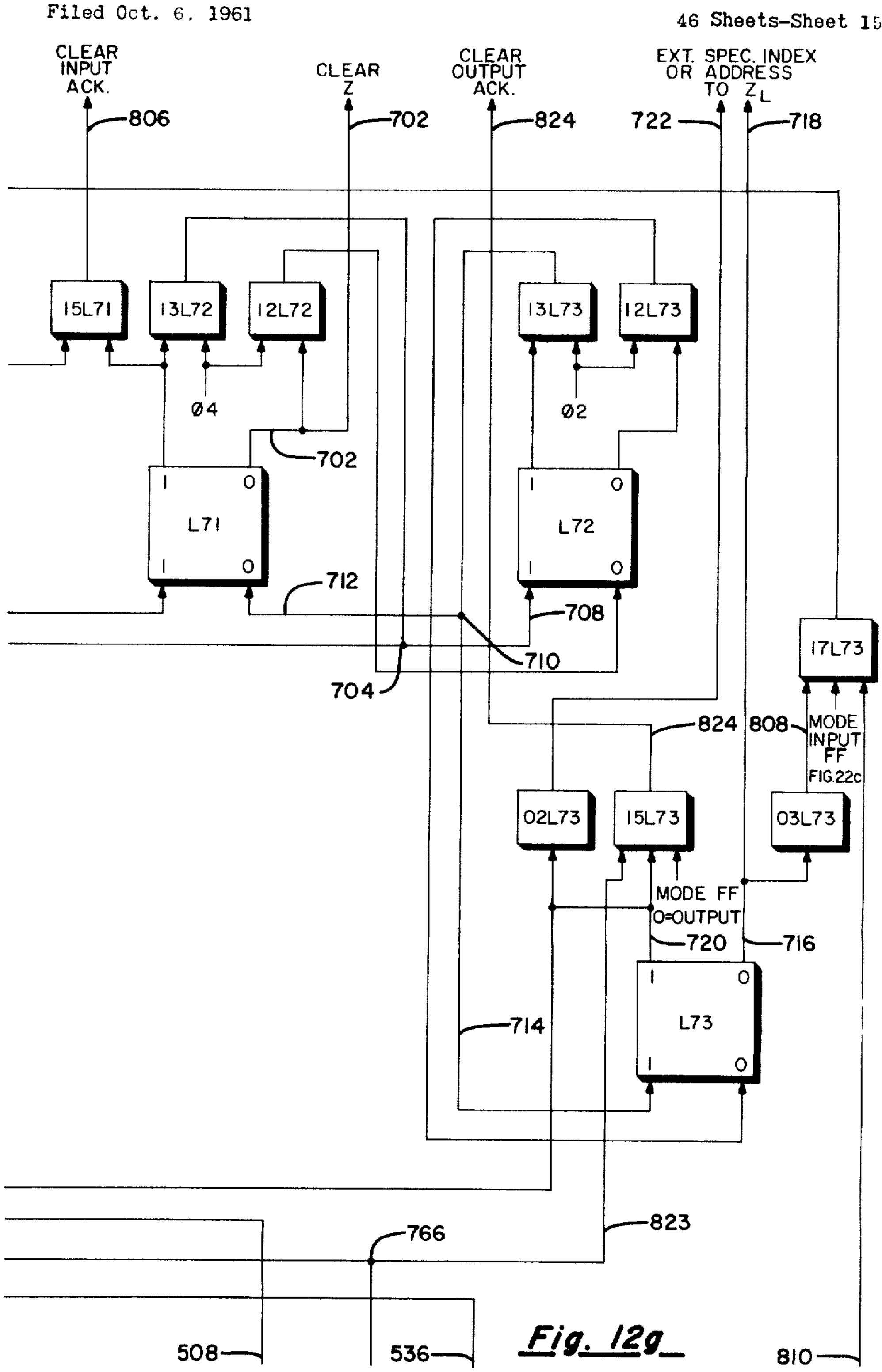
Figure 12H:
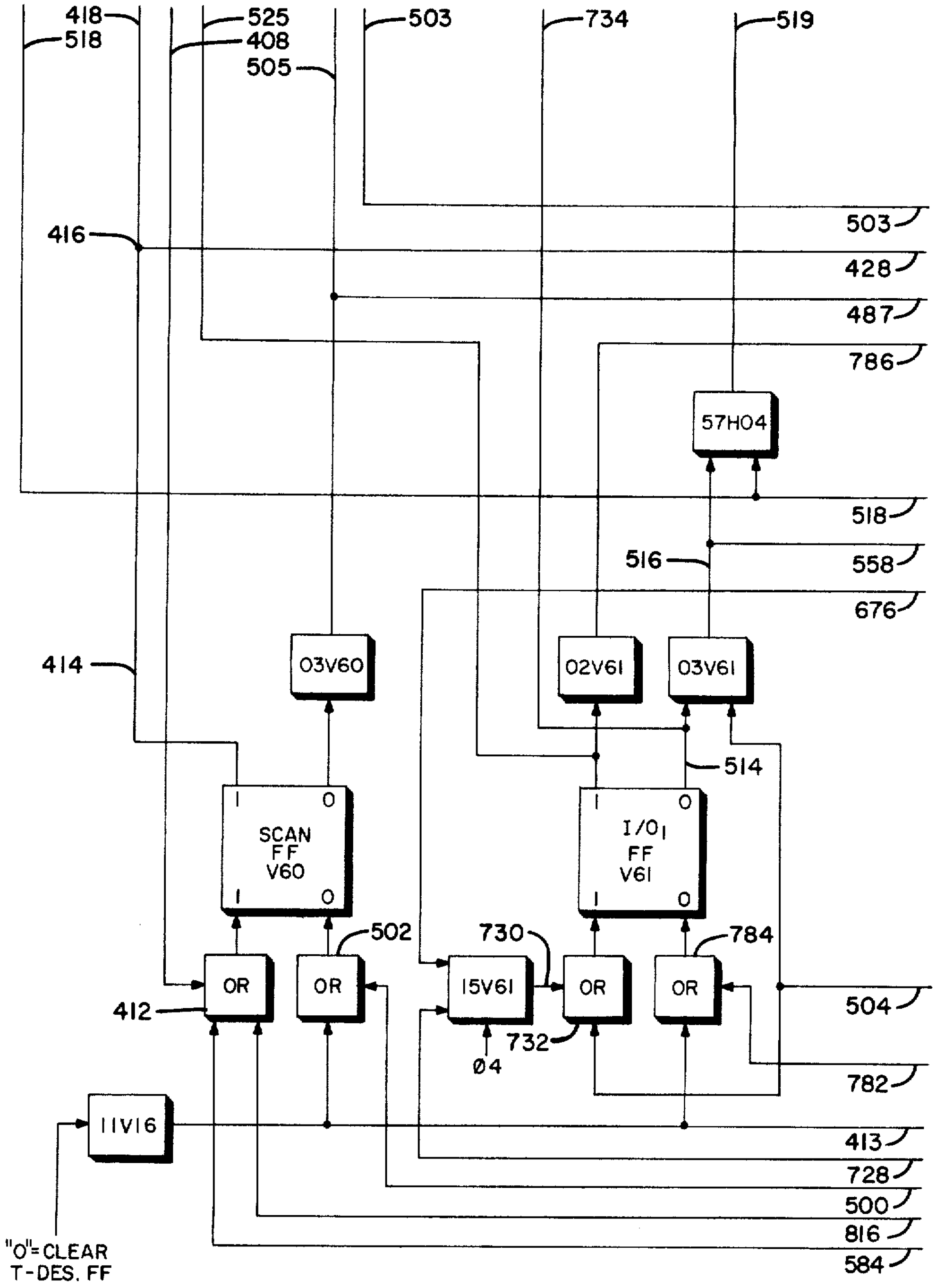
Figure 12I:
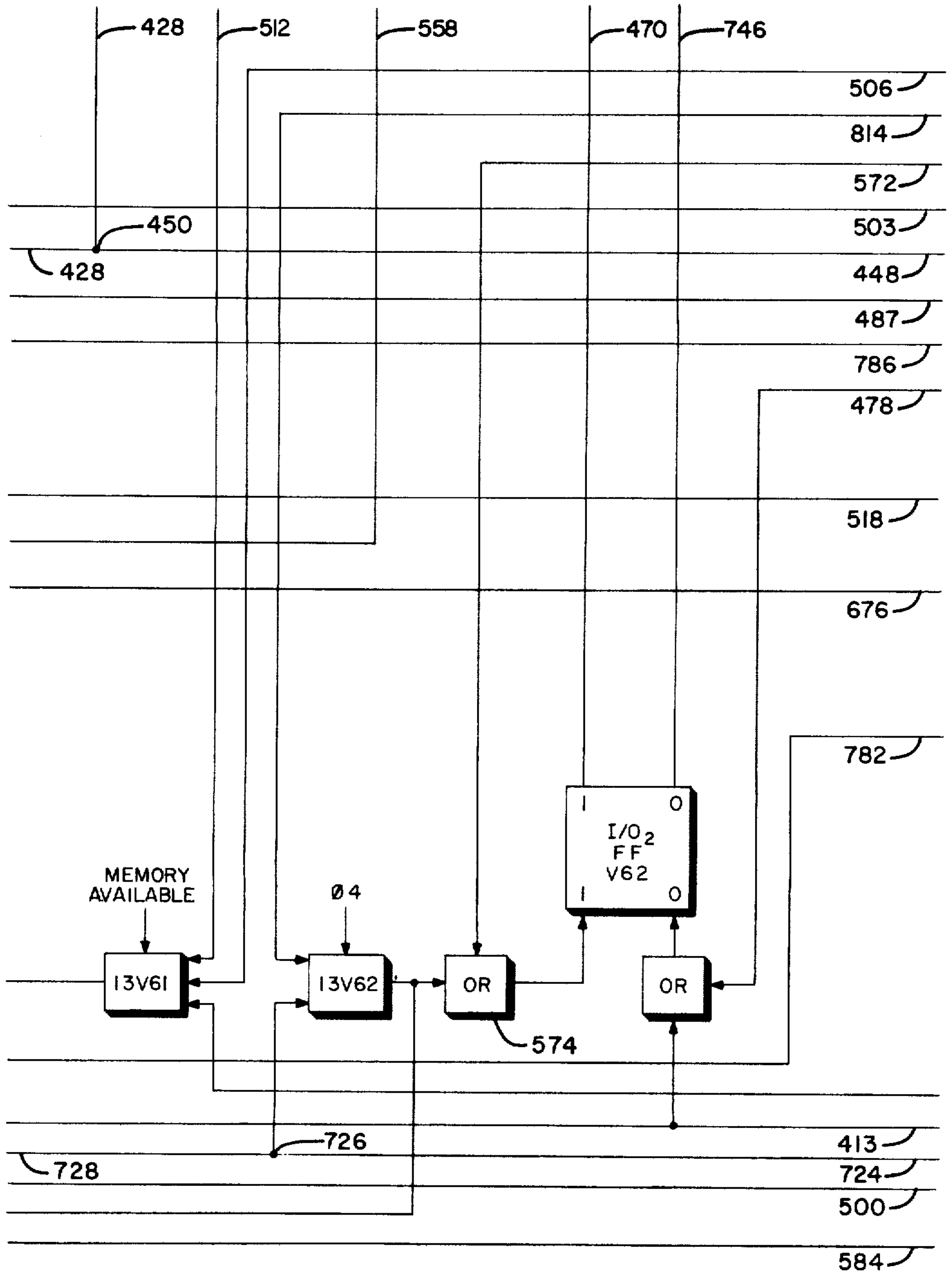
Figure 12J:
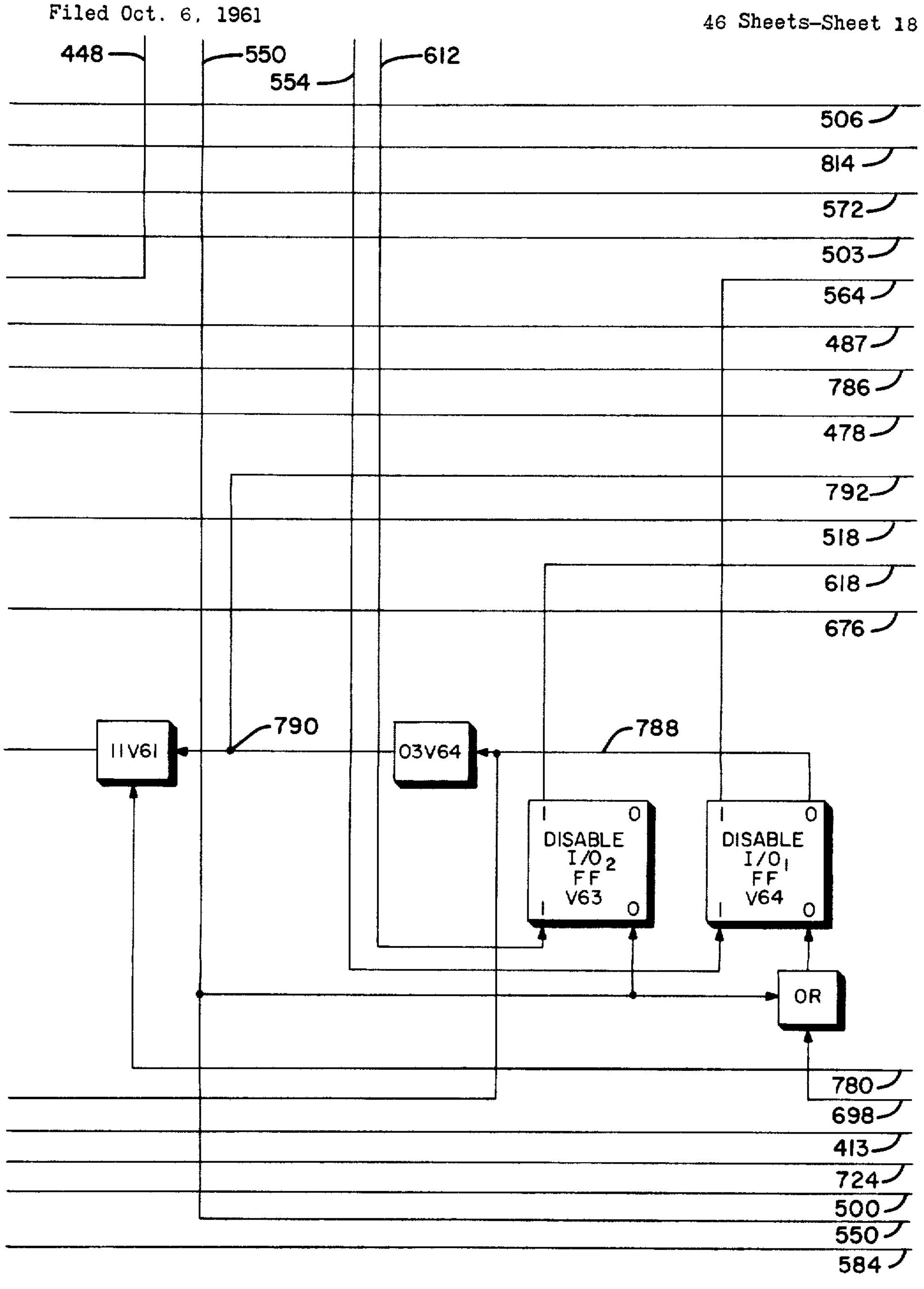
Figure 12K:
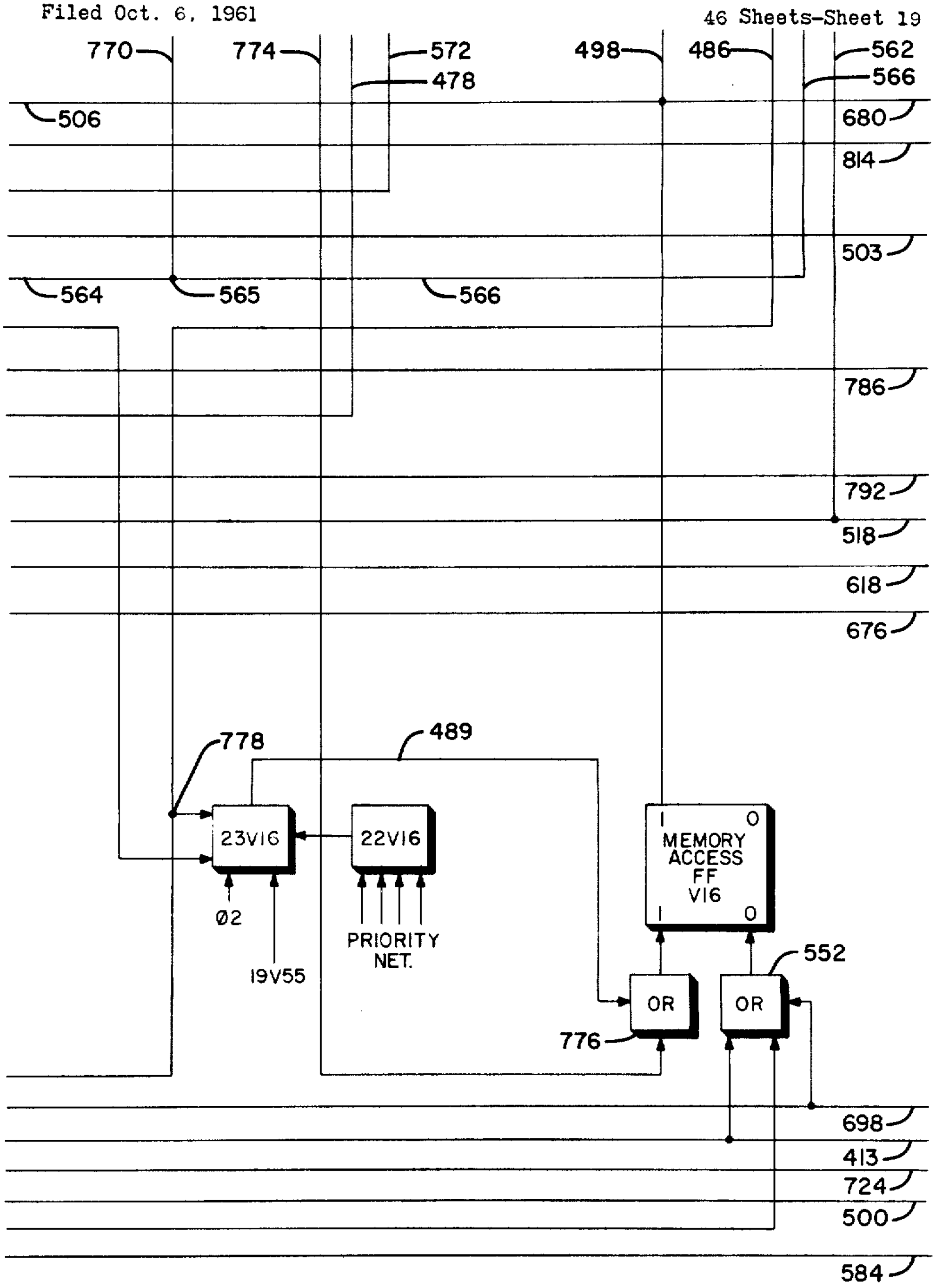
Figure 12M:
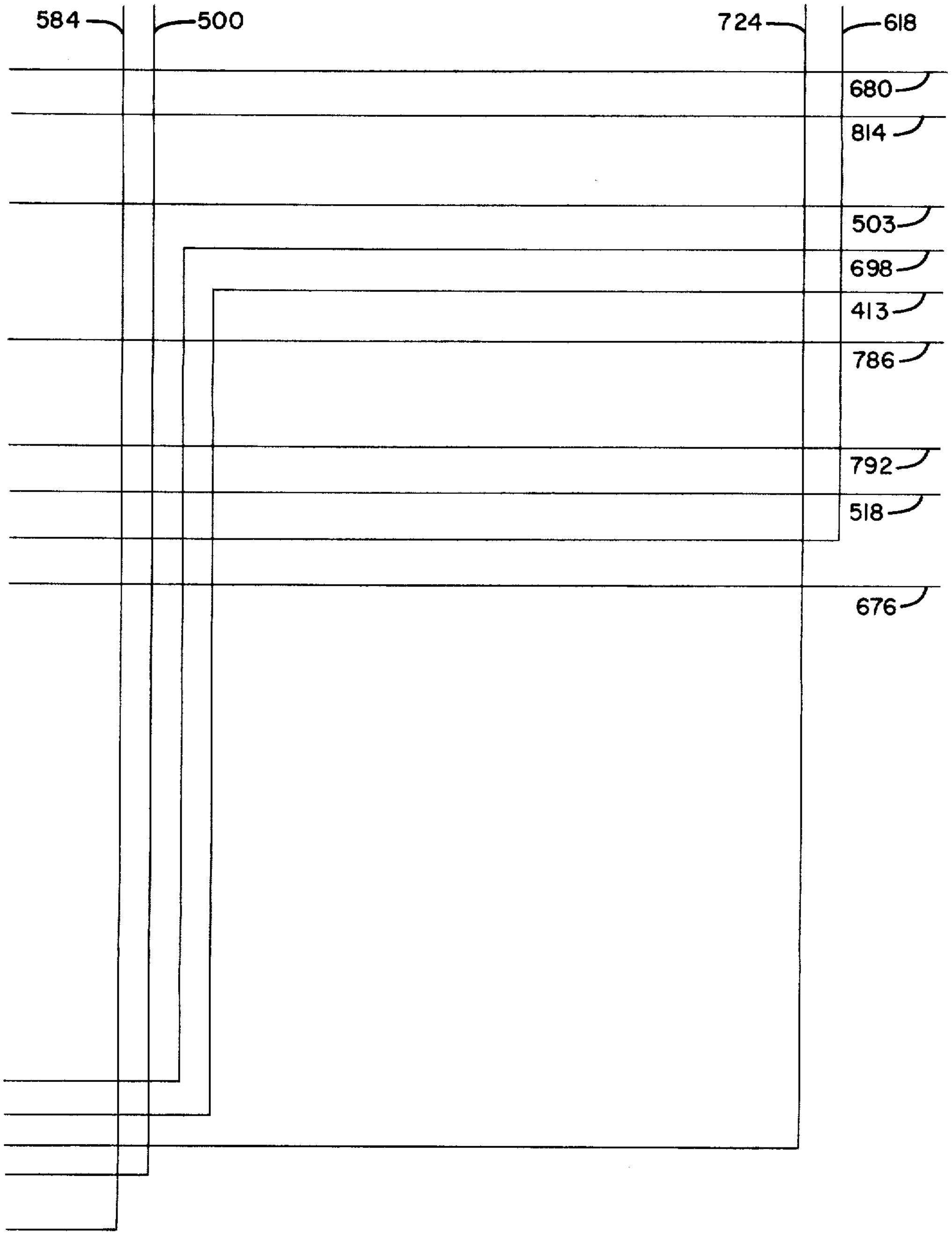
Figure 12N:
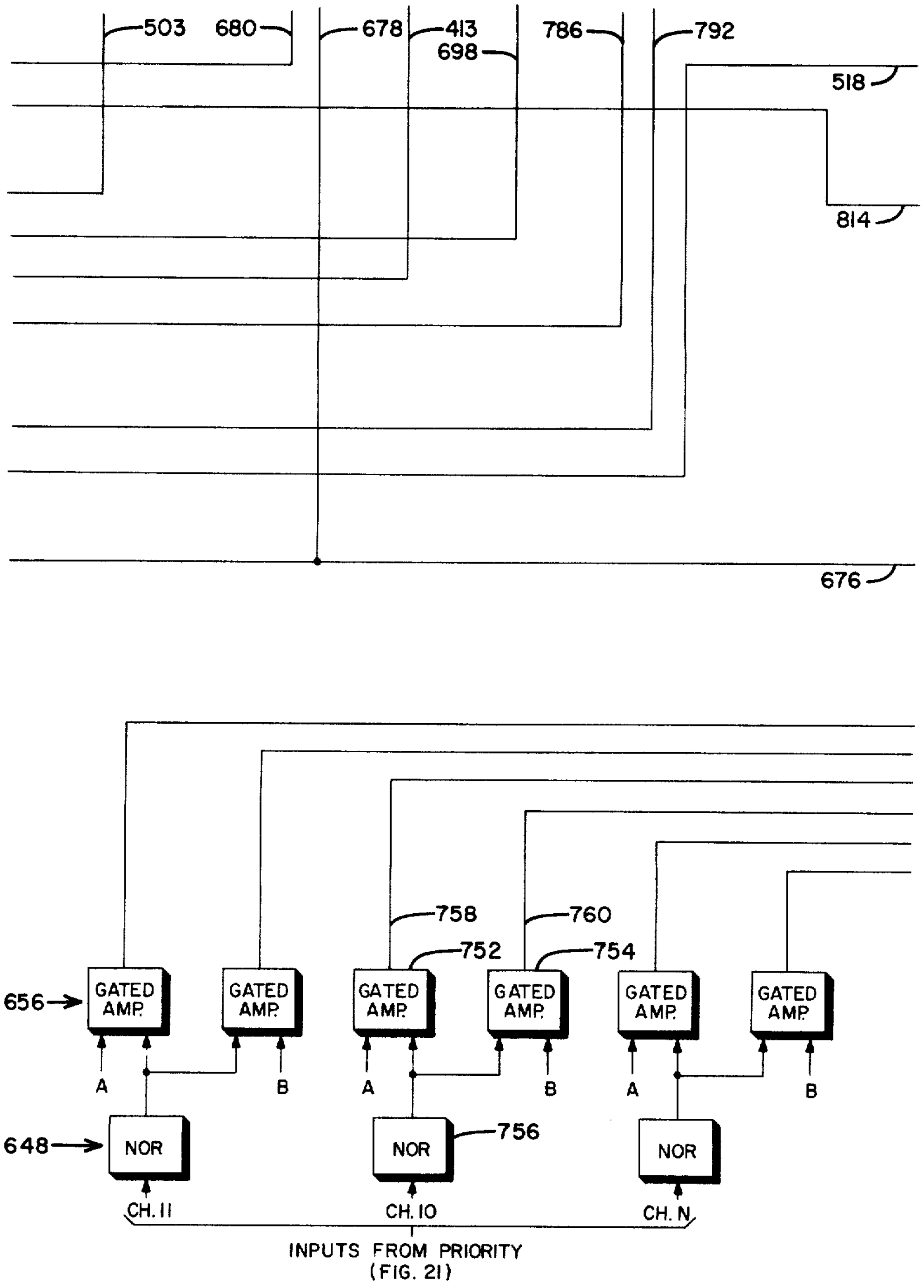
Figure 12P:
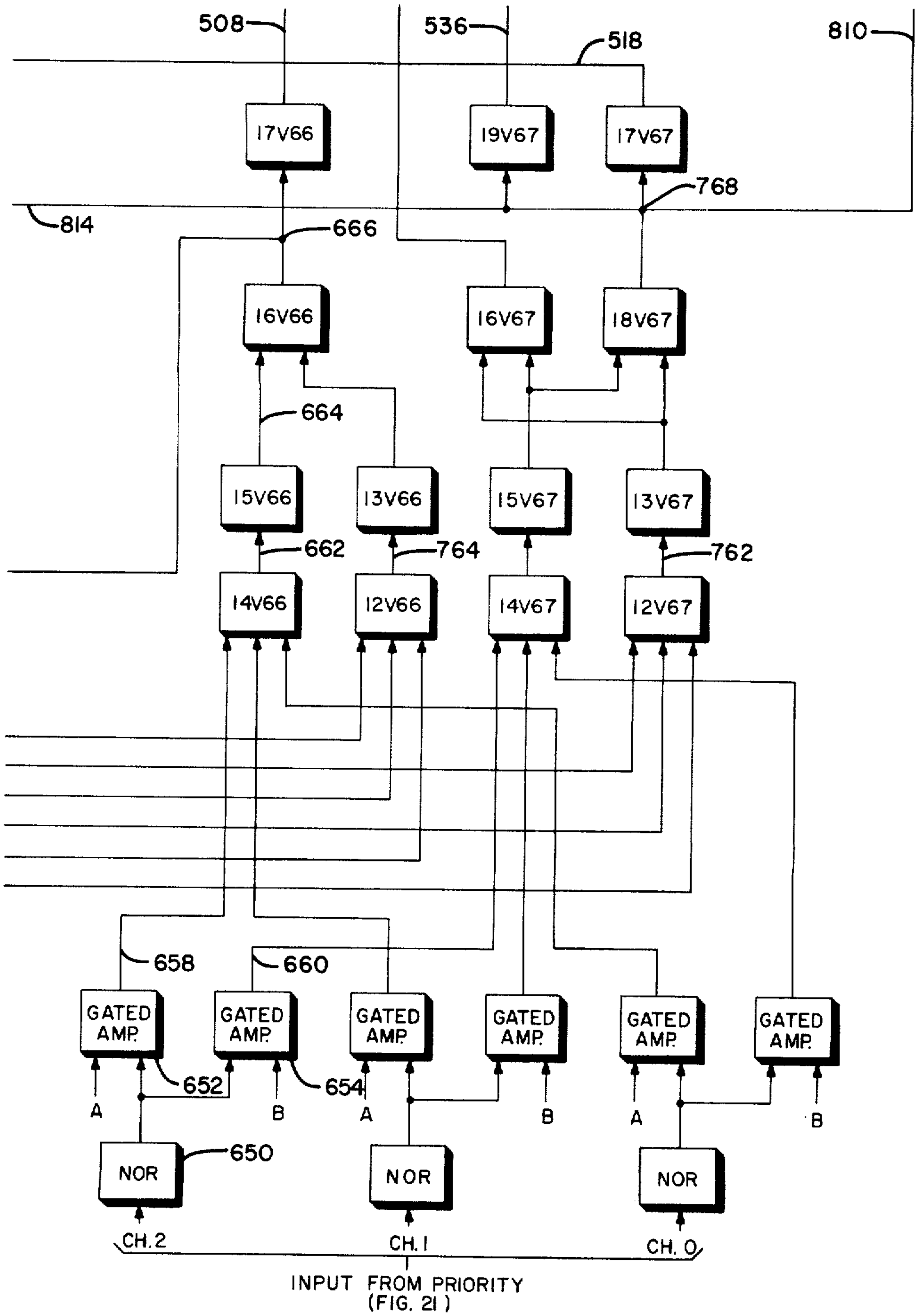
Figure 14A:
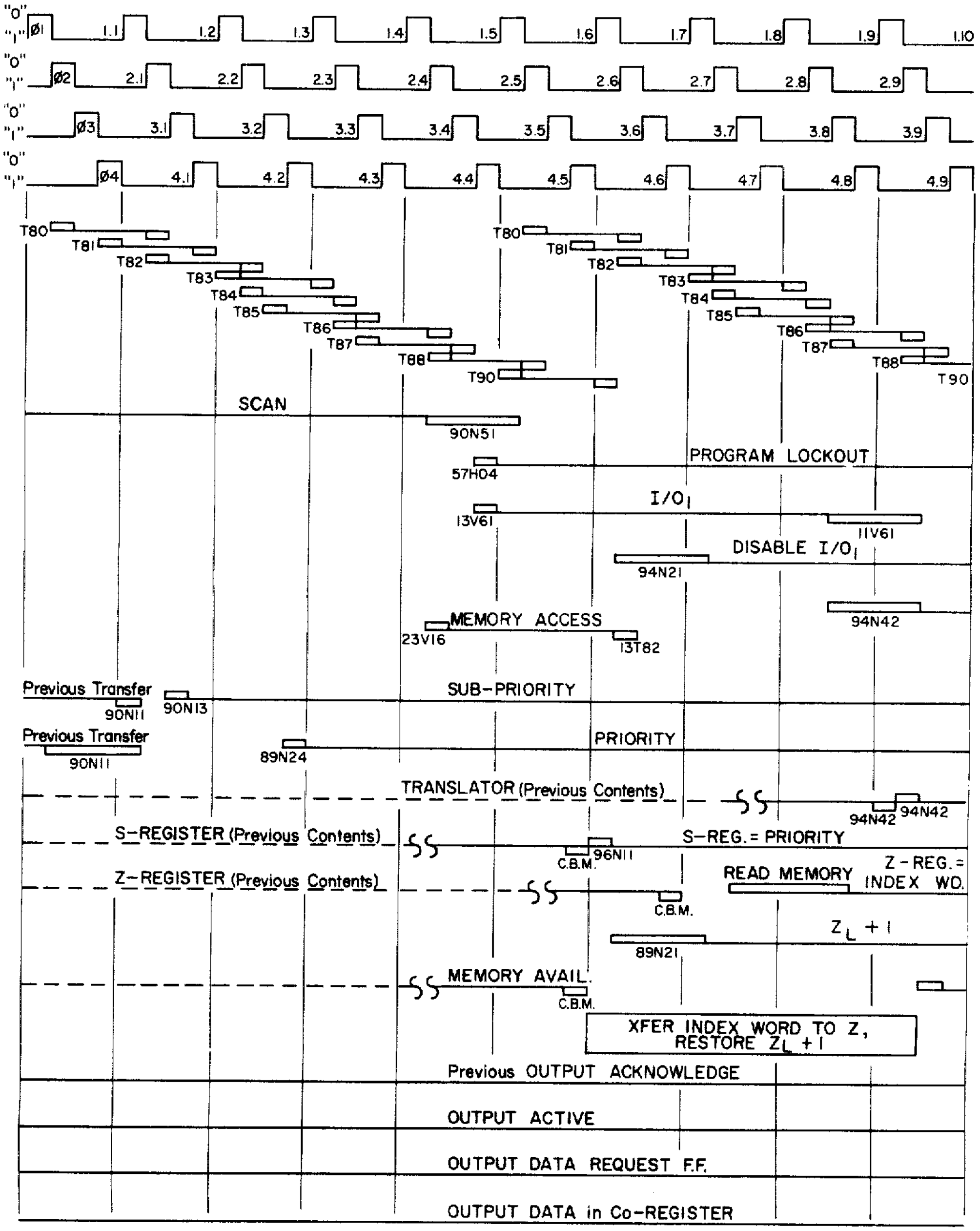
Figure 14B:
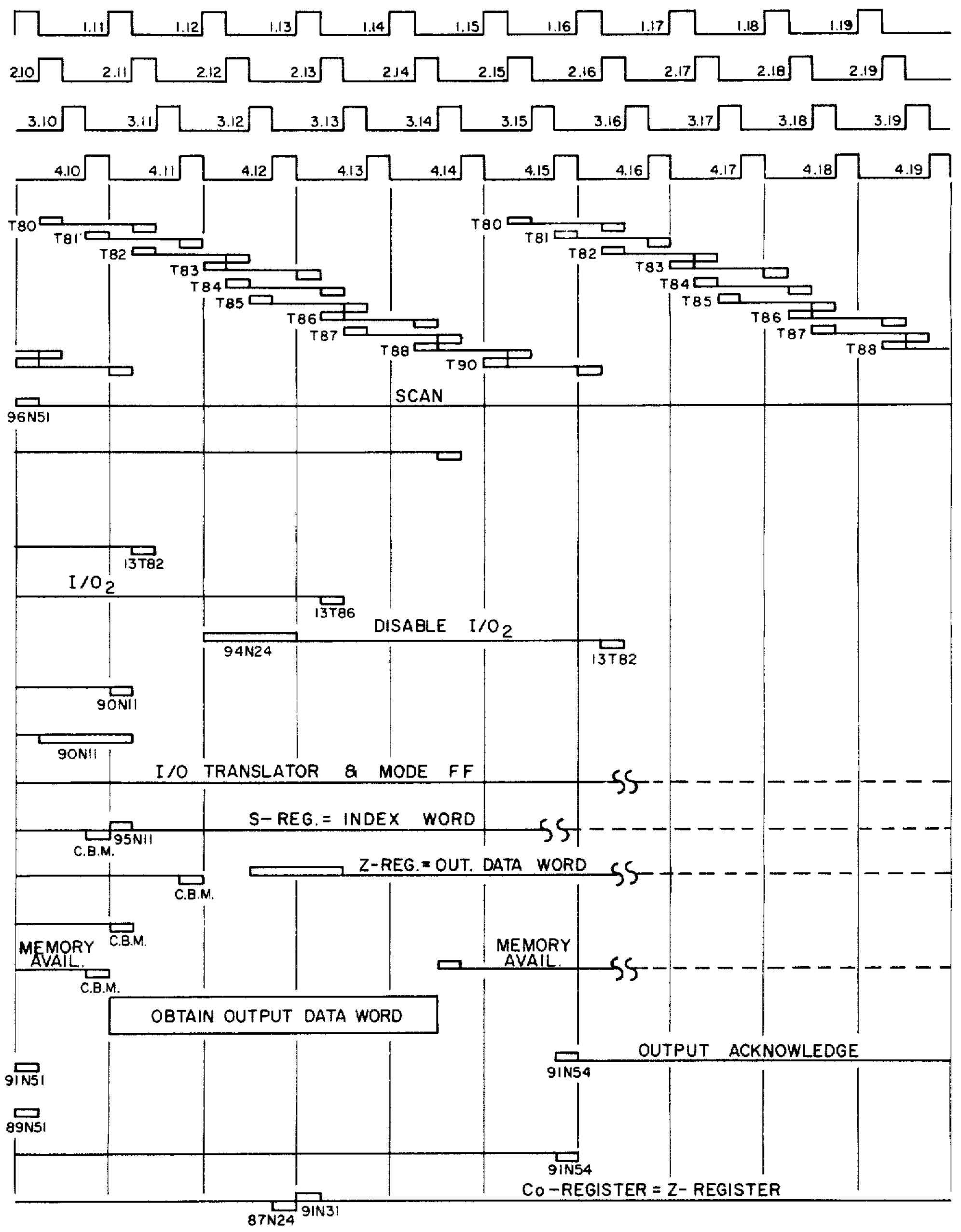
Figure 15A:
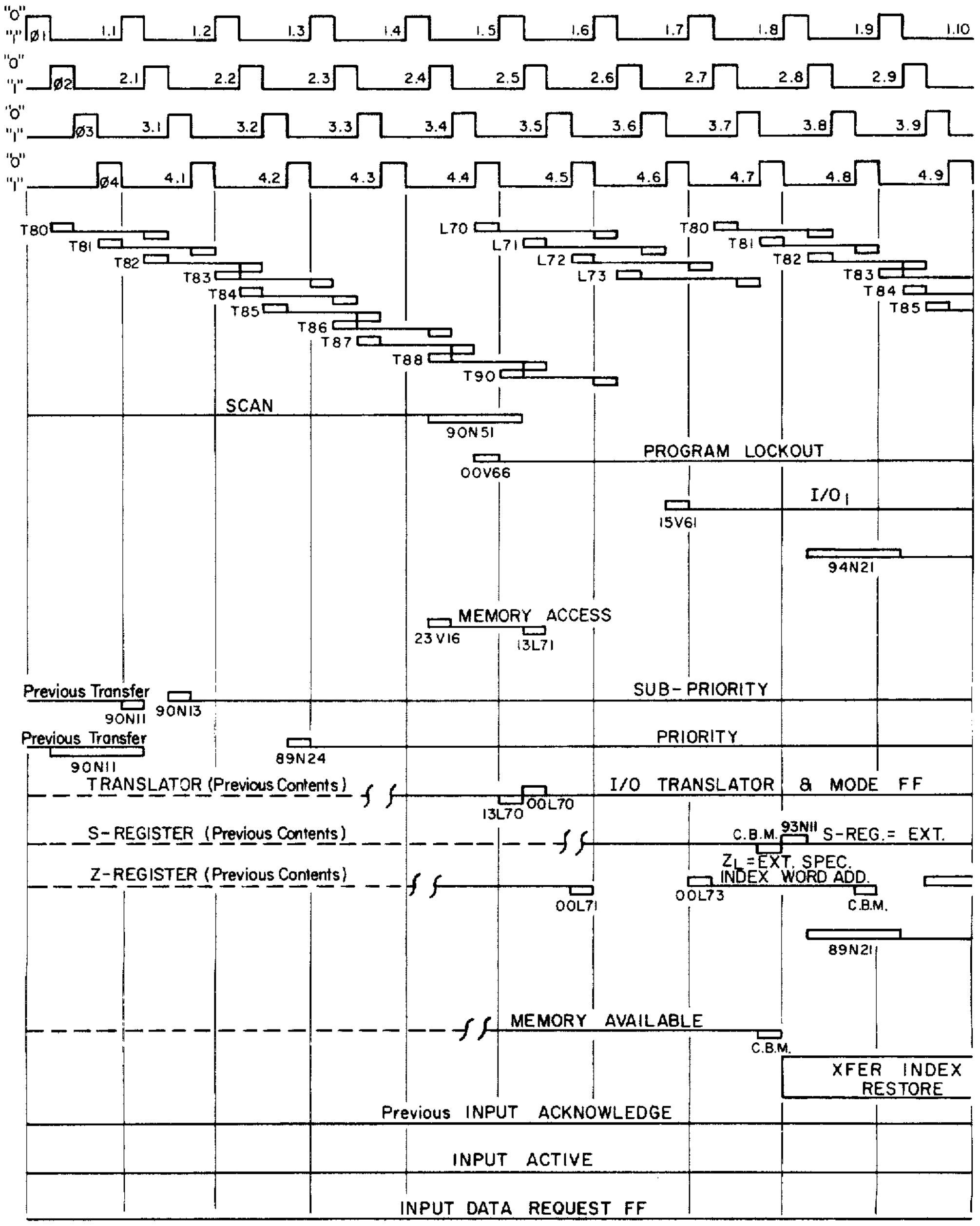
Figure 15B:
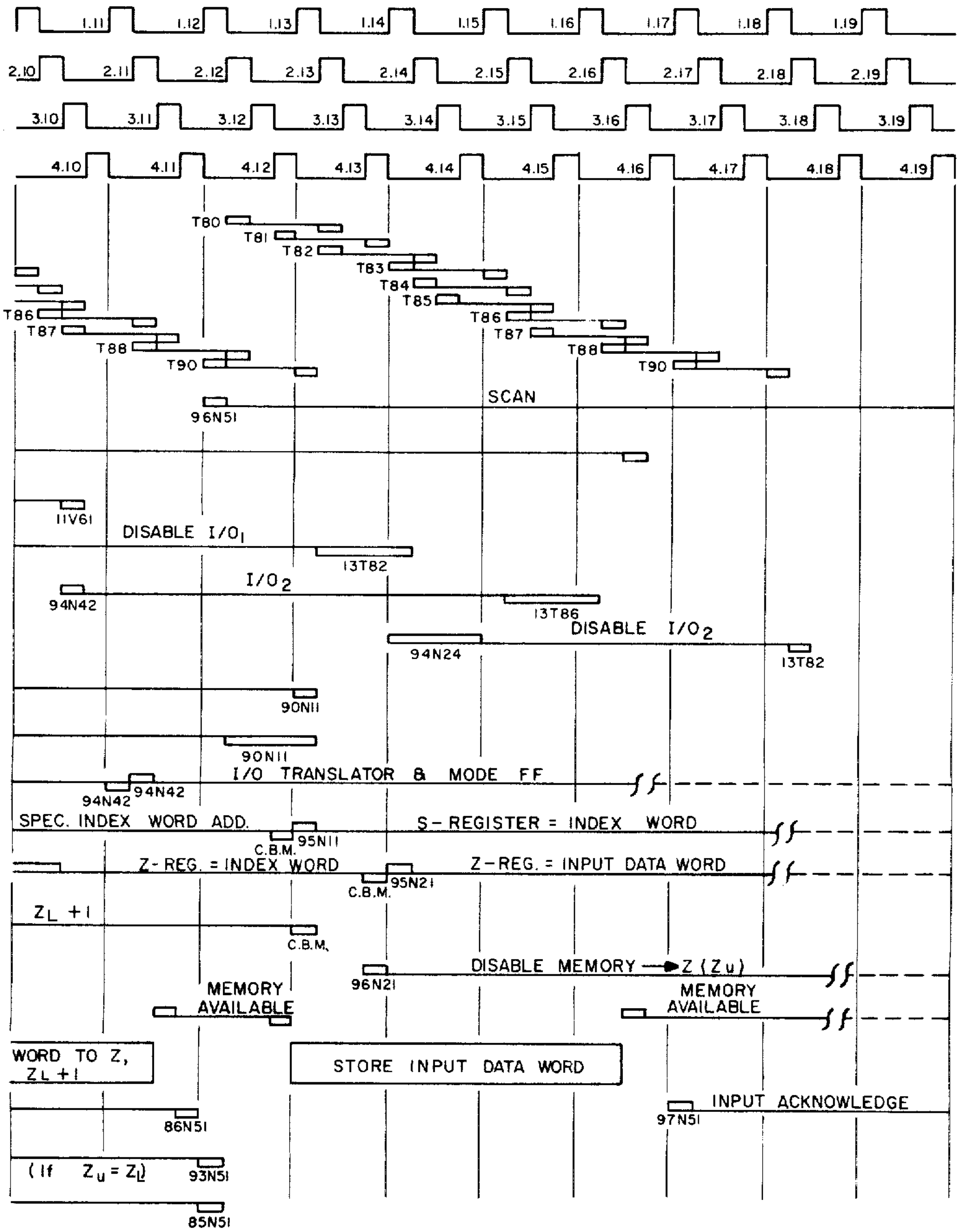
Figure 16A:
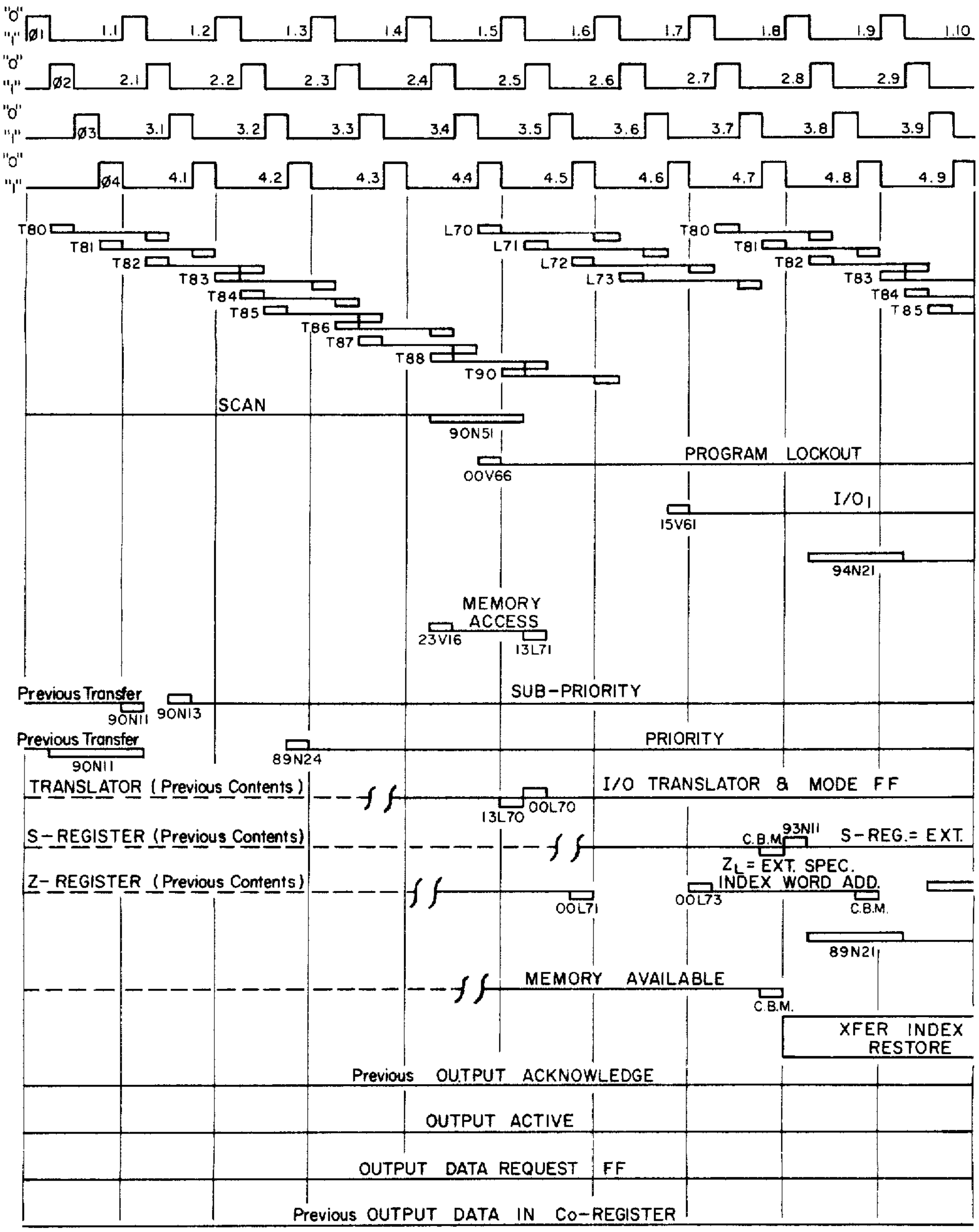
Figure 16B:
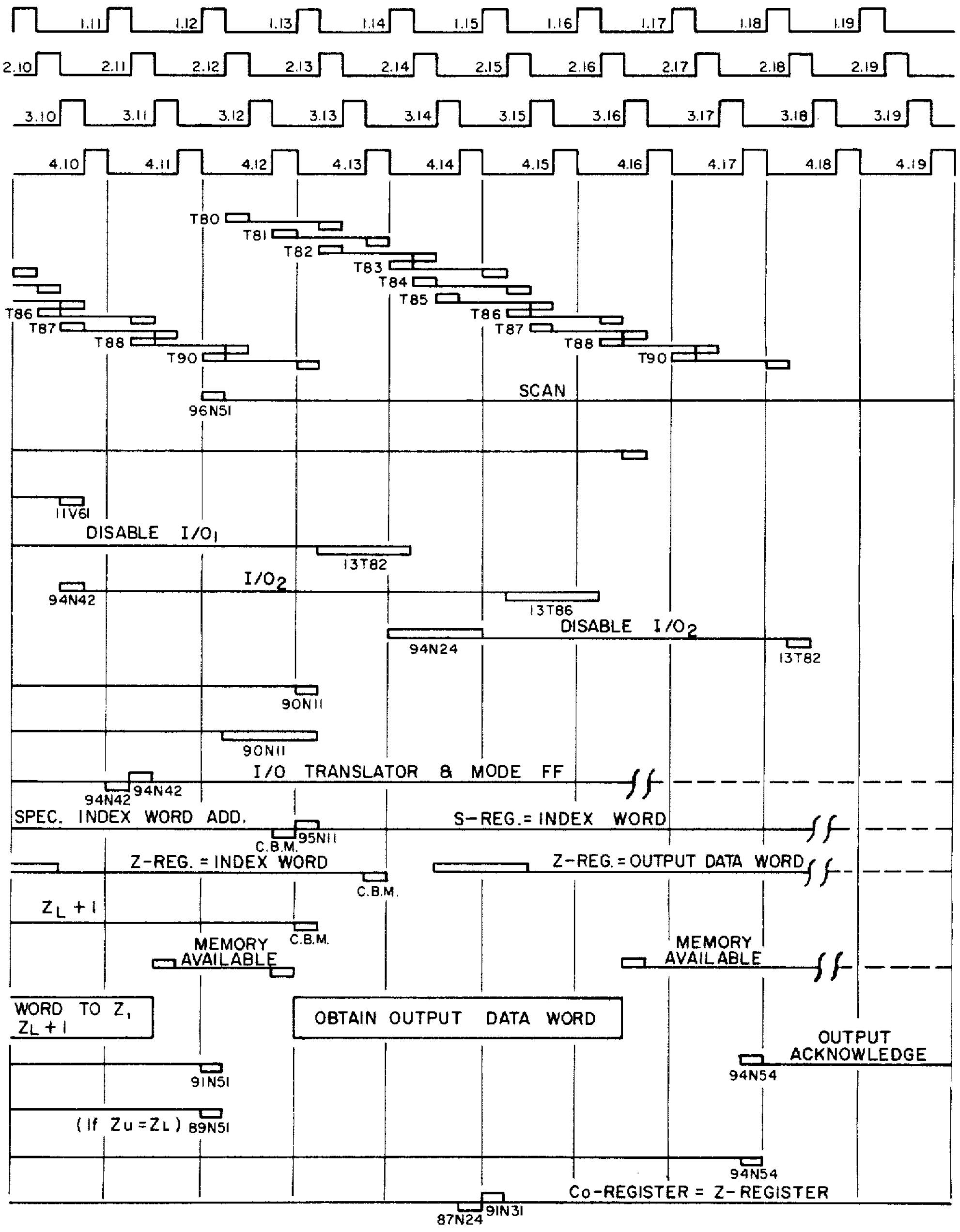
Figure 17A:
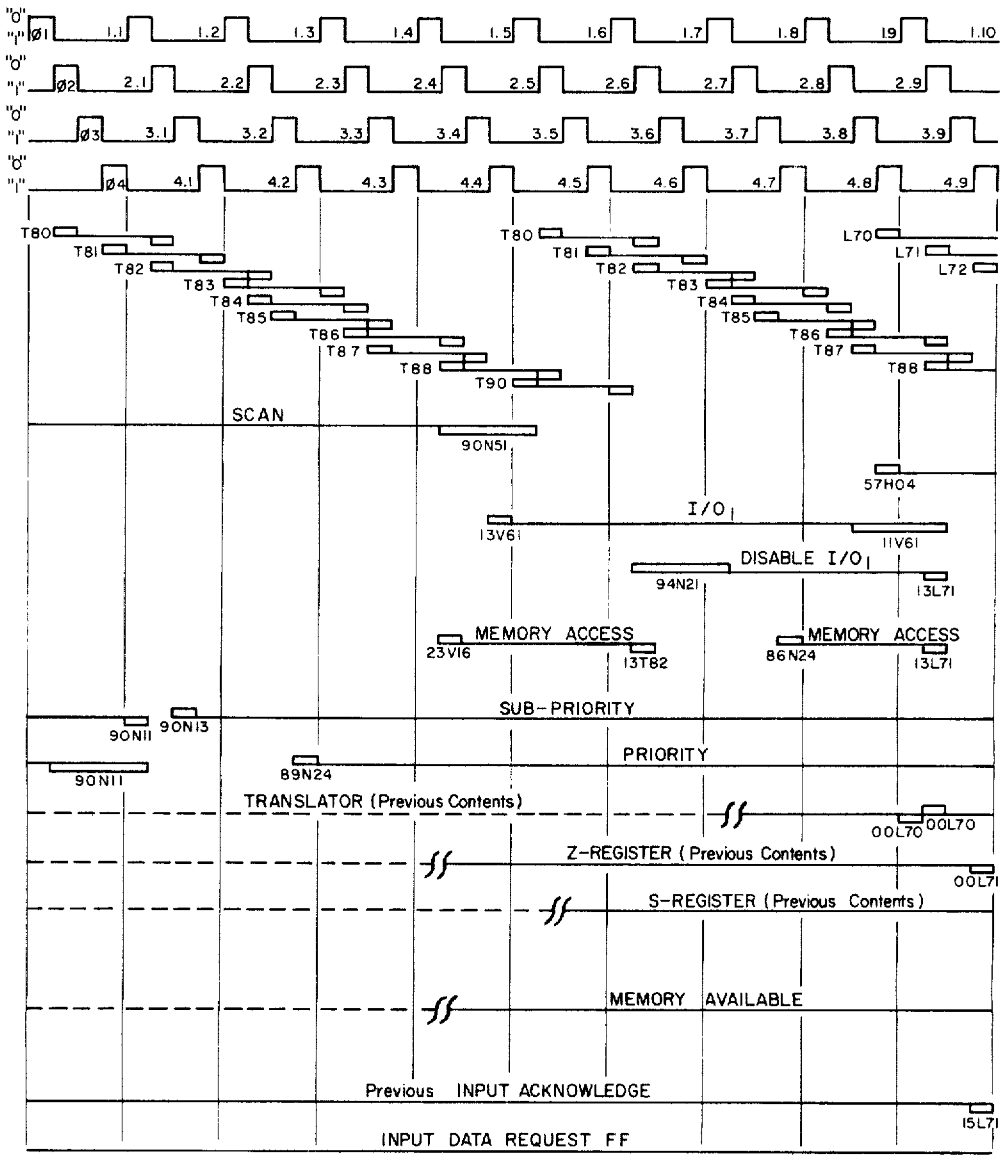
Figure 17B:
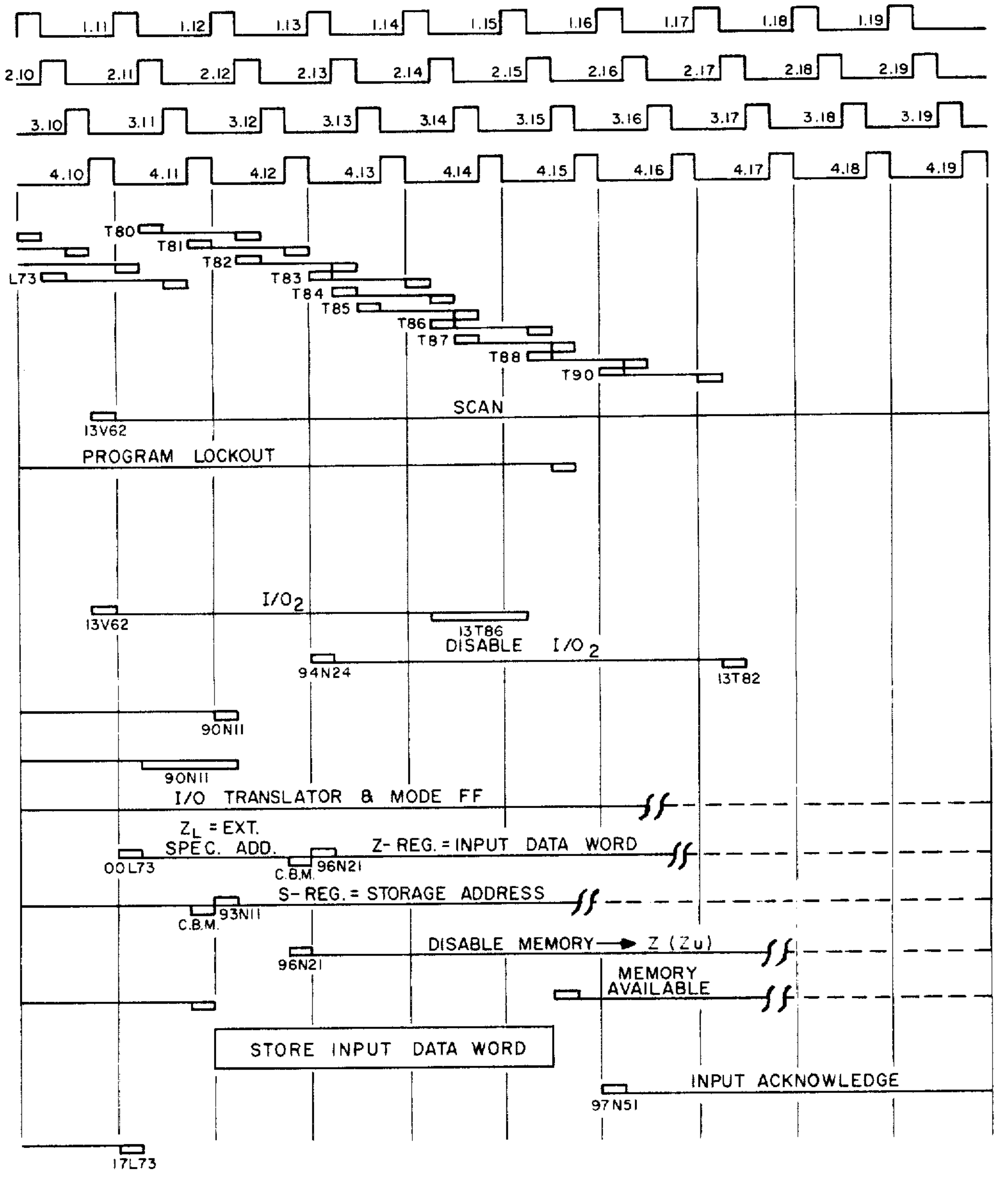
Figure 18A:
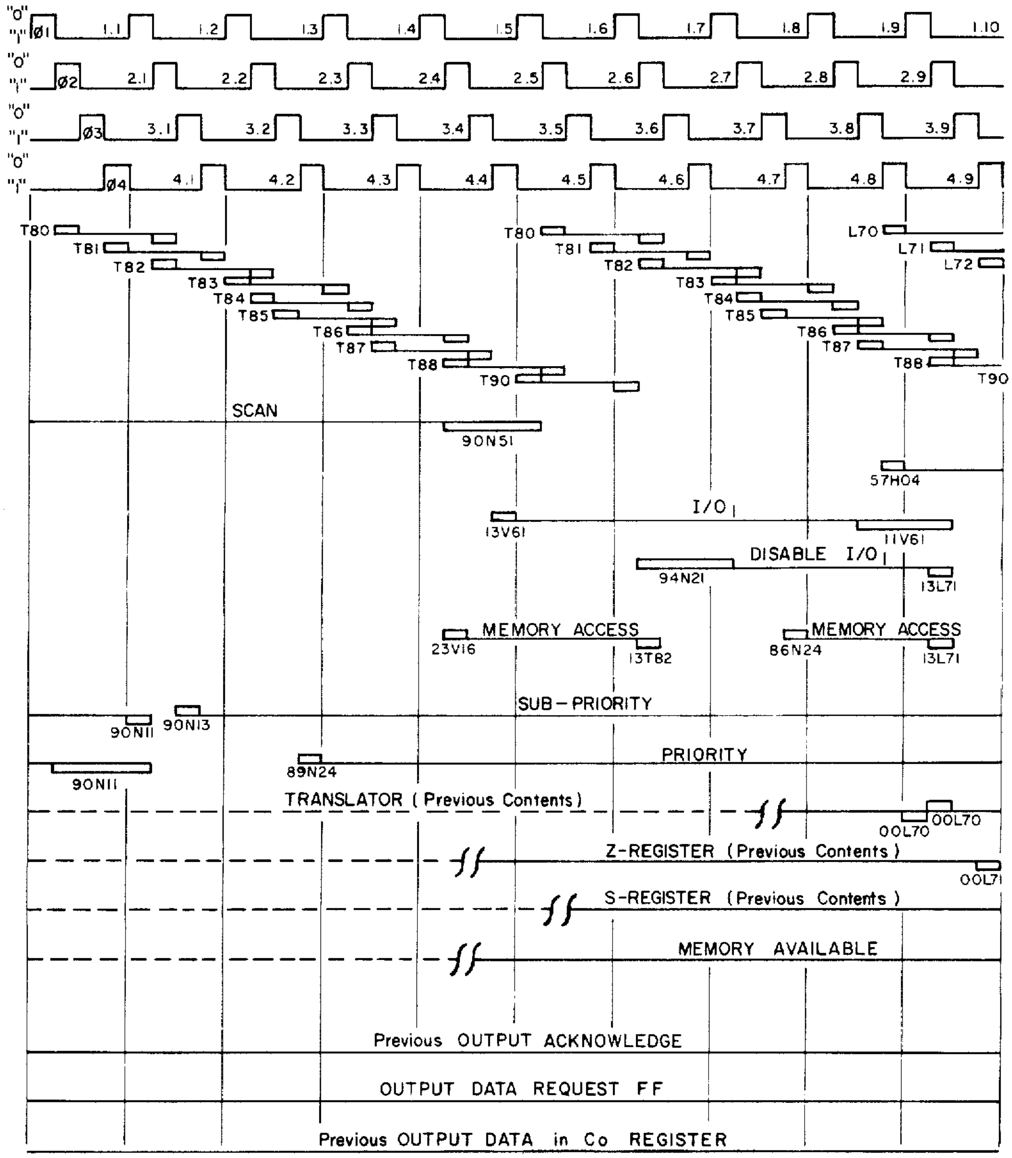
Figure 18B:
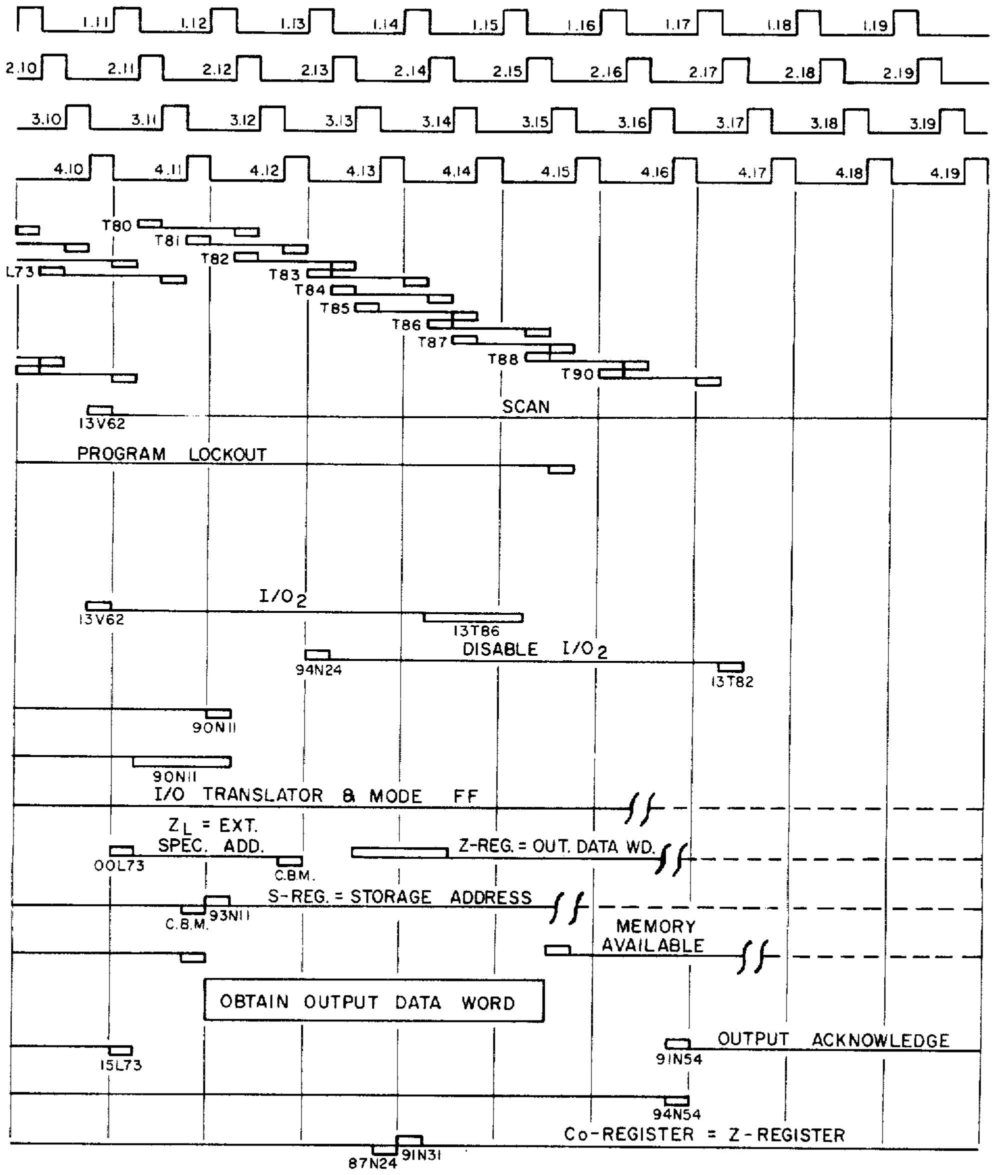
Figure 19:
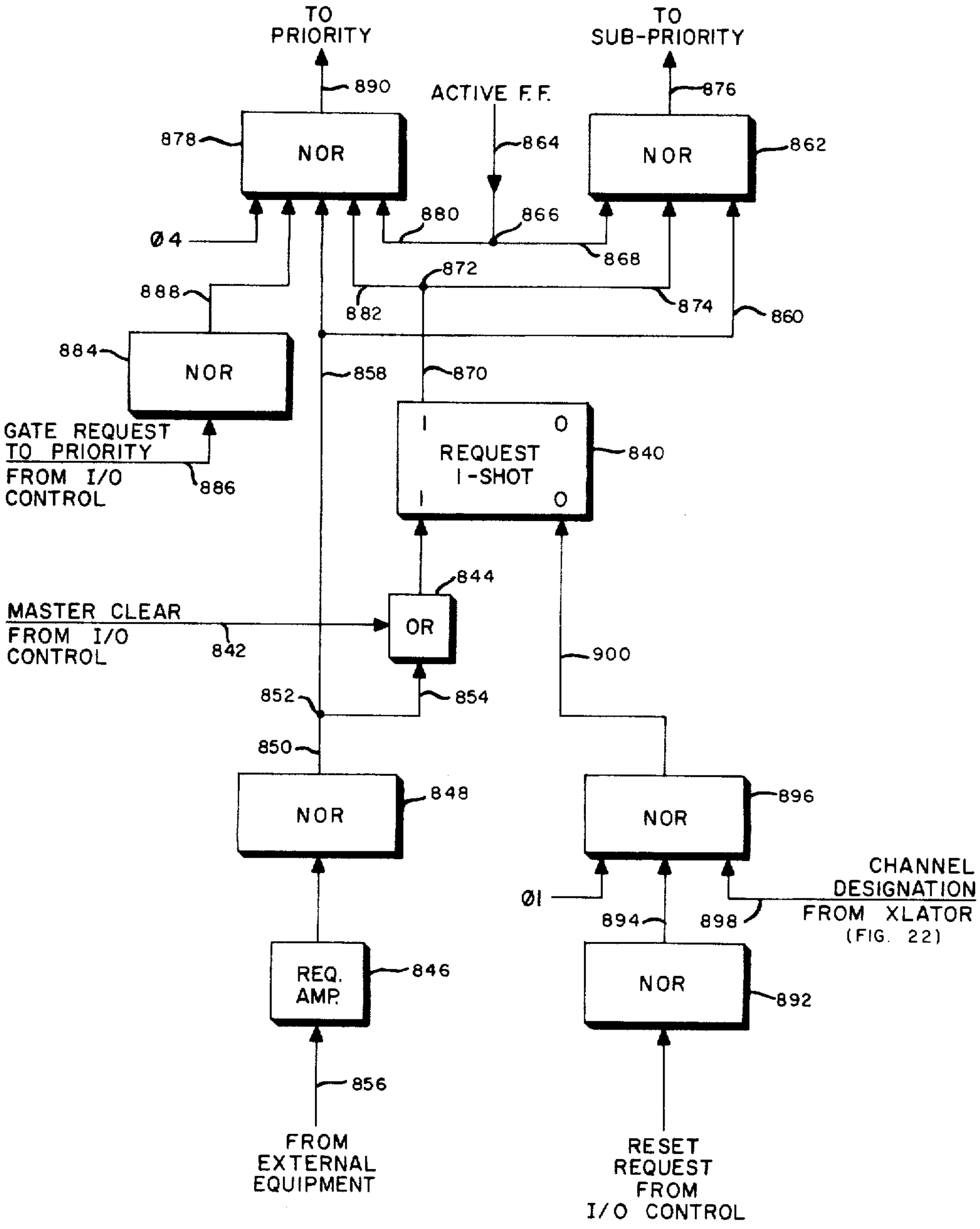
Figure 20A:
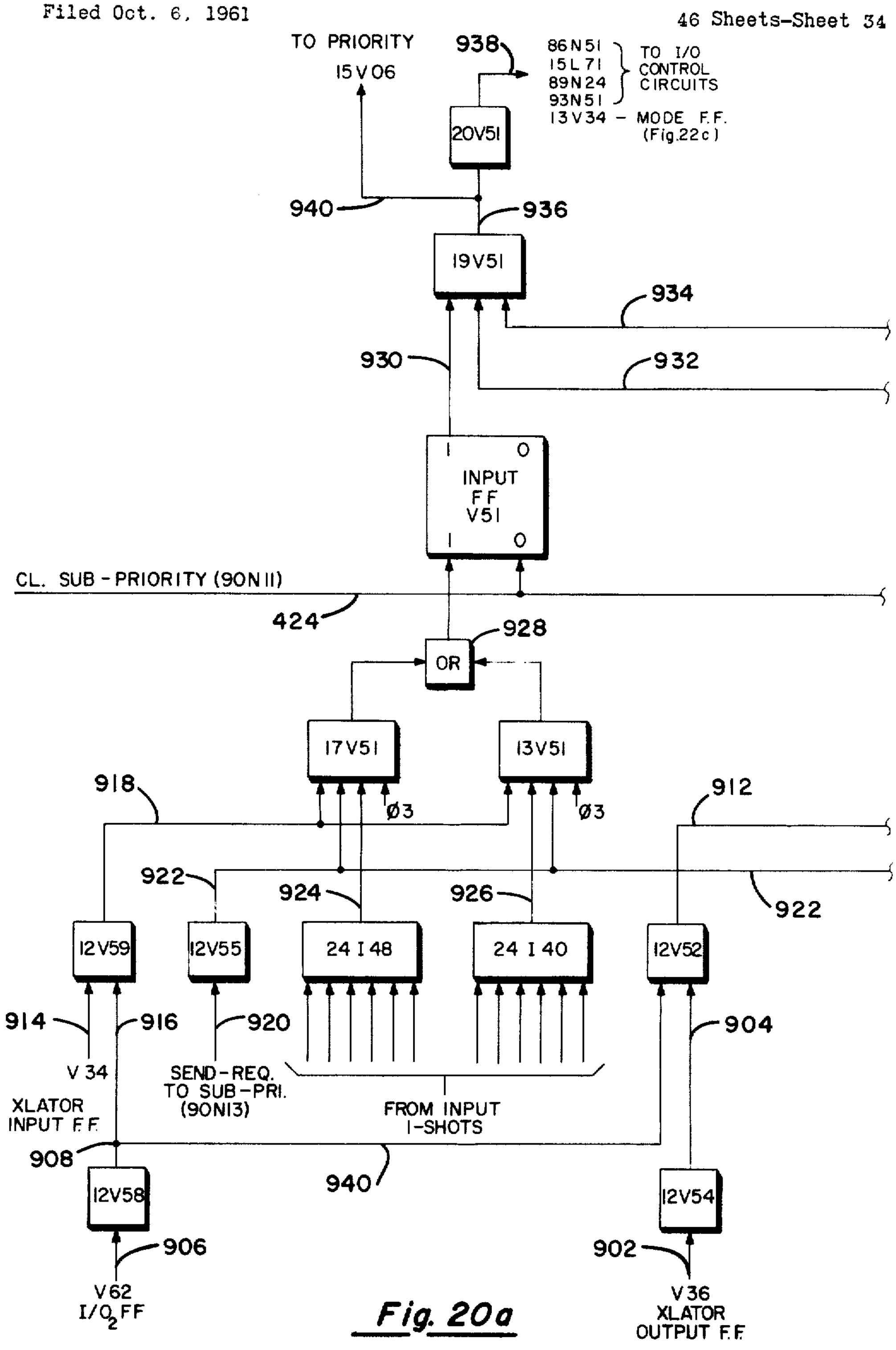
Figure 20B:
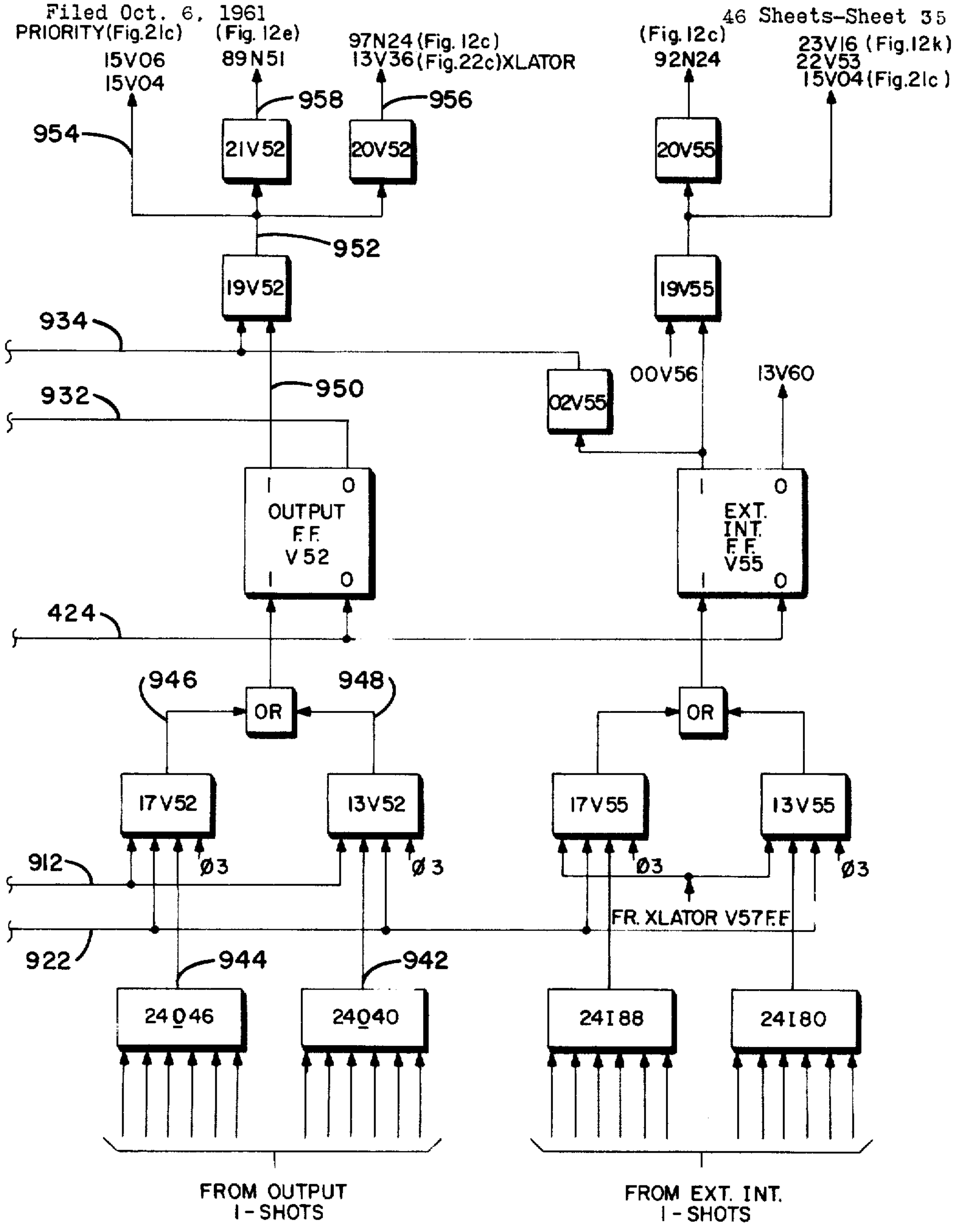
Figure 21A:
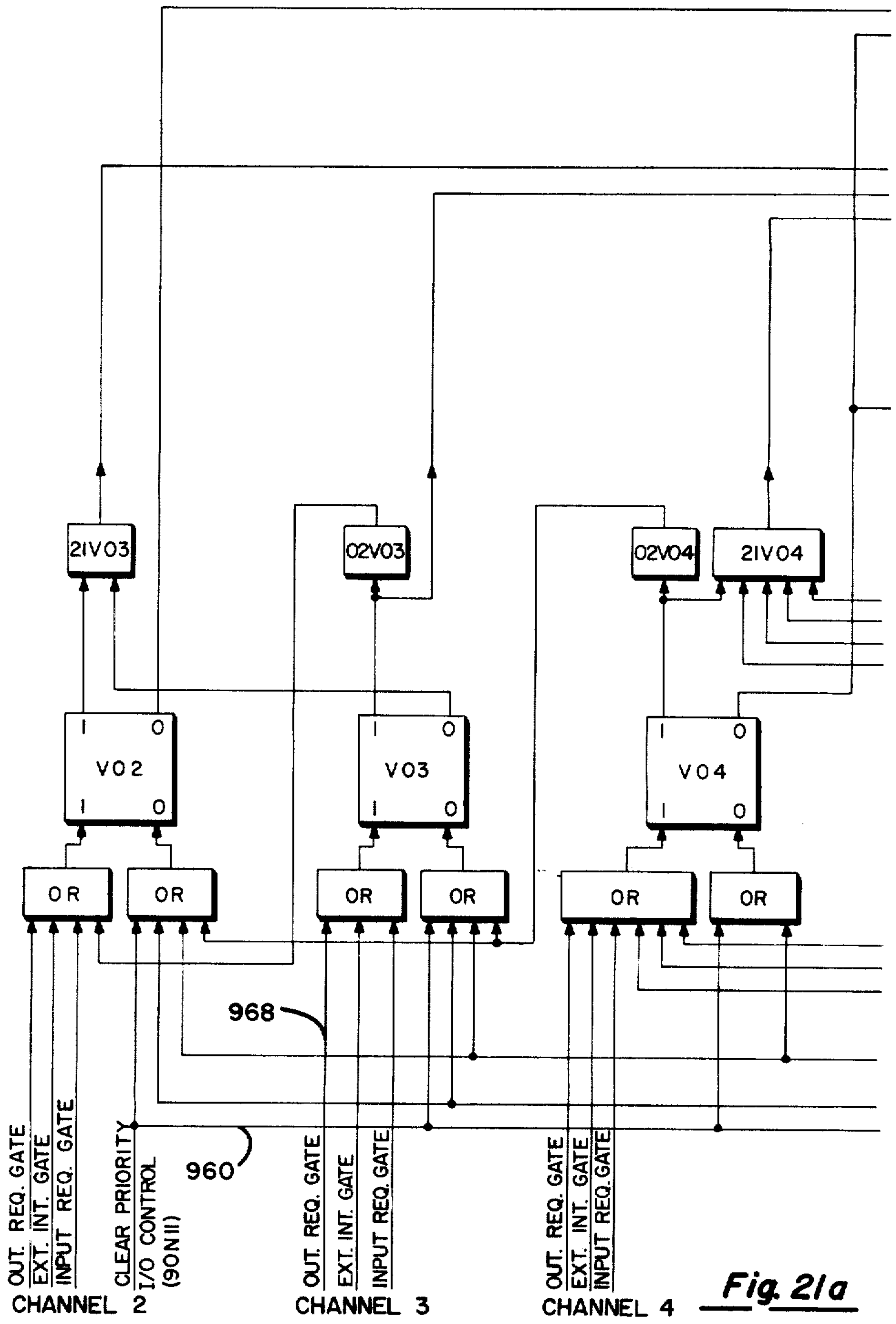
Figure 21B:
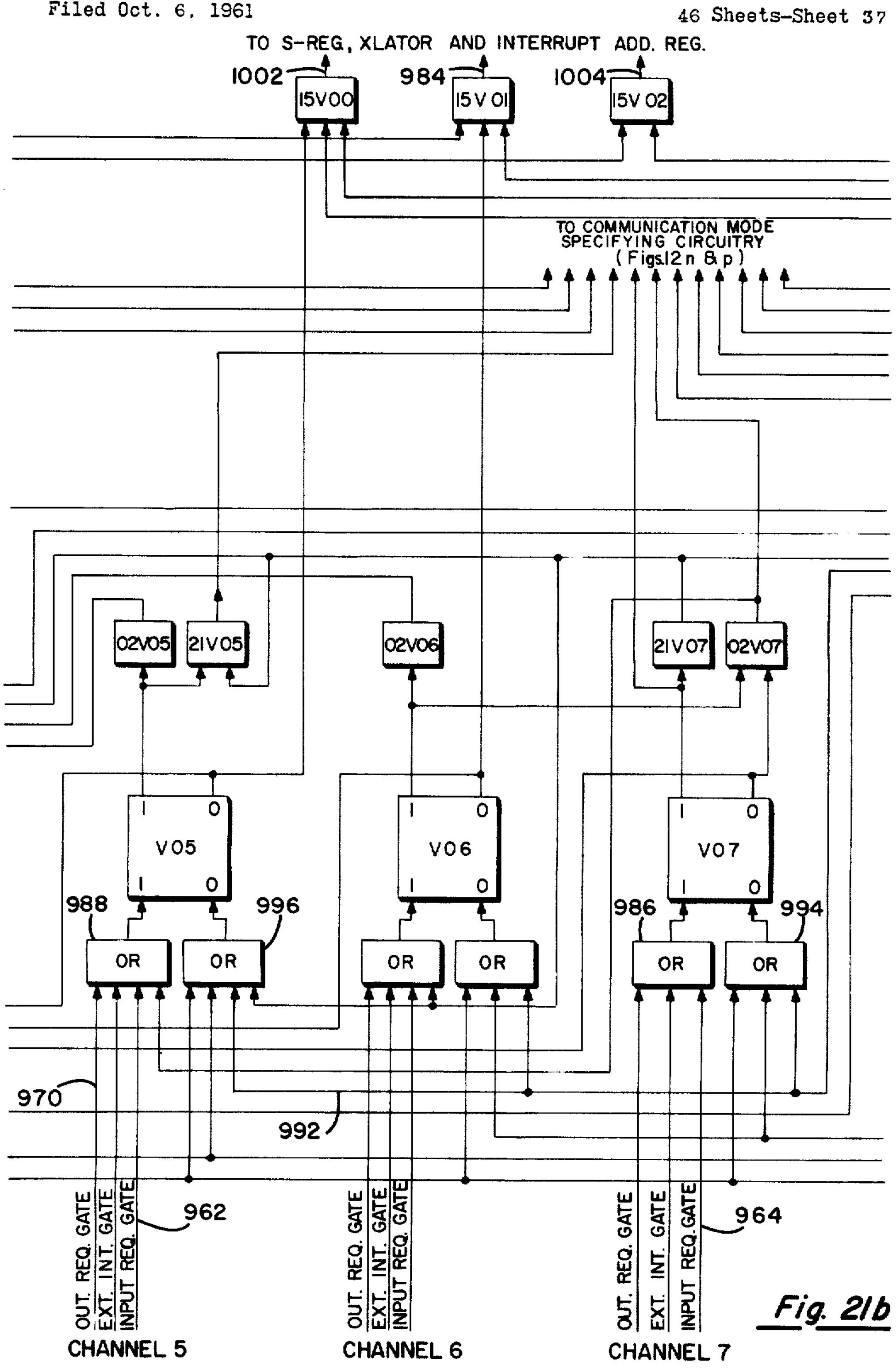
Figure 21C:
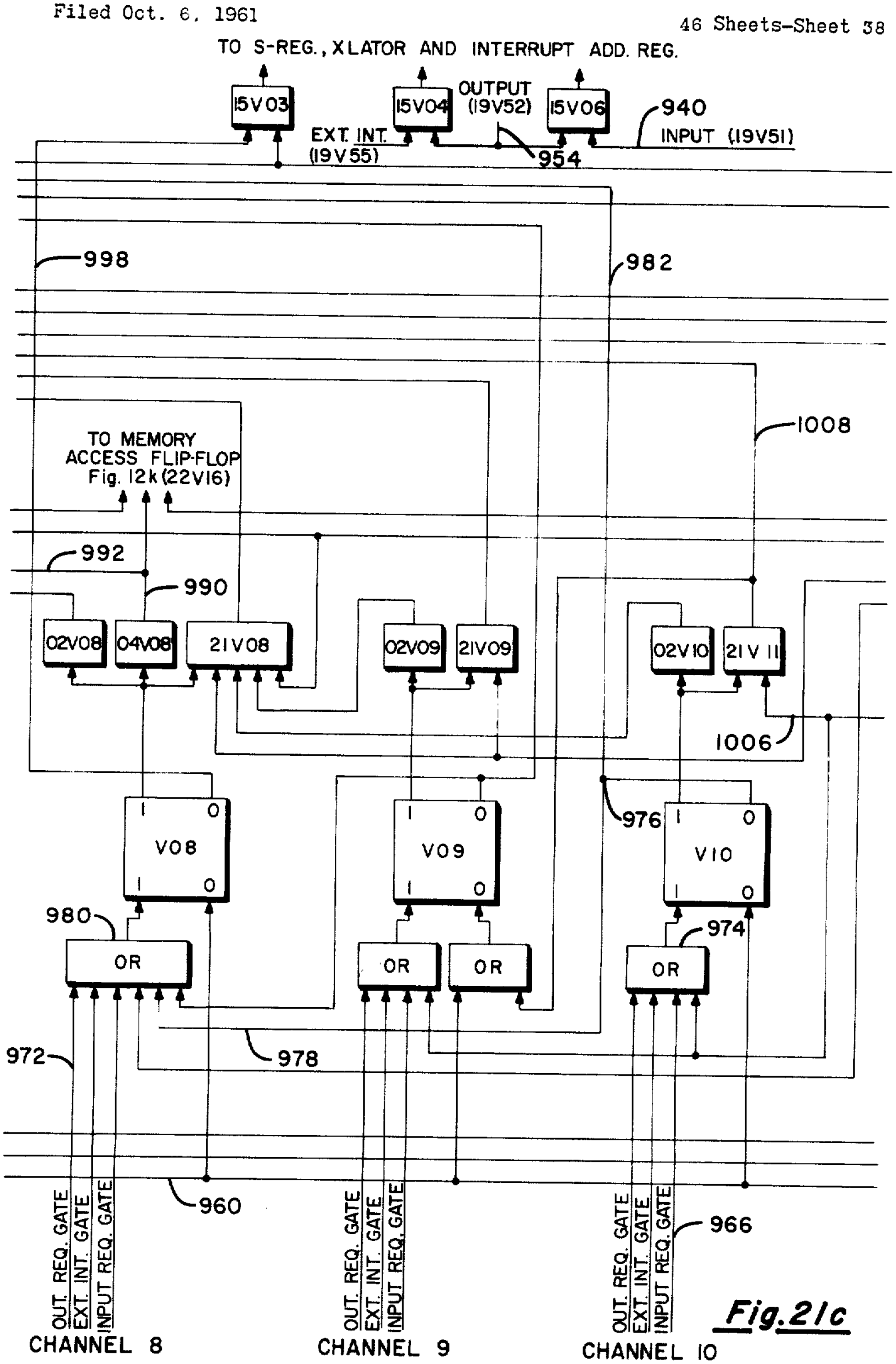
Figure 2I:
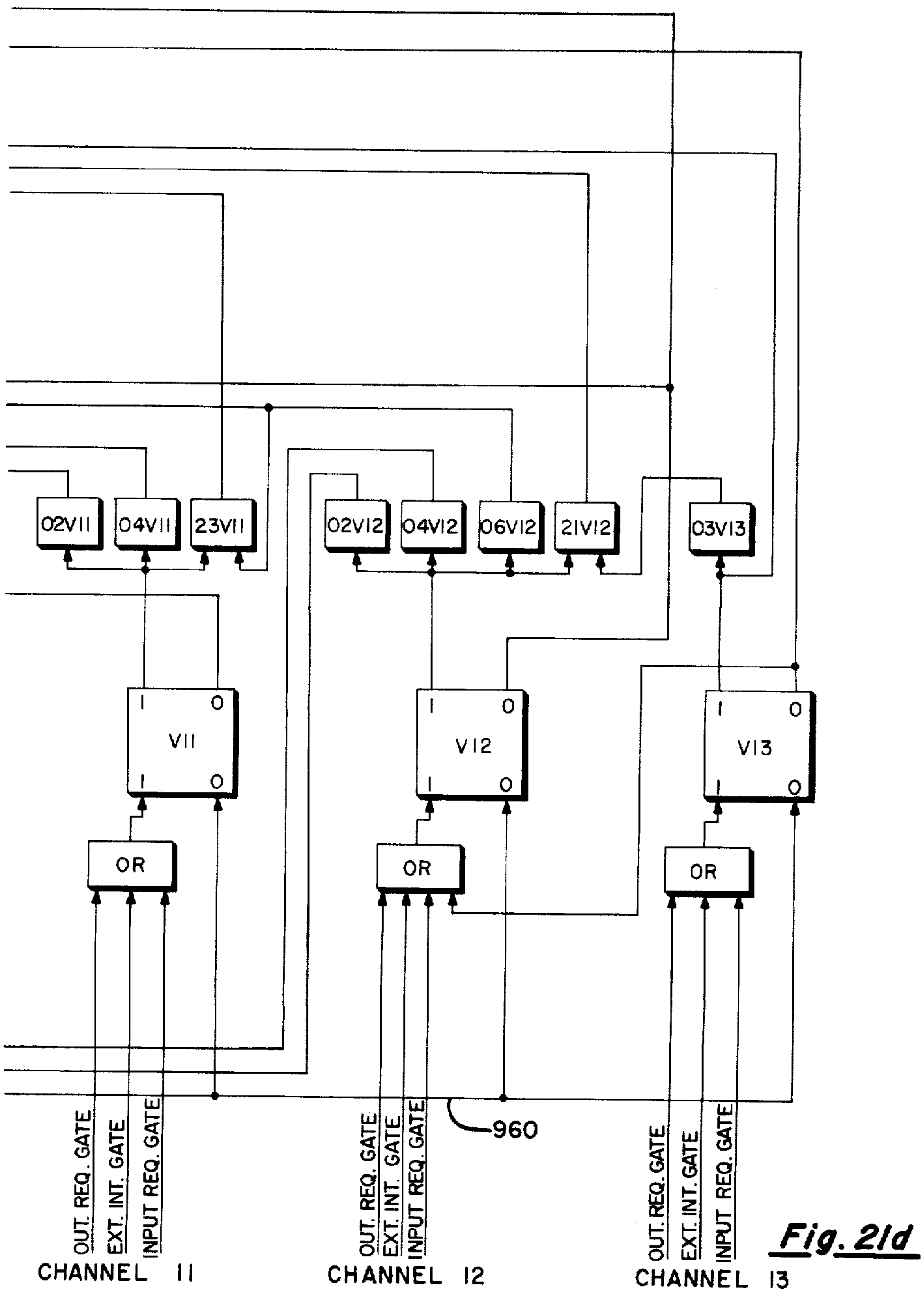
Figure 22A:
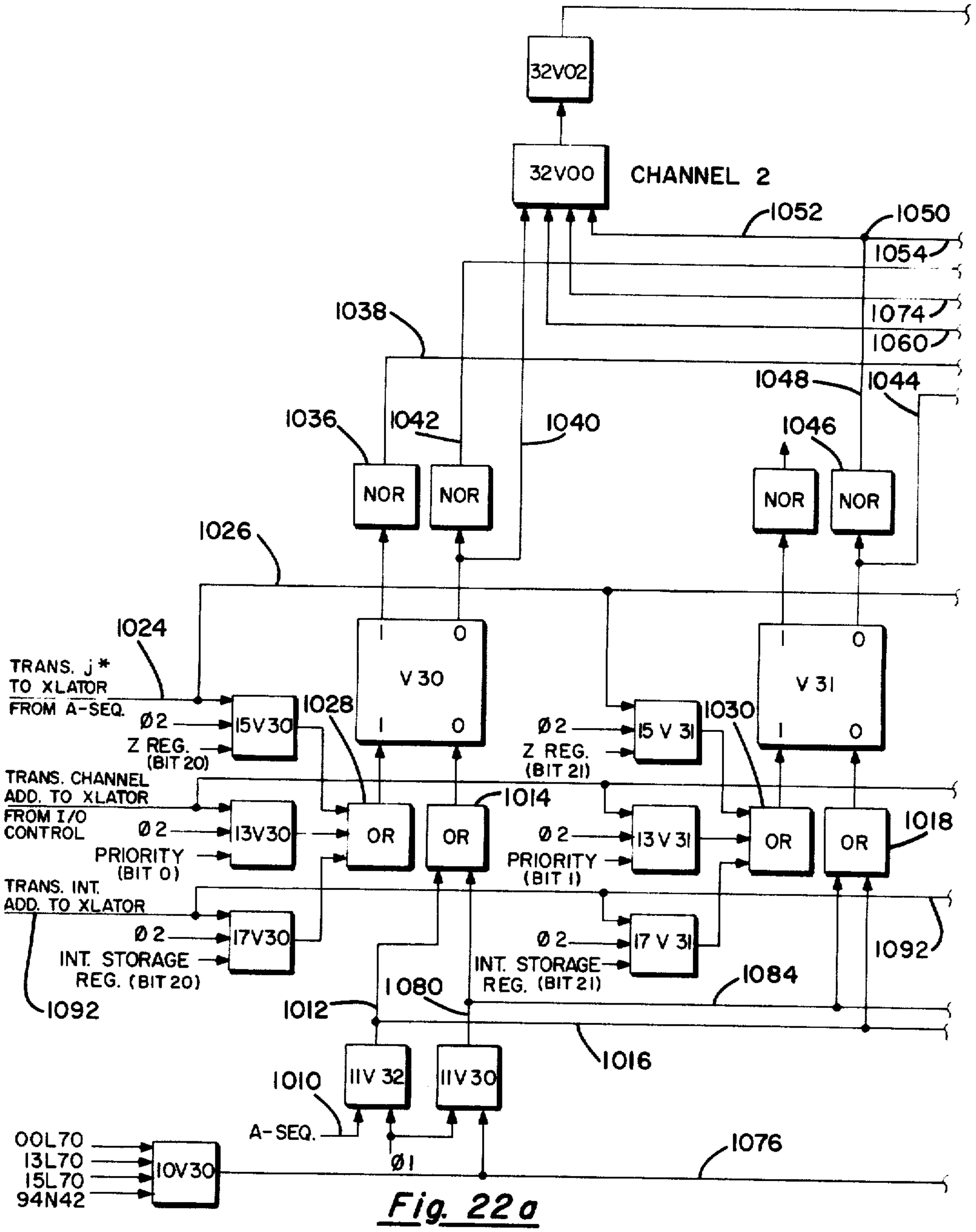
Figure 22B:
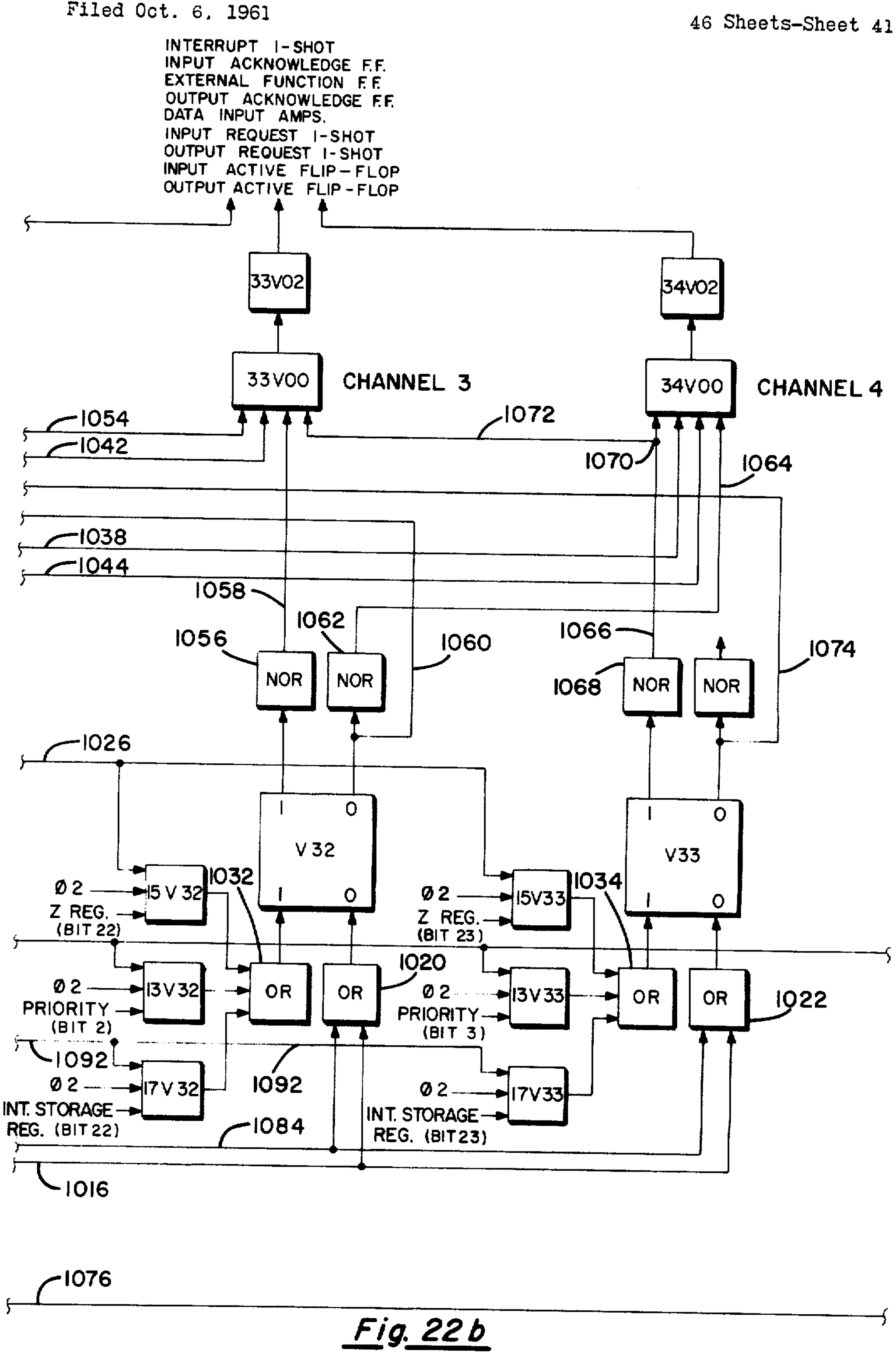
Figure 22C:
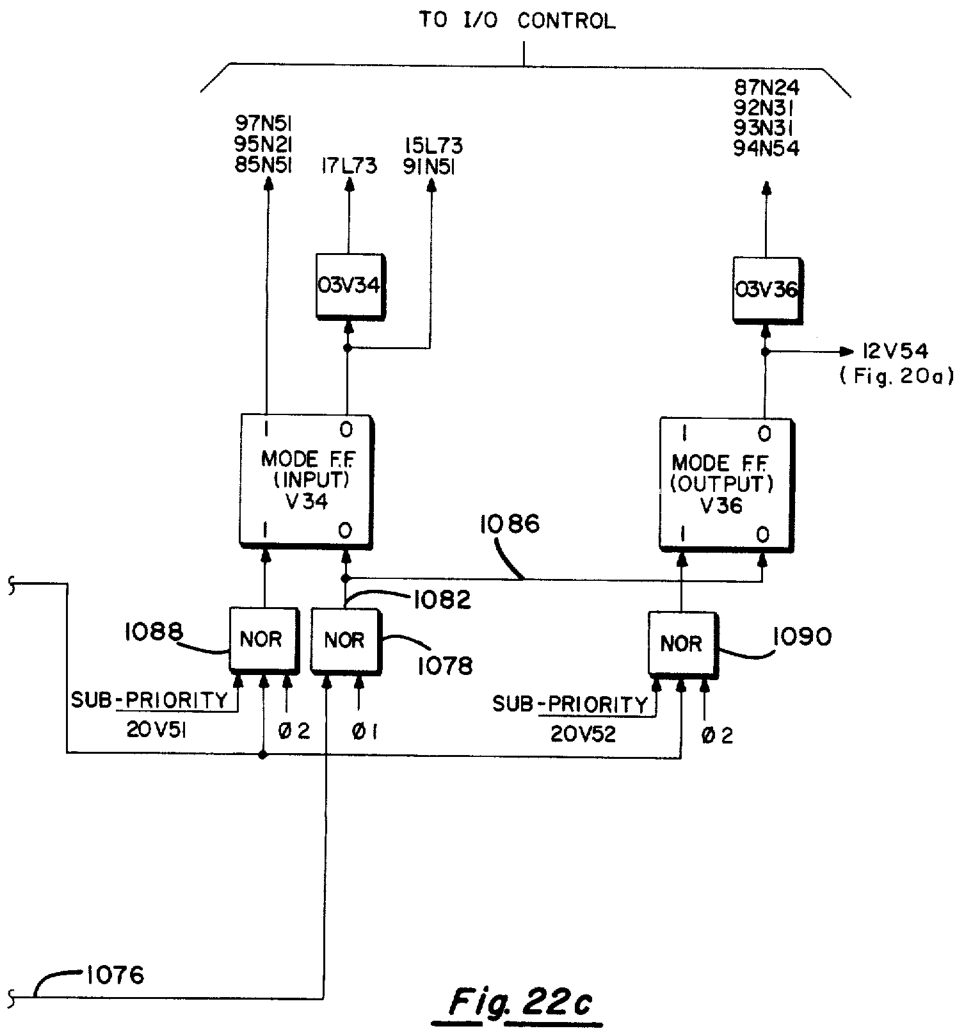
Figure 23:
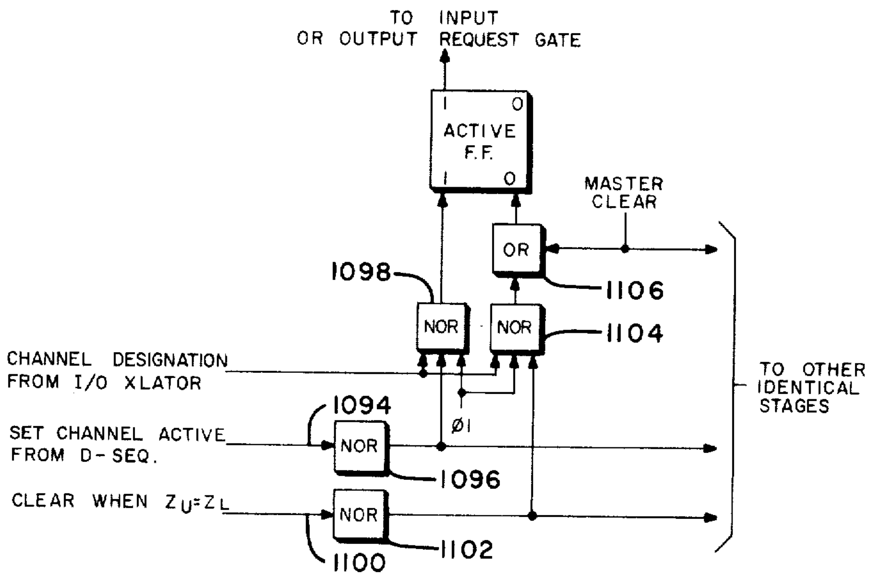
Figure 25:
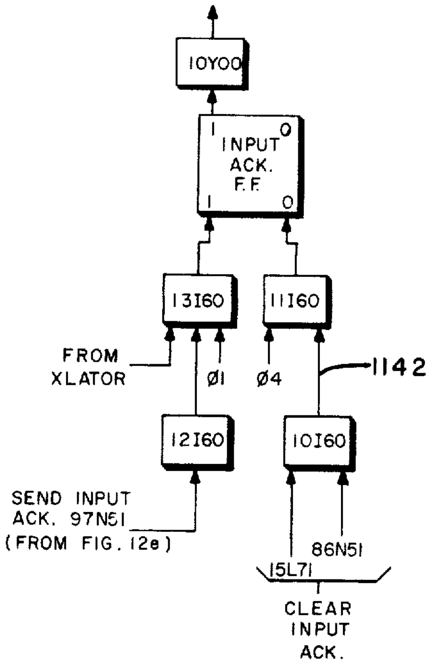
Figure 27:
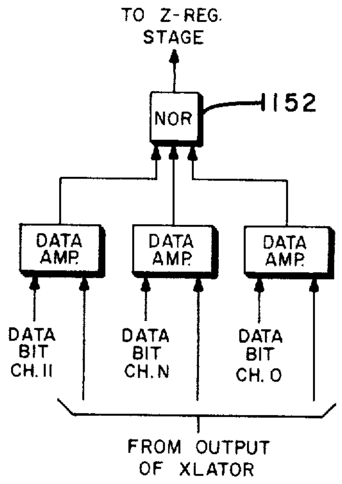
Figure 24:
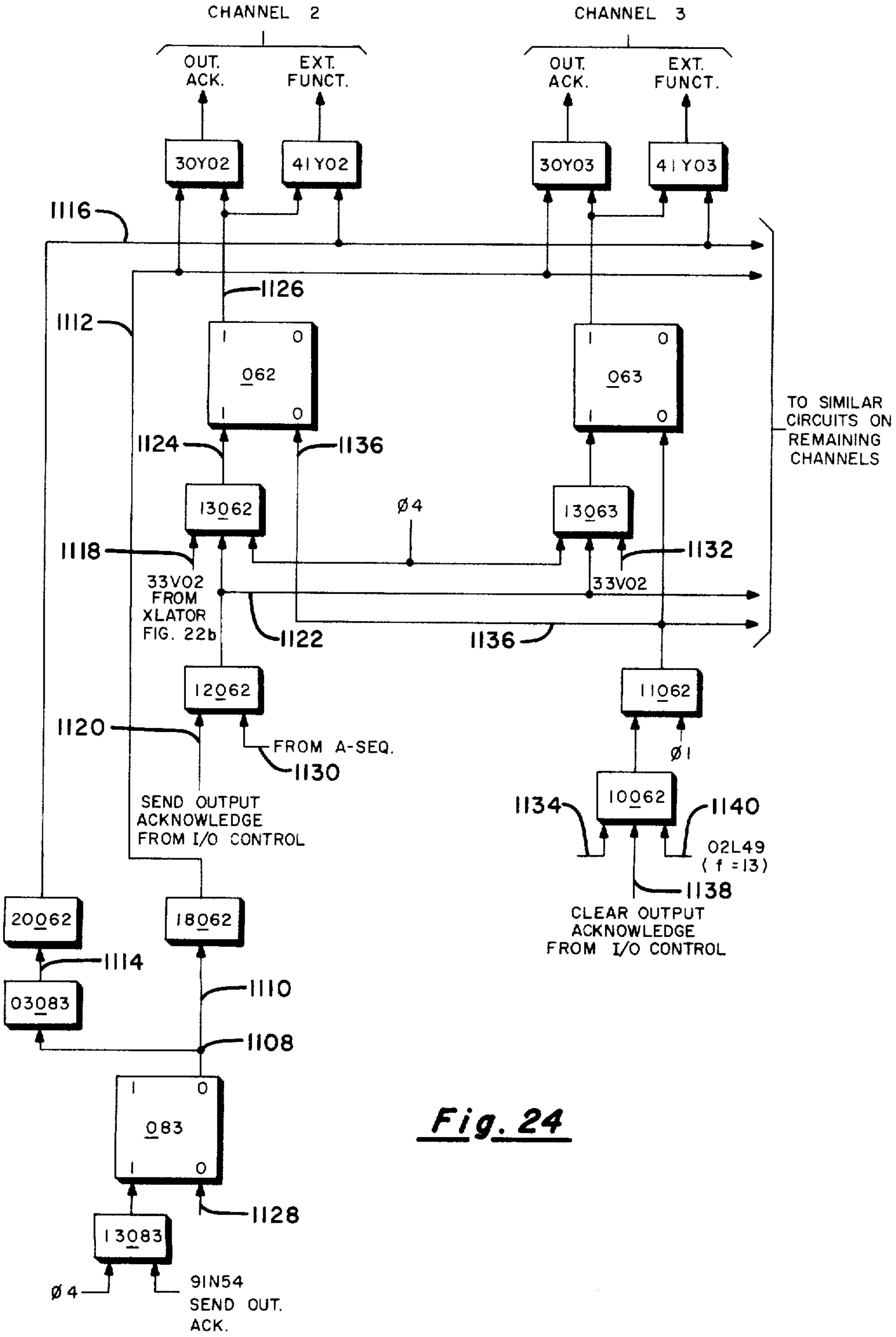
Figure 26:
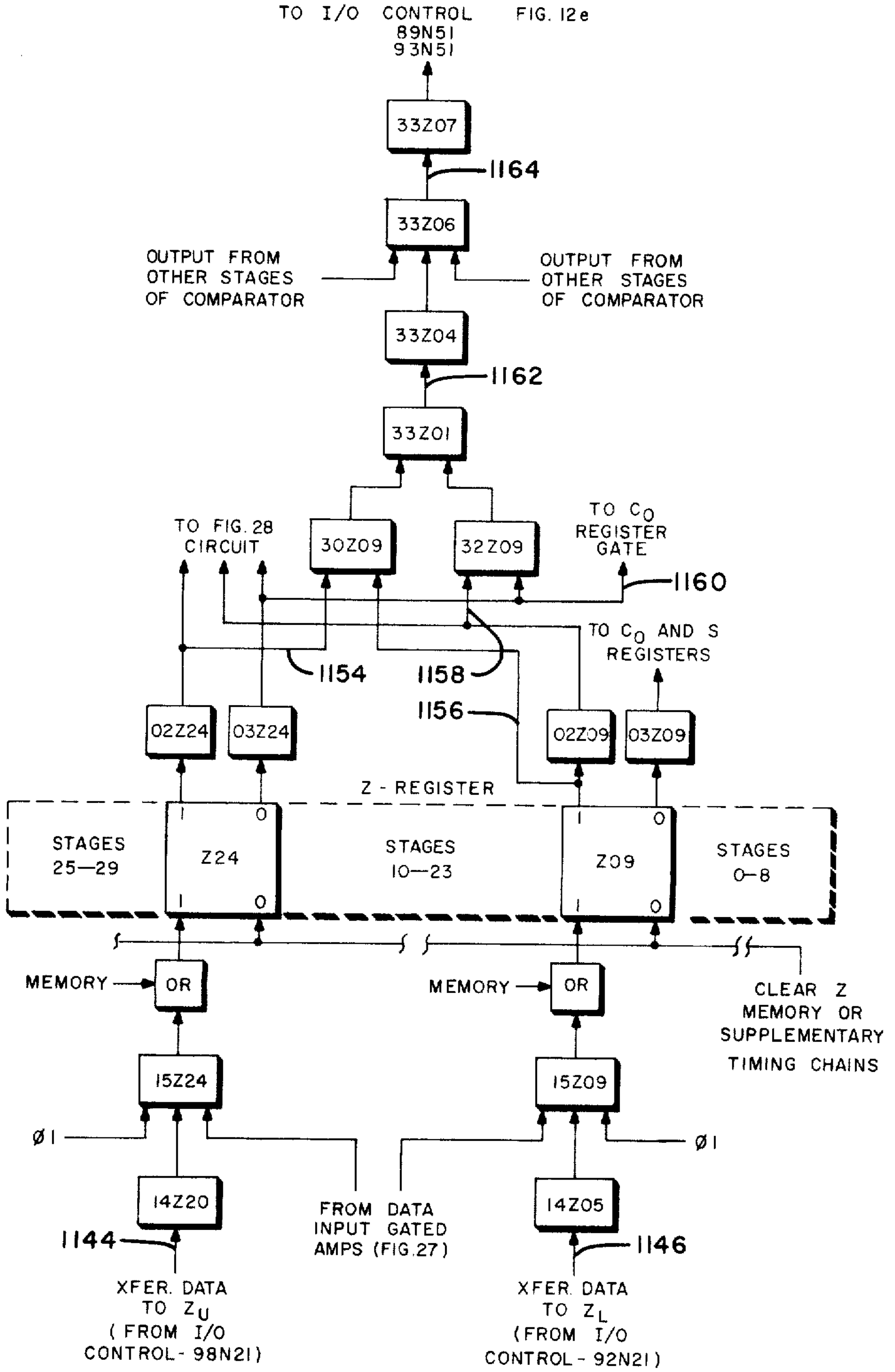
Figure 28:
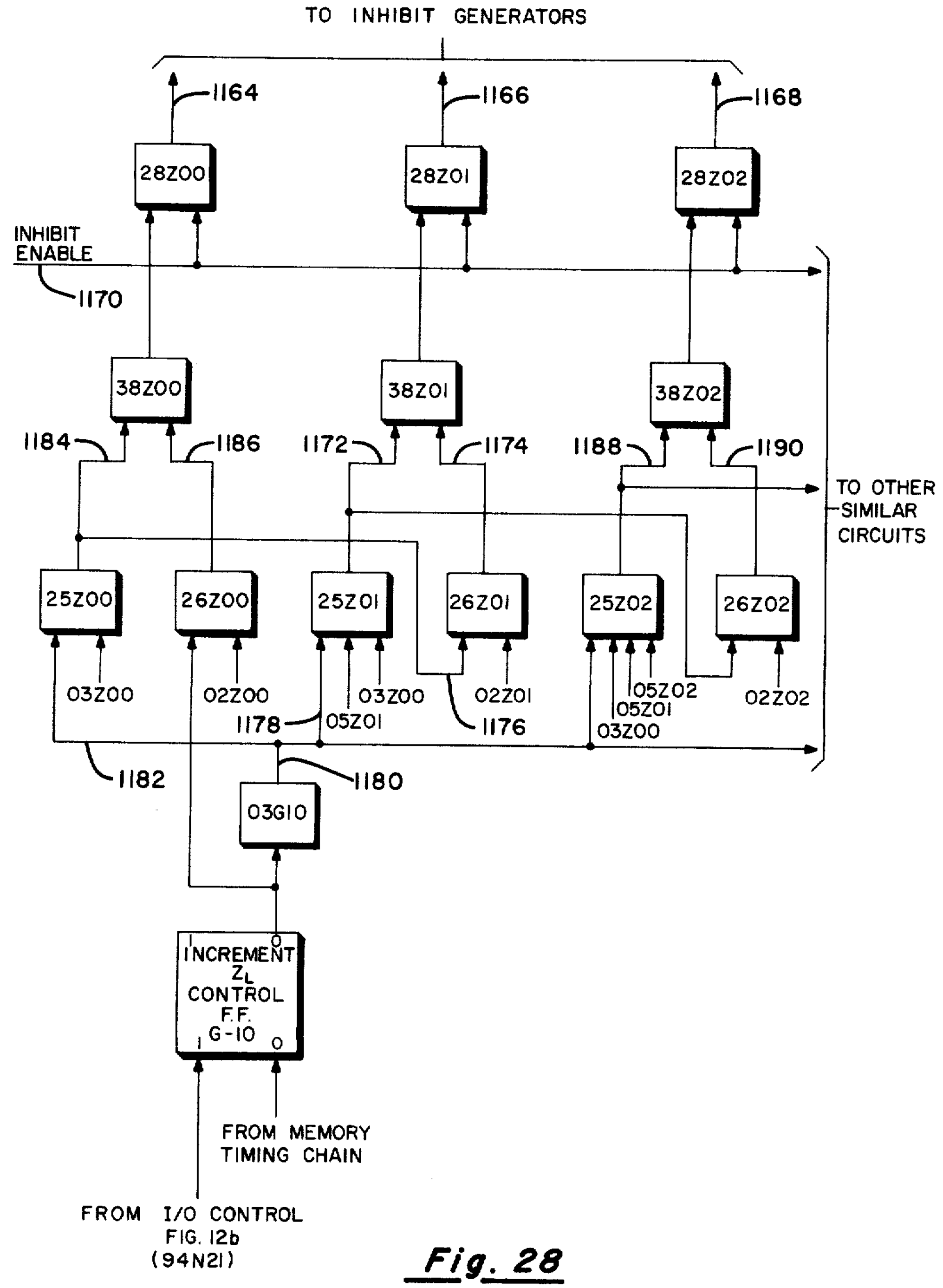

FIGS. 4*a*–4*c* illustrate diagrammatically the chief components or circuits of the input-output section of the computer;

FIG. 5 illustrates the manner in which the drawings of FIGS. 4*a*–4*c* should be arranged to form a composite circuit;

FIG. 6 shows the symbol used to represent a NOR circuit, the basic building block of the present invention;

FIG. 7 illustrates a truth table for a NOR logic block;

FIG. 8 illustrates the schematic diagram of an electronic circuit which may be used to implement NOR type logic;

FIG. 9 shows the manner in which two of the NOR circuits of FIG. 6 may be interconnected to obtain a bistable device or flip-flop;

FIG. 10 illustrates the symbol employed herein for representing a flip-flop;

FIGS. 11*a* and 11*b* illustrate the timing diagrams for the input-output control circuits when operating in the INTERNALLY SPECIFIED INDEX input mode;

FIGS. 12*a*–12*p* when arranged in the manner shown in FIG. 13 illustrate in logical block diagram form the input-output control circuits of a computer;

FIG. 13 shows the manner in which the views of FIGS. 12*a*–12*p* should be arranged to present a composite picture;

FIGS. 14*a* and 14*b* illustrate the timing diagrams when the system is operating in the INTERNALLY SPECIFIED INDEX output mode;

FIGS. 15*a* and 15*b* are timing diagrams for the system when operating in the EXTERNALLY SPECIFIED INDEX input mode;

FIGS. 16*a* and 16*b* illustrate the timing diagrams for the system when operating in the EXTERNALLY SPECIFIED INDEX output mode;

FIGS. 17*a* and 17*b* are timing diagrams for the apparatus when operating in the EXTERNALLY SPECIFIED ADDRESS input mode;

FIGS. 18*a* and 18*b* are timing diagrams for the apparatus when operating in the EXTERNALLY SPECIFIED ADDRESS output mode;

FIG. 19 illustrates in logical block diagram form a typical circuit for handling incoming request signals from the peripheral equipment;

FIGS. 20*a* and 20*b* when placed side by side present in logical block diagram form the sub-priority network;

FIGS. 21*a*–21*d* when placed side by side show a composite view of the logical block diagram of the priority network utilized in the input-output section of the computer;

FIGS. 22*a*–22*c* show the arrangement of logical blocks for implementing the input-output translator;

FIG. 23 shows by means of logical blocks the manner in which the active flip-flops, either input or output, are implemented;

FIG. 24 illustrates the manner in which the basic logical blocks may be interconnected to implement the output acknowledge and external function flip-flop circuits;

FIG. 25 is a logical block diagram of the input acknowledge circuit;

FIG. 26 illustrates in block diagram form a simplified logical schematic of the Z-register and Z-register comparator employed in the computer of the present invention;

FIG. 27 is a logical block diagram of the data bit gated amplifiers shown as block 54 in FIG. 2; and, FIG. 28 illustrates the logic circuitry employed for incrementing the contents of the Z-register before it is restored back into the memory of the computer.

INTRODUCTION

Figure 1:
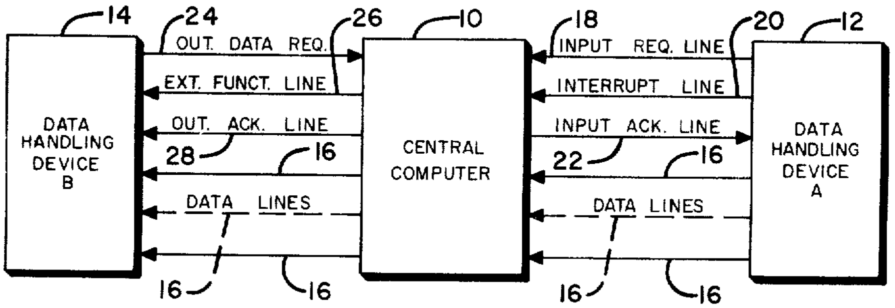
FIG. 1 is a simplified schematic block diagram of a communication system constructed in accordance with the principles of this invention.

FIG. 1 shows in block diagram form a central computer 10 having a first data handling device 12 connected to one of its input channels, and a second data handling device 14 connected to one of its output channels. In the communication system of which this specification is concerned, communication with the central computer 10 is carried on in a 30-bit parallel mode. In other words, information is presented to the computer or transferred from the computer in the form of words which are represented by binary signals appearing simultaneously on 30 data lines. It should be understood, however, that the word size need not necessarily be limited to 30 bits and that either a larger or smaller word size may be employed without departing from the spirit of this invention. The computing system of the preferred embodiment is provided with 12 input channels and 12 output channels. Each input and each output channel has its own cable associated with it and each cable has 30 data lines plus a requisite number of control lines. As shown in FIG. 1, a typical input cable for connecting the data handling device 12 to the central computer has three control lines, 18, 20 and 22. Control line 18 is termed the "Input Request" line. When the computer notes the presence of a signal on this line, it is advised that a peripheral device on this channel wishes to transfer information to the computer along its data lines 16. After the computer has responded to this request, accepted the data from the peripheral device 12, and stored it in its memory section, it sends out a signal along control line 22 termed an "Input Acknowledge" signal. This signal advises the data handling device 12 that the computer has accepted the data and that new information can henceforth be placed on the lines 16.

The control of peripheral equipment external to the central computer is carried out with the use of "function words" and "interrupt words." Interrupt words are generated and sent by the peripheral equipment to the computer on the input data lines 16. By this means, the external equipment informs the computer of such things as the operating status of the peripheral device or its desire to initiate or terminate a data transfer. An interrupt word is distinguished from a data word by activating the "External Interrupt" control line 20. The activation of this line causes the computer program to jump unconditionally to an address in memory associated with the particular channel in question, where it will begin a sub-routine to analyze the interrupt word and take appropriate action.

When the data handling device 14 connected to the output channel of computer 10 wishes to accept data from the computer, it presents an "Output Data Request" signal to the computer on control line 24. Detecting the presence of this signal, the computer takes the information from the memory and places it on the output data line 16. It then outputs a signal on the "Output Acknowledge" line 28 to inform the peripheral device that the data on the lines 16 is ready for sampling. The peripheral equipment then detects this Output Acknowledge and samples the data lines to accept the data word. After acceptance, the peripheral device 14 drops the Output Data Request signal from line 24 which, in turn, causes the computer to drop the "Output Acknowledge" signal and the data signals from the lines 28 and 16 respectively.

As mentioned previously, the control of the peripheral equipment is carried out with the use of Function words and Interrupt words. Function words sent to the peripheral equipment on the Output data lines 16, are the means by which the computer program controls its peripheral equipment. A function word is distinguished from data words by activating the external function control line 26. The function word is translated into a discrete set of actions by the peripheral device. The use of program generated function words rather than computer instructions to control the peripheral equipment makes the computer logic independent of the characteristics of any input-output device. This is an inherent advantage in the system of the present invention.

The manner in which the computer 10 and the peripheral devices 12 and 14 are effective to establish communication with one another will be described fully hereinbelow. The foregoing functional description has been included at this point merely for the purpose of defining terms which will be used throughout the specification.

FIG. 2 illustrates in block diagram from the main sections of the central computer employed in the communication system of the present invention. As is well known, a digital computer can generally be broken down into four major sections, namely, the Control section, the Input-Output section, the Storage or Memory section, and the Arithmetic section.

The Control section of the computer in FIG. 2 is enclosed by the dashed line 30 and consists of those registers and circuits necessary to procure, modify and execute instructions of the program. The main register of the Control section is the instruction register termed the U-register. Since the basic word size employed by the computer of this invention is 30 bits, the complete U-register is also 30 bits. For reasons which will become apparent, the U-register is divided into two sections 32 and 34, each 15 bits in length. Instruction words are obtained from the storage section of the computer under control of the storage address register or S-register 36 and are loaded into the instruction register, where they are retained during the execution of an operation.

This invention is concerned with a computing device of the stored program type and hence, once the program is written and coded in acceptable form, it is entered into the storage section of the computer. From this point on, the computer, upon proper initiation, will execute the series of instructions making up the program. The instructions of the program are generally stored in the memory in a sequential manner, so that the computer will first execute the instruction whose address has initially been set up in the program address counter or P-register 38. It then proceeds in a step-by-step manner to the highest address. The modifier box 40 is included to indicate that as each instruction is executed, the address of the current instruction is incremented by "0" in the case of a repeat, by "1" in cases where the execution of instructions is to take place in sequential order, and by "2" in the case where a jump instruction is desired.

Figure 3:
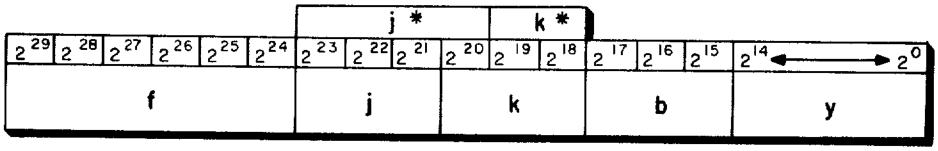
FIG. 3 is a diagram illustrating the bit assignments of a typical instruction word employed by the computer of the present invention.

In FIG. 3 there is shown the format of the instruction word employed with the apparatus of the present invention. As can be seen from this figure, the instruction word is comprised of five sections termed "designators," namely, the *f, j, k, b* and *y* designators. The *f*-designator which is normally 6 bits in length, indicates the particular instruction to be executed such as Add, Substract, etc., while the *j, k, b* and *y* designators allow modification of the basic instruction specified by the *f*-designator. For most instructions, the length of the *j*-designator is 3 bits and is used in the majority of the instruction for JUMP, and SKIP determination, for instruction operand modification selection, and for repeat status interpretations. However, when the computer is executing an input-output type instruction, the *j* designator is denoted by the symbol *j** and is 4 bits in length rather than 3, borrowing one bit from the *k*-designator. The 4 bits of the *j**-designator are sufficient to uniquely identify the particular one of a plurality of communication channels over which the input or output information transfer is to be made. The *k* (or *k** in the case of Input-Output instructions) designator controls the interpretation of the operand. The *b*-designator appears in bit positions 17, 16 and 15 of the instruction word and specifies which one of registers 42, labeled B–1 through B–7, will be used to modify the operand designator, *y*.

As can be seen from FIGS. 2 and 3, the upper half of the instruction register 32 will contain the *f, j* or *j**, *k* or *k** and *b*-designators whereas the lower half of the instruction register 34 will contain the operand *y*. The control translator 44 is connected to the output of the upper half of the U-register 32. It examines both the function code designator, *f*, and the various execution modifiers to produce the proper command enable signal to execute the particular instruction as modified.

As mentioned previously, the registers labeled B–1 through B–7 are address modification registers. If address modification is required before the instruction is executed, the contents of a predetermined one of the B-registers (as specified by the *b*-designator) is added to the contents of the lower order 15 bits of the U-register 34 before execution. The registers 46 and 48, labeled R and R' respectively, are each 15 bits in length and function as a communication register for all internal transmissions to and from the B-registers 42.

The K-register 50 is 6 bits in length and functions as a shift counter for all arithmetic operations which involve shifting. The S-register 36 is the storage address register which holds the storage address during memory references. At the beginning of a storage access period, the address is transferred to the S-register 36. The contents of this register are then translated by the address translator contained in the storage section of the computer, the resulting signals being used to activate the appropriate memory read and write circuits.

Not shown in the Control section 30 of FIG. 2 are the various circuits required for the timing and execution of the instructions. However, the overall instruction execution is accomplished in steps, called "sequences." The major steps of the execution are: the A-sequence, during which the next instruction is obtained from memory; the B-sequence, during which the necessary data to facilitate the execution of an instruction is located and transmitted to a register in the arithmetic section of the computer; the C-sequence, during which the arithmetic computations are performed; and the D-sequence, during which the results of the arithmetic computations or data from another source are stored back into memory.

The Input-Output section—enclosed by the dashed line 52—shows those data paths and control circuits used by the computer for communicating with peripheral equipment. It includes gated amplifiers 54, one set for each of the input channels to the computer. Included within each of the blocks identified by the numeral 54 are a set of gated amplifiers equal to the number of data lines in the input cable for the particular channel. As already mentioned, in the preferred embodiment of this invention the basic word size is 30 bits, so that there is provided 30 data lines per input cable. Hence, each channel is provided with a set of 30 gated amplifiers.

Also included in the Input-Output section of the computer are priority and access control circuits indicated by the block labeled 56. The gated amplifiers are controlled by these priority and access circuits such that when two or more external devices or separate channels are simultaneously requesting a data transfer, the channel having the highest number is given priority. In addition, the priority and access control circuits function to generate, accept, and transmit the control and timing signals which must be exchanged between the computer and peripheral equipment with which it communicates. Also included in this network are means for testing the various channels to determine whether they are busy. This feature prevents the computer from attempting to communicate over a channel already in use. Furthermore, when the system is operating in the INTERNALLY SPECIFIED INDEX mode of communication, the main memory addresses referenced during a particular input or output transfer are determined by a special input-output control word. One such word is assigned to each channel. It is sufficient at this point to note that a signal dependent upon the status of the input-output control word is used by the priority and access circuits to deactivate the channel after the proper number of words have been transferred.

The Input-Output section of the computer also includes an output register 58, termed herein the $C_O$-register. This register is used for transmission to all external devices. As is illustrated in FIG. 2, the register 58 receives its input signals from the output bus 60, which is connected to the output of the Z-register located in the storage section of the computer. The data read out from the memory is initially placed in the Z-register and subsequently gated to the $C_O$-register 58 when the gates 62 are enabled by control pulses coming from the priority and access control circuit 56 via the control line 64.

Three sets of 30 amplifiers 66, 68 and 70 called line drivers, branch from the output of the $C_O$-register 58 and each set of said amplifiers drives 4 output channels. Although the data signals are presented to all the channels simultaneously, gated registers located in the external devices determine which channel is active during any particular transmission.

The Storage section of the computer is enclosed by the dashed line 72 in FIG. 2. It includes as its chief components the random access memory 74, used to store both data and instructions to be executed, an address translator 76, and the associated address, transfer, control and timing circuits commonly utilized in digital data processing equipment. While other types of storage may be employed, the main memory 74 is preferably constructed from modular arrays of magnetic cores making up a plurality of 30 bit words. The cores of the memory may be coincidentally driven, and may be addressed in a well known manner by means of the address translator 76. The contents of the referenced address are read out into the 30 bit Z-register 78, commonly known as the memory communications register. Because in certain applications it is desirable that words 15 bits in length be used, the Z-register 78 is split into two sections 80 and 82, each 15 bits in length. The section 80 is termed "Z-upper" ($Z_U$) and the section 82 is termed "Z-lower" ($Z_L$). It can be seen from FIG. 2 that all information coming from the peripheral equipment to be stored in the memory of the computer passes along the input bus 84 to the Z-register 78. Similarly, all information from the memory section of the computer to be transmitted to the peripheral equipment passes along the output bus 60 from the Z-register 78.

During the restore portion of the memory cycle, the contents of $Z_U$ or $Z_L$ may be incremented by "1" as indicated by the +0, +1 modifier boxes 86 and 88. This provision allows for automatically increasing the index or buffer control words, with the result that addresses referenced during a block transfer of data are automatically advanced. The comparator 90 is employed to detect the coincidence between the upper and lower halves of the index word such that when coincidence occurs, a signal is generated to terminate the data transfer by deactivating the channel involved.

The Arithmetic section of the computer enclosed by the dashed line 92 is that part of the computer which performs numeric and logical calculations. Though greatly simplified, FIG. 2 shows the important components of the arithmetic section of the computer, namely, the A-register 94, the B-register 96, the X-register 98, and the Q-register 100. Since this invention is concerned primarily with the Input-Output section of the computer and with the method of communication between the computer and its associated peripheral devices, it is felt that a further discussion of the Arithmetic section of the computer is unwarranted since this section does not enter into the input-output operation.

Now that the preferred embodiment of the digital computer of this invention has been described in general terms, greater attention will now be directed toward the Input-Output section of the computer by reference to FIGS. 4*a* through 4*c* which show in greater detail, but still in block diagram form, the various circuits and connections employed to implement the present invention. FIG. 5 illustrates the manner in which the views of FIG. 4*a* through 4*c* may be arranged to present a composite drawing.

GENERAL ARRANGEMENT

The transfer of data to and from the computer is accomplished by the Input-Output section which utilizes 12 separate input and output channels. Data is received from and transmitted to the external equipment by way of these channels in a 30-bit parallel mode. As such, each of the input channels has its own cable which contains 30 data lines as well as as a number of control lines. While the computing machine which is described in the present specification has 12 input and 12 output channels, it should be understood that a greater or lesser number may be employed without departing from the spirit of the invention. However, for the sake of clarity, FIGS. 4*a* through 4*c* illustrate schematically the apparatus required to implement the transmission of information over only 3 channels.

As was mentioned in the introductory portion of the specification, the Input-Output section of the computer may operate in any one of three possible modes for data transfers. If an INTERNALLY SPECIFIED INDEX mode is employed, the address of the buffer control word is internally provided. When the EXTERNALLY SPECIFIED INDEX mode is used, the address of the index word is supplied by the peripheral unit itself. The EXTERNALLY SPECIFIED ADDRESS mode does not employ index words but uses storage addresses that are supplied by the peripheral unit. The transfer of data into and out of the computer's memory is accomplished by input or output buffer operations respectively. The input buffer operation consists of transferring data into the computer and storing the information at consecutive memory locations. The output buffer operation consists of transferring data out of the computer from consecutive memory locations.

To better understand the operation of the Input-Output section, a knowledge should first be had of the buffer control word or index word. A buffer control word is a 30-bit word that is stored in the memory section of the computer. It is made up of two parts, each consisting of 15 binary digits or bits. The upper half of this word will determine the address of the last word to be stored or read out, whereas the lower 15 bits will give the address of the first or next word to be stored or read out. For an input buffer, the lower 15 bits of the buffer control word will determine the address where the input data is to be stored. If the mode is for an output buffer, the lower 15-bits of the index word will serve as an address from which the data word will be read out.

After the initial conditions are met, depending on the mode of operation, the computer extracts the index word from core memory, increments it by one and restores it again to the memory at the original address. The incrementing operation does not destroy the original index word and it will be the address where the data word will be stored. For each word that is stored in memory, the index word will be incremented by one. This process continues until the upper and lower half of the index word are equal, at which time a signal is generated to terminate the information transfer.

The output buffer which also uses the index word performs the same function as the input buffer. Each time the computer data word is transferred out of core memory at the address specified by the lower half of the index word, the word is replaced in storage after the lower half has been incremented by one. This process continues until the data word at the address specified by the upper half of the index word is transferred out.

Referring now to FIGS. 4*a* to 4*c*, cables which are used to transfer data or control signals are shown in the drawings as two parallel lines with arrowheads at one end thereof, and at some point intermediate the ends of these cables the two parallel lines are widened to form a circle and numbers appear within the circle. This number indicates the number of conductors within the cable while the arrowheads indicate the direction in which the data or control signals are flowing in the cables. Cables bearing the numeral 12 in general are control signal cables for the twelve channels while cables bearing the numeral 30 are cables through which data representing signals are carried.

Data signals from the peripheral equipment enter into the Input-Output section of the computer by way of the input cables 120, 122 and 124, where they tie into separate sets of gated input amplifiers 126, 128 and 130. The set of gated input amplifiers labeled 128 in FIG. 4*a* is represented by a block outlined by dashed lines. This is intended to indicate that while only three channels for communication are actually shown, additional identical circuits are provided for other channels which, for the sake of clarity in the drawings, are not shown.

In general, the gated input amplifiers perform two functions. First of all, it may be that the voltage level of the signals used between the external devices and the computer may be incompatible with the circuitry employed in the computer itself. The input amplifiers are therefore designed to alter the voltage level of the input signals to a value compatible for use in the computer. Secondly, since data can be transmitted to the memory section of the computer from only a single channel at a time, the input amplifiers 126 through 130 are designed such that the data on a particular channel may be selectively gated into the memory communication register. The details of the construction of the gated input amplifiers will be described in detail later on in this specification, but for now it may be assumed that there is provided within these blocks, circuitry which is capable of selectively permitting a predetermined number of data signals (bits) to be passed by way of a cable 132 to the memory communications register (Z-register) indicated generally by the numeral 134. The Z-register 134 is designed to hold 30 bits of data and therefore one data line from each of the plurality of input channels is connected to each of the 30 separate stages of the Z-register. The manner in which the control signals for gating the data signals through the input amplifiers to the Z-register are developed within the computer will be described more fully hereinbelow, but for now it is sufficient to say that they are applied to the gated input amplifiers by way of the cable branch 136.

Before the Input-Output section of the computer can accept a word of data from a specific piece of peripheral equipment on one or more of the input channels, two conditions must be satisfied. First of all, the channel over which a communication is to take place must be rendered active, and secondly, the peripheral device must present a control signal termed an Input Request to the computer. In order to render a particular input channel active, the computer must execute an Input Buffer Instruction. Referring again to FIG. 3, the $j^*$ designator of the instruction word will specify the particular channel over which the communication is to take place and the operand ($y$) portion of the instruction word is the address of a memory location where an index word is stored. As mentioned previously, this index word is made up of two 15-bit sections which span an area in memory where the input data is to be stored. A typical Input Buffer Instruction causes this buffer control word to be transferred to the buffer control register associated with the channel specified by $j^*$. This entire action takes place under control of the computer program. In addition to placing the index word in the buffer control register the 4 bits making up the $j^*$ designator pass through the cable 138 (FIG. 4c) and through an OR gate 140 to the translator 142. The translator decodes the 4 bits of $j^*$ in a conventional manner to produce a signal on only one of the 12-lines contained in the cable 144. In other words, the translator 142 is effective to uniquely select one line on which to emit control signals and this line leads to the control circuits for the channel specified by $j^*$ of the instruction word. For example, if the value of $j^*$ in the instruction is 0100 (binary) the translator 142 will examine these 4 bits and produce an output signal on the line in cable 144 corresponding to input channel No. 4 (decimal). This signal passes through the cable 144 and is effective to set the particular one of the input active flip-flops 146, 148 or 150 associated with this particular channel to its "1" state. The "1" side of the input active flip-flops are electrically connected through the cable 152 to the input terminals of corresponding input one-shot circuits 154, 156, and 158. The setting of one or more of the input active flip-flops by the execution of one or more Input Buffer Instructions renders the input channels specified by the particular value of $j^*$ in these instructions active.

As mentioned previously, two conditions must be satisfied before an input buffer can take place. This second condition is that the peripheral device associated with the channel over which the data transfer is to take place must present an Input Request control signal to the computer.

Peripheral equipment on one or more channels may simultaneously present Input Request signals to the computer. These signals enter the Input-Output section on the control lines 160, 162 and 164 and are applied as an input signal to a set of input request amplifiers 166, 168 and 170, there being one such amplifier for each input channel. These amplifiers, like the gated input amplifiers discussed previously, function to transform the signal level employed between the external devices and the computer to a signal level utilized in the computer itself. The amplified Input Request signals pass through the cable 172 and fan out to respective ones of the input one-shot circuits 154 through 158. When Input Request signal is dropped from the line and a signal from an input active flip-flop is applied to one or more of the input one-shot circuits, the one-shot is set to its binary "1" state and the resulting output signal is applied over one or more of the lines 174, 176 and 178 to a first input terminal of the input request gates, 180, 182 and 184. The one-shot is set to its "1" state by the absence of the Input Request signal, to insure that this signal is actually dropped and restored subsequent to the preceding transfer.

In order to properly describe the operation of the sub-priority and priority circuits of the Input-Output section of the computer, it becomes necessary at this point to back-track and assume that other types of requests are being presented to the computer. As will be described more fully later on, the sub-priority network is effective to honor various types of requests on a fixed priority basis. Similarly, the priority network is utilized to establish priority among the various channels that may simultaneously be presenting the same request to the computer.

In accordance with the foregoing statements, assume that a peripheral device such as a magnetic tape unit on one or more channels is presenting an Output Request control signal to the Input-Output section of the computer to thereby request that the computer read a word of data out of its memory section into the peripheral device. These Output Request control signals are applied to one or more of the control lines 186, 188 or 190 which are connected to the input terminals of respective ones of the output request amplifiers 192, 194 and 196, there being one such amplifier for each output channel. As in the case of the input request amplifiers, the output request amplifiers are effective to transform the signal level employed between the external devices and the computer to the signal level utilized in the computer. These signals, in turn, pass through the cable 198 and fan out to corresponding output request one-shot circuits 200, 202, and 204. Before the output request one-shot circuit can be set so as to produce a signal on its output line, it is necessary that its associated output active flip-flop 206, 208 or 210 be rendered active by being set to its binary "1" state.

In order for this condition to be satisfied, the computer must first execute one or more Output Buffer Instructions. In the INTERNALLY SPECIFIED INDEX mode of operation, the buffer control word is a 30-bit word that has been previously stored in the memory of the computer. During the execution of the output buffer instruction, the operand portion, $y$, is the address of the index word and during the next memory reference this index word which was contained at address $y$ is stored at a predetermined address termed the "buffer control register." By way of example, the address of this register for an output buffer may be $00120+j^*$ (octal) in memory.

Also, at this time the 4 bits comprising the $j^*$ designator are transmitted to the translator 142 by way of the cable 138 and the OR gates 140, where the 4 bits are decoded so as to select a single line which is contained in the cable 144 and which is effective to set the output active flip-flop corresponding to the channel specified by j*. It is, of course, possible to execute a series of Output Buffer Instructions for various channels to thereby set more than one of the output active flip-flops 206, 208 or 210.

The output signals appearing at the "1" side of the output active flip-flops are conveyed through the cable 212 and applied to corresponding ones of the output request one-shot circuits 200 through 204. When both a signal from an output active flip-flop and an Output Request are simultaneously applied to one or more of the output request one-shot circuits, and the Output Request signal is subsequently dropped, the one-shot circuit is set and causes a first signal to be applied to one input terminal of its associated output request gate 214, 216 or 218.

In the same way that apparatus is provided for accepting Input and Output Request signals from the external equipment, apparatus is also provided for accepting other types of requests. For example, a peripheral unit connected to any one of the 12 normal input channels may interrupt the main computer program at any time by sending an "External Interrupt" control signal to the computer. The peripheral unit may simultaneously with this action, convey the reason for the interrupt to the computer by way of the input data lines 120 through 124 for the chanel on which it gave the interrupt control signal. The program logic of the computer is made aware of the External Interrupt signal by being forced to take the next instruction from a specified location in memory. The action which follows the External Interrupt is therefore programmable. For example the tape unit on one of the channels may have failed because of a tape break so that corrective action must be taken before this unit will be able to continue operation. The External Interrupt signal will break the normal operational program of the control section and process the information associated with the interrupt. The particular sub-routine that the computer will jump to should result in corrective programming for the external equipment generating the interrupt or in the alternative, cause a monitoring typewriter to type out the physical corrections to be made.

When the External Interrupt is generated, the external equipment places on the data lines for this channel a 30-bit word explaining the reason for the interrupt. The Input-Output section of the computer then generates a special address location in memory which is unique to the particular channel in question. Generally a return jump instruction is stored at this location and causes the computer to process a sub-routine which performs the corrective action.

These External Interrupt control signals from the peripheral equipment are brought into the Input-Output section of the computer by way of the control lines 220, 222, or 224. As in the case of the Input Request and the Output Request signals, suitable amplifiers 226, 228 and 230 are preferably included to adapt a signal level on the communications channel to the signal level utilized in the computer. Interrupt signals, when presented, are amplified by these devices and the resulting signals appearing at the output of the amplifiers pass through the cable 232 and fan out to a first input terminal of a set of interrupt one-shot circuits 234, 236 and 238. Since the External Interrupt is a special type of signal which allows the peripheral device to break into the computer program, there is no need to provide active flip-flops for the interrupt circuits since the interrupt is independent of the computer program. Hence, the application of an External Interrupt and the subsequent removal of it is sufficient to set an interrupt one-shot circuit. When an interrupt one-shot is in its set condition, it provides a first output signal which is applied as an input to a set of corresponding interrupt gates 240, 242 and 244 by way of the conductors 246, 248 and 250 respectively.

Now that it has been shown that the Input-Output section of the computer is capable of receiving more than one type of request from peripheral devices connected to different channels and that more than one peripheral device connected to separate channels can simultaneously be presenting the same type of request, circuits employed to honor both the type of request and the channels presenting the same request on a priority basis will not be described.

In addition to the conductor going to a first input of the request gate circuits, the one-shot circuits for each of the control lines in each channel provides a second output conductor which connects the one-shots to separate flip-flop circuits. For example, the input one-shot circuits 154, 156 and 158 each provide a second output line and these lines are combined in the cable 252 which, in turn, is connected to the set terminal of the Input flip-flop circuit 254. The second set of output lines from the interrupt one-shots 234 through 238 are combined in the cable 256 which connects these interrupt one-shot circuits to the input terminal of the External Interrupt flip-flop 258. Finally, each of the output request one-shot circuits 200 through 204 provides a second output line which is combined in the cable 260 so as to connect said output request one-shots to the input terminal of the Output flip-flop 262.

Each of the flip-flops 254, 258 and 262 provides an input connection to a circuit termed the sub-priority network which is indicated by the block numbered 264. As will be described more fully hereinbelow, the function of the sub-priority network 264 is to determine the order in which the various types of requests will be honored. For example, if it is assumed that peripheral devices on three separate channels are respectively presenting an Input Request, an Interrupt Request, and an Output Request at the same time, it becomes necessary for the computer to honor these requests in some predetermined order because it is unable to process them simultaneously. The sub-priority network 264 combines the output signals from the Input flip-flop 254, the External Interrupt flip-flop 258 and the Output flip-flop 262 in such a manner that an External Interrupt request will be honored first, an Output Request will be honored second and an Input Request will then be honored next. It is of course possible that the sub-priority circuitry can be arranged such that the request may be honored in some other order so that limitation to this particular order is not intended.

After the sub-priority network has determined the request to be honored first, it emits an output signal on the lines in the cable 266 which lead to a second input terminal on the gates associated with this request. For example, if the sub-priority network determines that an Input Request is to be honored, a signal is emitted along the lines in cable 266 which are connected to the second input terminals of the input request gates 180 through 184. The signals on these last mentioned lines enable the gates to permit the request control signals to pass through the cable 268 to the priority network represented by the block labeled 270. Similarly, since the External Interrupt is honored ahead of either an Input Request or an Output Request if an External Interrupt request signal were present on one or more of the input lines 220 *through* 224, then the sub-priority network will develop signals on the lines in the cable 266 leading to the second input terminal of the interrupt gates 240 through 244. The signals on these lines enable the gates to permit the Interrupt Requests to pass through them and through the cable 272 to the priority network 270. Finally, if the sub-priority network determines an Output Request is to be honored, a signal is emitted along the lines in the cable 266 which are connected to the second input terminals of the output request gates 214, 216 and 218. The signals on these last mentioned lines enable the output request gates to operate in such manner that the Output Request control signals are able to pass through the cable 274 to the priority network 270.

The function of the priority network is to determine which one of two or more channels simultaneously presenting the same type of request will be honored. To exemplify the operation of the priority structure, assume that an External Interrupt is present on input channel 6, and Output Requests are present on channels 4 and 11. The sub-priority logic first examines the input-output processes and determines that an External Interrupt is present. Because its presence has priority over an output operation, the External Interrupt request will be honored first. The priority network 270 then determines the highest numbered channel with an External Interrupt present, namely channel 6. After the input-output logic has informed the main program control logic of the computer of the impending program interrupt, the priority logic will then examine the input-output processes and determine that the Output Request is present. The priority network then determines the highest numbered channel on which the request is present, namely channel 11. The input-output buffer transfer logic then completes the data transfer and the sub-priority logic again takes over to re-examine the input-output processes to determine if any new requests are present. In the event that several Input and Output Requests are present simultaneously, the input and output word transfers are interlaced by a time share circuit—the output word transfer on the highest numbered channel being taken first.

In addition to determining the channel priority, the priority network 270 also sets up a special address for a particular mode of operation. As will be detailed more fully when the various functional blocks of FIGURE 4 are described, the priority network utilizes a plurality of bistable flip-flop stages interconnected in such a manner as to designate a specific channel number from 0 to 11. Since the higher numbered channels have priority over the lower, the network specifies a particular channel for which selected flip-flops are set. Signals representing the address of the channel having the highest priority (as determined by the priority logic) are conveyed over the cable 276 and through the OR gates 277 to the S-register 278 which, as mentioned previously, is the storage address register. When the memory is initiated the contents of the memory address now contained in the S-register are read out and transmitted to the Z-register. As was mentioned before, the execution of an Input or Output Buffer Instruction was required to set the appropriate input or output active flip-flops so that an incoming Input and/or Output request could be processed by the sub-priority and priority networks. It should be recalled that in the INTERNALLY SPECIFIED INDEX mode the execution of these types of instructions also was effective to read out the word located at the address in memory specified by the operand portion, *y* of this instruction and in storing it at either the address $00100+j^*$ or at $00120+j^*$, depending on whether it was an Input or an Output Instruction. In other words, in the INTERNALLY SPECIFIED INDEX mode at the time of execution of a buffer transfer instruction the index word is read out from memory and then read back into a buffer control register.

Thus it is the buffer control word which is transmitted to the Z-register when the proper channel address, developed by the priority network, is transmitted to the S-register. Under command of the input-output control and timing networks, the contents of the lower half of the Z-register ($Z_L$) is next transmitted to the storage address register 278. During the restore cycle the contents of the lower half of Z-register is incremented by one and read back into the buffer control register. The modifier box 282 connected between the Z-register and the memory by means of the 15 conductor cables 284 and 286 is intended to illustrate this function. If an Output Instruction is being honored, the data word located at the address now contained in the S-register is read into the Z-register 134 where it is available for transmission out to the particular peripheral device which has had its request signal honored.

If an Input Instruction is being honored by priority when the index word is in the storage address register 278, the channel address from the priority network 270 is conveyed by way of the cable 276 and the OR gates 140 to the I/O translator 142. The translator operates on the 4 bits of the channel address which specifies the particular channel being honored by priority, causing an output signal on a line in the cable 144 to be energized. This line will either branch off from the cable 144 or pass through the cable branch 288. In the latter case it connects into the cable branch 136 providing an enabling signal for the gated input amplifiers 126 through 130 for the selected channel. The word of data from the peripheral device then passes through the gated input amplifiers and through the cable 132 to the Z-register 134. The data word is therefore available to be written into the particular memory register specified by the buffer control word contained in the S-register 278. Subsequent to the transmission of the data word to the Z-register the input-output control develops a command enable RESET INPUT REQUEST.

After the Input-Output section of the computer has honored an Output Request and the data to be transmitted to a peripheral device is in the memory communications register 134, the data word signals are conveyed along the cable 290 and the cable branch 292. These signals are applied to a first terminal of a set of AND gates indicated generally by the numeral 294. Since the communication takes place in a 30 bit parallel mode, each stage of the Z-register 134 has an output line in the cables 290 and 292. There are 30 such AND circuits 294. In order to gate the data signals from the memory communication register to the output register $C_O$—indicated generally by the numeral 296—the input-output timing and control circuits, at the proper time, emit a command enable TRANSFER Z TO $C_O$ on the line 298 which opens the gates 294 to permit the data bits to pass through. This sets the stages of the output register in accordance with the data being transmitted. The output from the $C_O$ register is capable of driving the input amplifiers on 12 channels. The output from the "0" side of each of the 30 stages of the $C_O$ register drives three data line drivers which are indicated in FIG. 4*c* by the numeral 300. Each of these circuits is capable of driving four input amplifiers in the peripheral equipment, and each functions to adapt the signal level employed in the computer to the signal level transmitted to the peripheral equipment. The data signals from the line drivers 30 pass through the cable 302 which lead to the external devices.

When the computer has set the output data lines it follows a fixed time later, as determined by Input-Output control section, with a control signal. This control signal, termed an Output Acknowledge, informs the external equipment that the data lines are ready to be sampled. Since the data signals are applied to the peripheral devices on all the output channels simultaneously, some means must be provided for advising only the honored peripheral equipment to accept them. Again, the translator 142 performs this selection function. The selected channel address is translated and the resulting output signal is conveyed through the cable 144, the cable branch 288, and through the branch 304 to the output acknowledge and external function flip-flops indicated in FIG. 4*a* by a block numbered 306. For the sake of clarity, only one such flip-flop is indicated in the drawing, but it should be understood that there is one such flip-flop for each of the output channels. The particular flip-flop selected by the translator 142 is set and the resulting signal is passed through one of the output acknowledge gates 308, 310, or 312 and one of the output acknowledge amplifiers 314, 316 or 318 to one of the output acknowledge control lines leading to the peripheral device on the selected channel. This signal advises the external device of data available on the output channels and that it can now be accepted. The peripheral device, having received the information from the $C_O$ register, may then drop the Output Request signal any time after the reception of the Output Acknowledge signal from the computer.

When the computer has honored an Input Request signal and stored the data in memory, it advises the peripheral device which transmitted this word of information that it has completed the storage operation by sending a control signal termed an Input Acknowledge. As before, the translator 142 comes into play, selecting the appropriate channel on which the Input Acknowledge is to be sent. The channel address is translated and a signal appears on one of the lines in the cable 144. It passes through the cable branches 288 and 320 to a set of acknowledge gates 322. While only one such gate is shown in FIG. 4*a*, it should be understood that there is one such gate for each of the input channels and hence, the signal from the translator is applied to only one of the gates. As will be described later, the enabling signal for the acknowledge gate (SEND INPUT ACKNOWLEDGE) comes from the input-output control and permits this acknowledge signal to be sent out from the gates along the cable 324 and through one of the acknowledge amplifiers 326, 328 or 330 to the peripheral device which has transmitted the last word of data to the memory of the computer. Again, the acknowledge amplifiers are provided to match the signal level in the computer to the signal level required by the external equipment.

When the computer wishes to notify a particular piece of peripheral equipment on a specified channel that it is ready to receive data or that it wishes to transmit a word of data thereto, it sends out an External Function signal along one of the control lines 332, 334 or 336. This control signal is used as a command between the computer and the peripheral equipment. This signal is initiated by the computer and sent out to the peripheral units by the execution of an External Function instruction. The *j** portion of this instruction word again determines the particular channel on which the External Function signal is to be transmitted. The operand portion of the instruction word, *y*, specifies the address of a word in memory which is the command itself. This data-word is sent to the peripheral device via the normal output cables 302. Only the particular channel as designated by *j** receives the External Function control signal and hence is the only peripheral device capable of responding to the word.

Each time that a word on an input buffer is transferred to the random access memory 280 or, on an output buffer, each time a word of data is extracted from the memory, the lower half of the buffer control word is incremented and replaced in the buffer control register for the channel in question in the memory. When the lower half of the control word becomes equal to the upper half, means are provided for terminating the buffer transfer on the channel utilizing the particular index word or to prohibit the assigned peripheral device from further communicating with the computer. The means for terminating the buffer transfer is shown diagrammatically in FIG. 4*c* as the comparator 338. The cable 290 connects the upper and lower half of the Z-register 134 to the comparator. When the contents of the upper and lower half of the Z-register are equal, a signal is emitted on the cable 340. Although not shown in FIG. 4*c*, gating means are provided which receive enabling signals from the translator 142 and are employed selectively to transmit the signal developed by the comparator 338 to the particular input or output active flip-flop associated with the channel on which the buffer transfer has taken place. It may be recalled at this point that before an Input or Output Request could be processed by the sub-priority and priority logic of the Input-Output section of the computer, it was necessary that the channel over which the request has been transmitted be active. Since the completion of a buffer transfer causes the input or output active flip-flop to be reset to its "0" state, the channel associated therewith is deactivated and hence further requests on this channel cannot be honored.

In the case of an External Interrupt request, the channel address generated in the priority network is transmitted to the interrupt address storage register 279 (FIG. 4*c*) by way of the cable branch 281. The address stored therein is held until a time during the normal A-sequence when a command enable is generated by the main control timing chain (not shown) for transferring the interrupt address to the S-register 278. The computer then accesses the jump instruction contained at this address and processes the corrective sub-routine.

Before discussing the details of the operation of the Input-Output section of this invention, a brief description of the symbology and the basic building blocks employed therein will be given.

Referring to FIG. 6 there is shown in block diagram form the basic building block utilized in the circuitry of the present invention. This block 360 represents an OR INVERTER often referred to in the art as a NOR circuit. The OR INVERTER may have a plurality of input terminals and a single output terminal. The truth table of FIG. 7 indicates that if a logical "1" signal is applied to one or more of the input terminals, the output appearing at the output terminal is a logical "0." Only when all of the inputs are logical "0's" will a logical "1" appear at the output terminal thereof. The notation *ab*Z*cd* contained within the block indicates where the particular circuit is used. The capital letter specifies a large category or register in the computer. For example, "Z" would refer to the Z-register. The "*ab*" refers to two numerical characters located at the left of the capital letter. These characters describe, in most cases, the function of the inverter circuit. If the circuit is part of a particular register the following combination is used:

00=zero or clear side of bit register
01=one or set side of bit register
02, 04, 06, 08=slaves off one side of bit register
03, 05, 07, 09=slaves off zero side of bit register The remaining values of *ab* are employed for gates and other logic circuits associated with that register. The indicators *cd* are also two numeric characters located to the right of the capital letter, indicating the particular stage of the register in which they are employed. For example, an inverter 03Z05 would be connected to the "0" side of the fifth stage of the Z-register.

In FIG. 8 there is shown a circuit for implementing the OR INVERTER or NOR logic. Since other circuits can be devised for performing this type of logic, the circuit illustrated schematically in FIG. 8 is only typical—limitation thereto is not intended. In the apparatus of the present invention a logical "1" signal is represented by a potential of −3 volts while a logical "0" is represented by a potenial 0 volts. When a logical "0" is present on one or more of the input terminals 362–366 and no logical "1's" are present on any of these input terminals, junction 368 in the circuit diagram is maintained slightly positive by means of the voltage source $+V_1$ and the voltage divider comprised of resistors 370, 372 and 374. Since the base of the transistor 376 is positive with respect to its emitter electrode (maintained at ground potential), the emitter junction is biased in the reverse direction and therefore the impedance between its emitter and collector is relatively high. The collector junction is always reverse biased by means of the voltage source $-V_1$, thus current will flow across the collector junction only when the bias is reversed on the emitter junction. For the purpose of this explanation, leakage currents are ignored. The output line 378 is held at −3 volts ($V_2$) representing a logical "1" by the clamping diode 380 connected to the $-V_2$ supply If a logical "1" (−3 volt) signal is applied to one or more of the input terminals 362–366, the base of the transistor 376 becomes negative with respect to its emitter. Hence a relatively large current can now flow between the emitter and collector, such that the output voltage rises to almost ground or 0 volts represening a logical "0." While only three input terminals are illustrated in the schematic diagram of FIG. 8, it should be understood that a greater or fewer number may be employed. Also, the output of this circuit may be fanned out so as to drive the inputs of several other similar NOR circuits.

FIG. 9 indicates the manner in which two NOR circuits of the type described above may be interconnected to obtain a bistable multivibrator or flip-flop. The lower NOR circuit is labeled 00V63 and the upper is labeled 01V63. Normally, logical "0's" are held on the "clear" "set" lines 382 and 384 respectively. In order to erase the information held in the flip-flop and to introduce new information therein, a "clear" signal is used. "Clear" means to place a "1" on the clear line and "set" means to place a "1" on the set line. After clearing the flip-flop, the output of the 00 side of the flip-flop is at "0" and the alternate output is "1." The following step-by-step procedure explains how the inverters operate as a flip-flop. Assuming that the flip-flop is originally cleared so that the 00 side is outputting a logic "0" on its output line 386, this output is also applied as a "1" input to the 01 side of the flip-flop. If no signal is applied to the set line 384, the 01 inverter will output a logic "1" on its output line 388. This logic "1" output is fed back by means of conductor 390 and is applied as an input to the 00 inverter. Hence the clear signal may be removed and this input signal appearing on line 390 will hold the flip-flop in the cleared state. If now a logical "1" is applied to the set input terminal, this signal will be inverted by the 01 inverter such that a logic "0" will be applied via line 390 to the 00 inverter. The output of the 00 side of the flip-flop will therefore be a logical "1" which when applied as an input to the 01 inverter holds the flip-flop in the set condition. Thus, the signals which formerly appeared on lines 386 and 388 respectively are reversed. When the flip-flop is set, the one side thereof outputs a logical "0" while the zero side outputs a logical "1." Similarly, when the flip-flop is cleared the zero side outputs a logical "0" while the one side thereof outputs a logical "1." To simplify the drawings, a flip-flop will be represented by the symbols shown in FIG. 10 rather than by that shown in FIG. 9. Since the representation is not only conventional but self-explanatory, no further discussion of it is necessary.

INPUT-OUTPUT CONTROL—INTERNALLY SPECIFIED INDEX MODE—INPUT

Before describing the various circuits of the Input-Output section of the computer shown in FIGS. 4*a*–4*c* in detail, the control circuitry for producing the required command enable signals for these circuits will be described.

The computer which operates in accordance with the teachings of this specification is a synchronous machine having its operation rate controlled by a 4-phase clock. The clock circuit (not shown) is effective for producing a series of pulses at predetermined times to step the computer through its operations. Each cycle of the clock produces 4 pulses as shown at the top of FIGS. 11*a* and 11*b* each differing in phase from the other by a predetermined amount. The various pulses in a cycle will be identified by the symbol φ1, φ2, φ3, and φ4, while clock cycle during which these various pulses occur will be identified by a second number separated from the phase number by a period (.). For example, the φ3 pulses in the third cycle will be identified by the symbol φ3.2, the first cycle being φ3.0.

Referring to FIGS. 12*a* through 12*p* which illustrate the circuitry for producing the required command enables for the Input-Output logic of the computer and to the timing diagrams mentioned above for the circuitry of FIGS. 12*a* through 12*p* when the INTERNALLY SPECIFIED INDEX mode is operative, it can be seen that the input-output control, consisting of a timing chain comprised of a plurality of bistable flip-flop circuits, and a set of five flip-flop circuits which are termed the *t*-designator. The timing chain flip-flops labeled T80 through T88 and T90 are referred to herein as the *e*-designator while the timing chain comprised of the flip-flops L70 through L73 is referred to as the supplementary timing chain. The five flip-flops making up the *t*-designator include the SCAN flip-flop V60, the $I/O_1$ flip-flop V61, the $I/O_2$ flip-flop V62, the DISABLE $I/O_2$ flip-flop V63, and the DISABLE $I/O_1$ flip-flop V64. Signals, generated at different times in the timing chain, coupled with signals, generated by any one or more of the flip-flops in the *t*-designator, provided the command enable signals which permit the input-output logic to control the transfer of informtion to and from the computer.

Referring to FIG. 12*a*, in order to initially start the timing chain, the Master Clear switch 399 is momentarily depressed. As this is done the V91 flip-flop is cleared to develop a logical "0" signal on the conductor 400 which connects the "0" side of the flip-flop V91 to a first input terminal of an OR INVERTER 13V60. When the Run switch 401 is depressed, at φ2.0 time, the inverter 13V60 is fully enabled, causing a logical "1" signal to be developed on its output line 402. This logical "1" signal is applied over conductor 402 to the junction 404 and subsequently, over the conductors 406 and 408. The logical "1" signal on conductor 406 passes through the OR gate 410 and is effective in setting the T80 flip-flop in the *e*-designator timing chain to its "1" state. The logical "1" signal on the conductor 408 passes through an OR gate 412 to set the SCAN flip-flop V60 in the *t*-designator to its "1" state. The SCAN flip-flop along with the other flip-flops in the *t*-designator are initially cleared by a "1" signal output from NOR circuit 11V16 on the conductor 413. With the SCAN flip-flop in its "1" state a logical "0" appears on its output line 414 and also at the junction 416. From this junction the logical "0" is applied, originally, over a conductor 418 to a first input terminal of an OR INVERTER 90N11. Since the T80 flip-flop is in its "1" state, a logical "1" signal appears at the output of the "0" side of this flip-flop and is applied by means of a conductor 420 to a first input terminal of an OR INVERTER 03T80. Inverter 03T80 operates on this logical "1" input signal to cause a logical "0" signal to appear on its output line 422. As can be seen, both of the input lines of the inverter 90N11 have logical "0"'s applied thereto; hence, a logical "1" signal appears on the output line 424 of this inverter serving as the command enable CLEAR PRIORITY AND SUB-PRIORITY.

At time φ4.0, the logical "0" signal appearing at the "1" side of the T80 flip-flop passes through the inverter 13T81 and appears as a logical "1" at the output terminal. This logical "1" signal is conveyed by way of conductor 426 and sets the V91 and the T81 flip-flops to their respective "1" states. The logical "0" signal appearing at the junction 416 is applied by means of the conductor 428 to a first input terminal of the OR INVERTER circuit 90N13 (FIG. 12*b*). Likewise, the logical "0" signal, resulting from the T81 flip-flop being in its set condition, is applied by way of a conductor 430 to a second terminal of the inverter circuit 90N13. Since all of the inputs to this inverter are logical "0"'s, a logical "1" signal appears on its output line 432. It serves as the command enable SEND REQUEST TO SUB-PRIORITY.

At time φ2.1, the logical "0" signal at the output terminal of "1" side of the T81 flip-flop passes through the inverter 13T82, producing a logical "1" signal at the junction 434. From this point the signal passes first along conductors 436 and 438, clearing the T80 flip-flop to its "0" state. The signal appearing at the junction 434 also passes by way of a conductor 440 to set the next flip-flop in the timing chain (T82) to its "1" state.

At time $\phi$1.2, the logical "0" signal appearing on the output line connected to the "1" side of the T82 flip-flop passes through the NOR circuit 13T83 and along a conductor 442 to the set terminal of the T83 flip-flop of the *e*-designator timing chain (FIG. 12*c*). This signal sets the T83 flip-flop to its "1" state. The junction 444 is connected to the "1" side of the T83 flip-flop. The logical "0" signal appearing here is applied over a conductor 446 to a first input terminal of NOR circuit 90N24. Since the other input terminal of this circuit is connected by a conductor 448 to a junction 450 on the conductor 428 connected to the "1" side of the SCAN flip-flop V60, it also has a logical "0" signal on it. This is true since the V60 flip-flop has been previously set to its "1" state. It can be seen, then, that NOR circuit 90N24 is fully enabled and causes a logical "1" signal to appear on the output line 452. This logical "1" signal is inverted by means of the NOR circuit 91N24 causing a logical "0" to appear at the junction 454 and this signal is applied as a first input to a series of NOR circuits 89N24, 92N24, and 97N24. The other inputs to these last mentioned NOR circuits come from the sub-priority network (FIGS. 20*a* and 20*b*); hence, only one of these three NOR circuits will have a logical "0" applied to its second input terminal. As may be expected, the particular one of these three inverters to become fully enabled by having a logical "0" applied to its second input terminal is dependent on the type of request which has been honored by the sub-priority network. For example, if an External Interrupt request has been honored, the NOR circuit 92N24 will be the one which is fully enabled, whereas if an Input Request is honored by sub-priority, the NOR circuit 89N24 will be fully enabled. In either case a logical "1" appears on one of the output lines 456, 458 or 460. This signal is the command enable GATE REQUESTS TO PRIORITY.

At time $\phi$2.2, the logical "0" signal now appearing at the output terminal of the "0" side of the T81 flip-flop passes through the NOR circuit 12T82 and the resulting logical "1" signal on the conductor 462 clears or resets the T82 flip-flop to its "0" state. Simultaneously, the logical "0" signal appearing at the junction 444 passes through NOR circuit 13T84, causing a logical "1" signal to appear on conductor 464. This sets the T84 flip-flop in the timing chain to its "1" state. Even though the resulting logical "0" output signal from the T84 flip-flop, appearing on the conductor 466, is applied to a first input terminal of NOR circuit 90N31, this inverter is eneffective to pass this signal since its other input terminal is connected by means of a conductor 468 and a conductor 470 to the "1" side of the I/$O_2$ flip-flop V62, since at this time this flip-flop is in its "0" state. However, at the following clock phase ($\phi$3.2) the inverter 13T85 becomes fully enabled. The logical "0" signal appearing at the "1" side of the T84 flip-flop passes through it, is inverted, and applied to the set terminal of the T85 flip-flop by means of a conductor 472. The timing diagram of FIGS. 11*a* and 11*b* shows that at time $\phi$1.3 the T83 flip-flop will be reset to its "0" state. The reason for this is that, at this time, the T82 flip-flop is in its "0" state; hence the inverter 12T83 becomes fully enabled, causing a logical "1" signal to appear on a conductor 474 which leads to the clear terminal of the T83 flip-flop.

At time $\phi$2.3, the logical "0" output from the "1" side of the T85 flip-flop is propagated through the NOR circuit 13T86 and the resulting logical "1" signal on the output conductor 476 sets the *e*-designator flip-flop T86 (FIG. 12*d*) to its "1" state. Also, the logical "1" signal appearing on conductor 476, at time $\phi$2.3, passes by way of conductor 478 and conductor 480 to reset the T84 flip-flop to its "0" state. At time $\phi$3.3, the logical "0" from the "1" side of the T86 flip-flop is permitted to pass through the OR INVERTER circuit 13T87 and not only along conductor 482—which causes the T85 flip-flop to be reset to its "0" state—but also along conductor 484 to the set input terminal of the T87 flip-flop. The output from the "1" side of the T87 flip-flop appears on conductor 486 and passes therethrough to one input terminal of NOR circuit 23V16. A second input to this NOR circuit is applied by means of a conductor 487 from the output of INVERTER 03V60 (FIG. 12*h*) connected to the "0" side of the SCAN flip-flop V60. Since V60 is in its "1" state, the output from 03V16 is a logical "0." A third input to NOR circuit 23V16 is from NOR circuit 22V16, which produces a "0" output when one or more of its inputs is a "1" signal.

The inputs to 22V16 are from the priority network so that when a request of one type or another has been sent to the priority network, NOR circuit 22V16 will output a logical "0." At time $\phi$2.4, NOR circuit 23V16 becomes fully enabled (if a request is in priority) and outputs a logical "1" signal on conductor 489 to set the memory access flip-flop V16 to its "1" state.

At time $\phi$2.4, the logical "0" appearing at the "1" side of the T87 flip-flop is also passed through and inverted by NOR circuit 13T88. The resulting logical "1" signal appearing at the output thereof is conveyed over a conductor 488 to a junction point 490. At this junction the circuit divides into two portions: first, this "1" signal passes over conductor 492 to the clear terminal of the T86 flip-flop which causes it to be reset to its "0" state, and in the second portion the logical "1" output signal from the 13T88 inverter also passes by way of conductor 494 to set the T88 flip-flop to its "1" state. The logical "0" output from the "1" side of the T88 flip-flop is applied via the conductor 496 as a first input to NOR circuit 90N51. The "1" side of the memory access flip-flop is connected by means of conductor 498 to the second input terminal of the inverter 90N51. Thus this inverter is now fully enabled, and causes a logical "1" signal to appear on the conductor 500 which is connected through an OR circuit 502 to the clear input terminal of the SCAN flip-flop V60. This signal resets the SCAN flip-flop and completes the SCAN mode of the input-output control sequences.

Whenever the computer is operating and no requests are detected by the priority network, the SCAN flip-flop V60 in the *t*-designator remains in its set condition and the *e*-designator timing chain re-cycles itself until a request is detected. This is due to the fact that the memory access flip-flop remains cleared when no requests are present. Unless the memory access flip-flop is set, NOR circuit 90N51 connected to the "1" side of the T88 flip-flop does not become fully enabled and, hence, no signal is produced on its output conductor 500 to clear the SCAN flip-flop. The timing chain continues to run and at $\phi$1.5 the T90 flip-flop is set by way of the logical "1" output signal from NOR circuit 13T90. The resulting logical "0" signal appearing on the output conductor 638 of the T90 flip-flop passes by way of a conductor 503 and is applied as a first input to NOR circuit 12T80 (FIG. 12*a*).

A second input to this NOR circuit comes from the output of the inverter 03V60 by way of a conductor 505. Because the SCAN flip-flop, to which this last mentioned NOR circuit is connected, remains set when no requests are present, the signal appearing on the conductor 505 is a logical "0." On the next succeeding clock phase ($\phi$2.5) NOR circuit 12T80 becomes fully enabled and outputs a "1" signal on the conductor 507 which passes through OR circuit 410 to again set the T80 flip-flop and initiate a second SCAN cycle.

In summary, during the SCAN mode several things are accomplished. First, command enables are developed to clear the sub-priority and priority network. Next, the requests appearing at the input request gates are transferred to the sub-priority network where they are examined on a fixed priority basis. Next, an enable signal is generated to gate these request signals to the Priority network where a number of channels presenting identical types of requests are honored on a priority basis. Finally, the memory access flip-flop is set, provided a request is present, which, in turn, allows the SCAN flip-flop to be cleared to its "0" state which, as will be described below, permits the second sequence ($I/O_1$) of the input-output section to be initiated.

In order to initiate the $I/O_1$ sequence it is necessary to set the $I/O_1$ flip-flop V61 (FIG. 12*h*) to its "1" state. To do this it is necessary that the NOR circuit 13V61 (FIG. 12*i*) provide a logical "1" output signal on the conductor 504 which is connected to the set terminal of this flip-flop. For NOR circuit 13V61 to output a logical "1" signal, it is necessary that all of the inputs have logical "0" 's impressed thereon. A first input to this NOR circuit is from the "1" side of the memory access flip-flop V16 by way of a conductor 506. At this time the memory access flip-flop is set, thereby outputting a logical "0." A second input to inverter 13V61 is provided by the output of an inverter 17V66 which is located in the communications mode selection circuitry shown in FIGS. 12*n* and 12*p*. The output from inverter 17V66 passes by way of a conductor 508 to a junction point 510. A conductor 512 connects this junction point to an input terminal of NOR circuit 13V61. As will be described more fully below, when the EXTERNALLY SPECIFIED INDEX and EXTERNALLY SPECIFIED ADDRESS modes of communication are described, the output from inverter 17V66 is a logical "0" whenever the input-output section is operating in the INTERNALLY SPECIFIED INDEX mode.

A third input to the NOR circuit 13V61 is from the memory timing chain (not shown). This signal indicates that the memory section of the computer is available for use by the Input-Output section. If memory is available, this input will be a logical "0" such that NOR circuit 13V61 becomes fully enabled and permits the setting of the $I/O_1$ flip-flop V61.

At this point of an input data transfer, the memory may not be available. If this is true, the $I/O_1$ flip-flop will not be set and the next I/O cycle will not be initiated. However, when this happens the memory access flip-flop V16 will remain in its set state until the next I/O cycle. The setting of the $I/O_1$ flip-flop will take place anytime following if the Input-Output section is not being locked out because of an input-output instruction and memory is available. At some time following, the $I/O_1$ flip-flop will be set by the correct conditions.

With the $I/O_1$ flip-flop in its set condition, a logical "1" appears on the output line 514 associated with the "0" side of this flip-flop. This logical "1" signal is inverted by NOR circuit 03V61 such that a logical "0" is developed on its output line 516 and applied as a first input to the NOR circuit 57H04. As long as the Input-Output section is operating in the INTERNALLY SPECIFIED INDEX mode, the second input to the 57H04 inverter, coming from the inverter 17V67 (FIG. 12*p*) by way of conductor 518, is a logical "0"; hence, the "1" output from NOR circuit 57H04 appearing on conductor 519 serves as a command enable PROGRAM LOCKOUT. This enable goes to the B-sequence timing chain and will remain as long as the $I/O_1$ flip-flop is set. This lockout signal prevents the computer from processing any further instructions until the data transfer being performed by the input-output section has been completed.

At time $\phi 1.5$, the inverter 13T90 becomes fully enabled and passes the logical "0" output signal from the "1" side of the T88 flip-flop so that a logical "1" signal appears on a conductor 520 which sets the T90 flip-flop (FIG. 12*f*) in the *e*-designator timing chain to its "1" state. On the next phase time, the logical "0" signal appearing at the output of the "0" side of the T87 flip-flop passes through inverter 12T88, producing a "1" signal on conductor 522 and resetting the T88 flip-flop to its "0" state.

At this same time if memory is ready and waiting, the inverter 13T80 (FIG. 12*a*) outputs a logical "1" signal on conductor 524 which passes through the OR circuit 410 and again sets the T80 flip-flop to its "1" state. With flip-flop T80 again in its "1" state, a "1" signal appears on the output conductor 420. This signal is inverted by NOR circuit 03T80 so that a "0" appears on its output line 422. This logical "0" signal is applied as a first input to the NOR circuit 19V61. The "1" side of the $I/O_1$ flip-flop is connected by means of a conductor 525 to a junction point 526 which, in turn, is connected to a first input terminal of a NOR circuit 17V61 bp means of a conductor 527. The second input to this OR INVERTER comes in on the conductor 518 which, as was mentioned previously, has a logical "0" signal thereon when the system is operating in its INTERNALLY SPECIFIED INDEX mode. It can be seen that the NOR circuit 17V61 is then fully enabled, causing a "1" signal to appear on its output conductor 528. This signal is inverted by NOR circuit 18V61 so that a logical "0" appears on its output conductor 530 connected to the second input terminal of NOR circuit 19V61. Since NOR circuit 19V61 has all its input terminals at the "0" level, it is fully enabled and emits a command enable INITIATE MEMORY on its output conductor 532. This command enable starts the memory timing chain running concurrently with the input-output timing chain for a predetermined time and causes the index word to be read out from its register in memory, incremented by one and restored back into memory at the address specified.

During the first part of the $I/O_1$ sequence, the S-register will be cleared by memory. At the same time that the S-register is cleared, i.e., at time $\phi 4.5$, the inverter 13T81 is enabled and passes a logical "1" signal to its output conductor 426 which sets the T81 flip-flop to its "1" state.

The next command enable to be generated is TRANSFER CHANNEL ADDRESS TO S. This signal appears on the conductor 534. To generate this command enable signal, the condition necessary to fully enable the inverter 96N11 must be present. A first input to this NOR circuit is from the inverter 19V67 located in the communications mode designating circuitry shown in FIG. 12*p*. The output from 19V67 is a "0" whenever the Input-Output section is operating in its INTERNALLY SPECIFIED INDEX mode. This "0" signal is applied by way of conductor 536 to a junction 538 and from there via conductor 540 to a first input terminal of NOR circuit 96N11. A second input to this last mentioned NOR circuit comes from the "1" side of the $I/O_1$ flip-flip V61 by way of conductors 525 and 542. Since this flip-flop is in its "1" state, a "0" signal is applied to NOR circuit 96N11. A third input to this same NOR circuit is applied by way of conductor 508 which is connected to the output of NOR circuit 17V66 also located in the mode designating circuits. The output from this NOR circuit is a "0" whenever the system is operating in the INTERNALLY SPECIFIED INDEX mode and appears at the junction point 510. From there the signal passes through a conductor 544 to the third input terminal of NOR circuit 96N11. The final input to this last mentioned NOR circuit is by way of conductor 546 connected to the "1" side of the T80 flip-flop. By referring to the timing diagram of FIGS. 11*a* and 11*b*, it is evident that, at this time, the T80 flip-flop is in its set condition with a logical "1" signal on the conductor 546. Since all the conditions are met, NOR circuit 96N11 outputs a "1" signal which is inverted by NOR circuit 98N11 to produce the above mentioned command enable TRANSFER CHANNEL ADDRESS TO S.

It may be observed that the other command enables previously described were "1" signals whereas in this case, the signal appearing on the line 534 is a logical "0." However, at time $\phi$1.6, NOR circuits associated with the S-register (not shown) become fully enabled to gate this command enable to the S-register itself. Hence, it is a logical "1" signal which actually produces the desired result. The channel address itself comes from the priority network. When placed in the S-register it is used to address the index word for the particular input channel being used.

The *e*-designator timing chain continues to run, in the same manner as described in connection with the SCAN sequence, the various flip-flops therein being set and cleared in a definite order. At time $\phi$2.6, the T80 flip-flop is cleared and the T82 flip-flop is set. Also, at this time, the memory access flip-flop V16 is reset to its "0" state. This is accomplished by means of the "1" output from the 13T82 inverter which is connected to the "1" side of the T81 flip-flop. The "1" output from the 13T82 inverter passes by way of conductor 436 to a junction point 548. From this point the signal follows a conductor 550 and passes through an OR circuit 552 connected to the clear terminal of the memory access flip-flop.

Also occurring at time $\phi$2.6 is the setting of the DISABLE $I/O_1$ flip-flop (FIG. 12*j*) located in the *t*-designator section of the input-output control circuits. The DISABLE $I/O_1$ flip-flop V64 is set by a logical "1" signal appearing at the output of the 94N21 inverter and is applied to the V64 flip-flop by way of a conductor 554. For a "1" signal to appear on this conductor it is necessary that all of the inputs to the 94N21 circuit be "0" signals. One input to this inverter is from the output of the "1" side of the T82 flip-flop and the signal on this line is a "0" since the T82 flip-flop is in its set condition. The other input to 94N21 is by way of a conductor 556 and a conductor 558, the latter being connected to the output line 516 of the inverter 03V61. Since the $I/O_1$ flip-flop V61 is in its set condition, a "0" signal appears at the output of NOR circuit 03V61.

Still another inverter fully enabled at time $\phi$2.6 is the circuit 89N21. This circuit is receiving its inputs from the "1" side of the T82 flip-flop, from the output of the NOR circuit 03V61, and from the NOR circuit 19V67, producing all logical "0" outputs at this time. The resulting "1" signal on the conductor 560 produces the command enable INCREMENT $Z_L$. The effect of this command enable is to set the INCREMENT $Z_L$ control flip-flop in the $Z_L$ counter (FIG. 28). Now that the incrementing flip-flop is set, the memory will read out the contents of the address which is in the S-register. The contents will be read into the Z-register (held until the next memory reference) and will then go through the incrementing circuitry, to be incremented and restored to the address specified by the contents of the S-register.

At time $\phi$4.6, two things occur. First, the T81 flip-flop is cleared by means of the "1" output from the 12T81 inverter and, secondly, the memory timing chain produces an output signal which is effective to clear the previous contents of the Z-register.

During the time that the DISABLE $I/O_1$ flip-flop in the *t*-designator is set, the timing chain continues to run. At $\phi$3.8, the T87 flip-flop is set to produce a logical "0" signal on its output line 486 which is connected as a first input to the NOR circuit 94N42. A second input to this last mentioned NOR circuit comes from the output of the 17V67 inverter by way of the conductor 518 and the conductor 562. As mentioned previously, NOR circuit 17V67 produces a logical "0" output whenever the system is operating in the INTERNALLY SPECIFIED INDEX mode. The last input to NOR circuit 94N42 comes from the "1" side of the DISABLE $I/O_1$ flip-flop V64 by way of conductors 564, 566, and 568. Since the DISABLE $I/O_1$ flip-flop is in its set state, NOR circuit 94N42 is fully enabled and produces an output signal on the conductor 570 which clears the translator of its previous contents and produces the command enable TRANSFER CHANNEL ADDRESS TO TRANSLATOR.

The output from NOR circuit 94N42 is also conveyed by way of a conductor 572 and through an OR circuit 574 to the "1" side of the $I/O_2$ (V62) flip-flop in the *t*-designator. This signal sets the $I/O_2$ flip-flop to its "1" state. At time $\phi$1.10, the T88 flip-flop is in its "1" state and, therefore, presents a "0" signal along the line 496 to a junction 576 and from there along line 578 which is connected to one input of a NOR circuit 94N51. The second input to this last mentioned NOR circuit comes from the NOR circuit 17V67 along conductors 518, 562 and 579. Since the 17V67 circuit porduces a "0" when operating in the INTERNALLY SPECIFIED INDEX mode, at this time the signal on conductor 579 is a "0." The final input to NOR circuit 94N51 arrives by way of conductor 536 and conductor 580 and also gives a logical "0." NOR circuit 94N51 therefore passes a "1" signal on its output conductor 582 to the input of inverter 95N51. The "1" input to this inverter is changed to a "0" signal and is applied by way of the conductor 583 to a first input terminal of NOR circuit 96N51. The second input to this last mentioned inverter is from the 4-phase clock, occurring at time $\phi$1.10. NOR circuit 96N51 is therefore fully enabled. The resulting "1" signal appearing on its output conductor 584 passes to the OR circuit 412 connected to the set terminal of the SCAN flip-flop V60. This signal again sets the SCAN flip-flop to its "1" state.

At the same time that the SCAN flip-flop is being again set a command enable is produced on the output line 586 RESET INPUT REQUEST. This signal is produced by way of the output from 94N51, being inverted by NOR circuit 87N51 and applied as a first signal to the NOR circuit 85N51. The second input to this last mentioned NOR circuit comes from the flip-flops located in the translator circuit; hence, the input request one-shot for only the particular channel specified by the address in priority will be reset.

If at the time during which the T88 flip-flop is in its "1" state the contents of the upper half of the Z-register is equal to the contents of the lower half of the Z-register a command enable will be generated on the line 588, CLEAR INPUT ACTIVE FLIP-FLOP. This enable results when all inputs to the NOR circuit 93N51 are logical "0" 's. One input to this inverter is from the output of the Z-register comparator, thus for a signal to be gated at this time, it is necessary that the comparison result in an equality.

At the end of the second pass through the timing chain the SCAN flip-flop in the *t*-designator was set. The setting of this flip-flop initiates the third pass through the I/O timing chain. It is during this third pass that the second memory cycle takes place, storing the data bits coming from the peripheral equipment at a specified location in memory. The memory is initiated for the second time by a command enable appearing on the line 532 (FIG. 12*a*). The same conditions, previously required for initiating the memory during the $I/O_1$ mode, are again required. Since this has already been completely described, it is unnecessary to trace the source of this command enable again.

At time $\phi$4.10, the T81 flip-flop of the *e*-designator is set to its "1" state. Simultaneously, the contents of the S-register are cleared by the memory to remove the channel address specified by the priority network. At the same time that the S-register is cleared, the command enable CLEAR PRIORITY AND SUB-PRIORITY is again generated on the line 424, thus preparing the input-output section for the processing of another request. The requirements for the production of this command enable have previously been described.

Since at this time the T80 and the $I/O_2$ flip-flops are both set, both inputs to NOR circuit 95N11 are "0" signals, so that command enable transfer $Z_L$ to S will appear on the output conductor 590. The "0" input to NOR circuit 95N11 comes from the "1" side of the $I/O_2$ flip-flop by way of the conductor 470 and a conductor 592. Since the Z-register now holds the index word or location where the data is to be stored, the S-register may be cleared. This occurs in the first part of the memory cycle, but the S-register will be reset so as to hold the contents of the lower part of the Z-register on the next clock phase. As indicated on the timing diagrams, at time $\phi 4.11$, which is 3 phase times subsequent to the clearing of the S-register by the memory timing chain, the Z-register is also cleared by a signal from this same source. At the same time that the Z-register is cleared, the NOR circuit 95N21 is fully enabled because of the "0" inputs from the T82 flip-flop, the $I/O_2$ flip-flop and the translator mode flip-flop 01V34, respectively. NOR circuit 95N21 therefore emits a "1" output signal on conductor 594 which is ANDED together with a signal from the D-sequence timing chain in the 91N21 inverter. This produces a logical "0" signal on a conductor 596. The signal is the command enable DISABLE MEMORY TO $Z_L$. This enable goes to a flip-flop associated with the memory timing chain and, when this flip-flop is set, it destroys anything read out of memory to the lower half of the Z-register during this particular memory reference so that the data read from memory into the Z-register will not later interfere with the data which will be transferred to the Z-register from the peripheral equipment. Similarly, at the same time, when operating in the INTERNALLY SPECIFIED INDEX mode, inverter 96N21 becomes fully enabled so as to produce the command enable DISABLE MEMORY TO $Z_U$ on its output conductor 598. This signal performs the same function as the enable on line 596 in the upper half of the Z-register.

To summarize, the S-register contains the index word and the Z-register is in a cleared condition. Next, the data signals from the peripheral equipment will be gated into the Z-register by an enable signal from the *e*-designator timing chain. The memory cycle which has already been initiated will then store the data which will be put in the Z-register.

The manner in which the command enable TRANSFER DATA TO $Z_L$ AND $Z_U$ is generated may be described as follows. Since the V66 flip-flop located in the supplementary timing chain is in its "0" state (the supplementary timing chain is not used in the INTERNALLY SPECIFIED INDEX mode) a logical "0" will appear on its output line 600 which is connected to the first input terminals of NOR circuits 92N21 and 93N21 by means of junction 686 and conductor 601. As already stated, a "0" signal appears at this time on the conductor 596 connected to the output of NOR circuit 91N21, thus NOR circuits 92N21 and 93N21 are fully enabled. The signals on the output lines 602 and 604 from these last mentioned NOR circuits cause a transfer of the data signals to the lower half of the Z-register.

As was mentioned previously, at the time during which the T82 flip-flop is set during the second run through the timing chain, i.e., during the $I/O_2$ sequence, the NOR circuit 95N21 becomes fully enabled and causes a "1" signal to appear on the input conductor 606 of the 96N21 circuit. This "1" signal is inverted by this last mentioned circuit such that a "0" signal appears at the input terminals of the inverters 97N21 and 98N21. The resulting "1" signal on the lines 608 and 610 are the command enable signals which cause the transfer of data signals from the peripheral equipment to the upper half of the Z-register (TRANSFER DATA TO $Z_U$).

Once the data has been transferred to the memory communications register, it is stored under control of the memory timing chain into the address register specified by the buffer control word contained in the S-register.

While the memory timing chain is controlling the transfer of information into the memory, the *e*-designator timing chain in the input-output control is running and at time $\phi 1.12$ the T83 flip-flop is set. Since at this time the $I/O_2$ flip-flop V62 located in the *t*-designator is also set, the NOR circuit 94N24 is fully enabled such that a "1" signal appears on a conductor 612 connected to the output thereof and this signal is effective to set the DISABLE $I/O_2$ flip-flop V63. The timing chain continues to run in the manner already described and at time $\phi 1.15$ since the T88 flip-flop is in its set condition a logical "1" appears on the output conductor 614 connected to the "0" side thereof and this signal is inverted by circuit 03T88 to thereby place a "0" signal on a first input terminal 616 of NOR circuit 97N51. Another enable to this last mentioned NOR circuit is from the "1" side of the DISABLE $I/O_2$ flip-flop by way of a conductor 618 and this line also has a "0" impressed thereon at this time. NOR circuit 97N51 becomes completely enabled by an input signal from the "1" side of the mode flip-flop V34 (FIGS. 22*a*–22*c*) located in the I/O translator and hence a signal appears on the conductor 620 and serves as the command enable SEND INPUT ACKNOWLEDGE. It may be recalled that this Input Acknowledge signal is the means employed to advise the peripheral equipment that the data transfer has been completed.

Finally, at time $\phi 2.16$ during the DISABLE $I/O_2$ sequence the NOR circuit 13T82 connected to the "1" side of the T81 flip-flop becomes fully enabled and produces a "1" signal on the conductor 436 which is connected to the clear terminal of the DISABLE $I/O_2$ flip-flop.

INTERNALLY SPECIFIED INDEX OUTPUT DATA TRANSFER

Now that the operation of the input-output control circuits has been described in detail for the INTERNALLY SPECIFIED INDEX input data transfer mode, it is felt to be unnecessary to go into such great detail when describing the output data transfer. However, the description will be made specific at the points where the command enables unique to the output data transfer are described.

As in the input mode, when the timing chain is initiated by depressing the Master Clear switch 399 and the Run switch 401 it continues to run, the various flip-flops in the *e*-designator being set and cleared by pulses from a 4-phase clock generator in a definite sequence. During the SCAN sequence, i.e., when the SCAN flip-flop V60 is set, the same command enables are generated in the output mode as were generated in the input mode. More specifically, during the SCAN sequence first the 90N11 inverter is fully enabled so as to produce the command enable on conductor 424 which clears the priority and sub-priority circuits to thereby prepare them for the processing of subsequent requests. Next, a command enable is generated on line 432 which is effective to permit the passage of requests to the sub-priority circuits. The next command enable to be generated occurs at time $\phi 4.2$ when the NOR circuit 97N24 (FIG. 12*c*) becomes fully enabled by output signals from NOR circuit 91N24 and from the inverter 20V52 located in the sub-priority network. The resulting output on line 456 is effective to gate output request signals on one or more channels to the priority network. During the time that the T88 flip-flop is set during the SCAN sequence, the NOR circuit 90N51 becomes fully enabled in the manner previously described and produces an output signal on the conductor 500 which is effective to clear the SCAN flip-flop. At approximately the same time NOR circuit 13V66 becomes fully enabled to thereby set the $I/O_1$ flip-flop V61. This completes the SCAN cycle. As before, if no requests were detected during the SCAN cycle, the Input-Output section would remain in its SCAN mode until such a request is presented and detected.

As in the input mode during the $I/O_1$ cycle, the inverter 57H04 becomes enabled to produce the command enable PROGRAM LOCKOUT. This signal is utilized by the B-sequence timing chain and is effective to prevent the computer from processing further instructions until the data transfer being performed has been completed. During the $I/O_1$ mode, the memory timing chain is initiated when the command enable is produced on the output conductor 532 coming from NOR circuit 19V61. This command causes the memory timing chain to run concurrently with the *e*-designator timing chain such that the index word is read out from its register in memory to the Z-register and such that the index word is incremented by one and restored back into memory at the address specified. Next, the command enable TRANSFER CHANNEL ADDRESS TO S is produced on the conductor 534. This command enable is effective to cause a transfer of the channel address from the priority network to the S-register so that the memory timing chain can then effect a read out of the index word located at the specified channel address.

As the *e*-designator timing chain continues to run, the DISABLE $I/O_1$ flip-flop in the *t*-designator will be set. During the time that this flip-flop is set a signal is first produced on conductor 570 to clear the translator flip-flops of their previous contents. Shortly thereafter, the command enable TRANSFER CHANNEL ADDRESS TO TRANSLATOR is produced on this same line. This causes certain preselected flip-flops in the translator to be set in accordance with the channel number as determined by the priority network and also causes the mode flip-flops in the translator to be set so as to identify the particular type of communication (either input or output) to be specified. The same signal which serves as the command enable to transfer the channel address to the translator also passes by way of the conductor 572 to set the $I/O_2$ (V62) flip-flop in the *t*-designator to its "1" state.

Whereas in the input mode the next command enable to be generated was the signal on line 586 RESET INPUT REQUEST, in the output mode the corresponding command enable is not generated until sometime later. The next command enable to be generated in the output mode is CLEAR OUTPUT ACTIVE FLIP-FLOPS. This command enable is produced on a conductor 622 which is connected to the output of NOR circuit 89N51. The conditions necessary before this command enable will be generated are that the T88 flip-flop and the DISABLE $I/O_1$ flip-flops be set, that the Input-Output section be operating in the INTERNALLY SPECIFIED INDEX mode such that inverter 17V67 is producing a logical "0" output on conductor 518, and finally that the Z-register comparator be producing "0" output signal indicating that the contents of the upper half of the Z-register is equal to that of the lower half. As long as the comparator fails to indicate equality, this last mentioned command enable will not be generated and the particular channel in question will remain in its active condition.

In the $I/O_2$ mode at the time during which the T80 flip-flop is set, the contents of the lower half of the Z-register, i.e., the index word, is transmitted to the storage address register (S-register) by means of the command enable generated on the output line 590 coming from NOR circuit 95N11. Now, when the memory is again initiated by a command enable appearing on the conductor 532, the data word located in the memory at the address specified by the present contents of the S-register will be read into the Z-register.

In order to prepare the output register $C_O$ for the transmission of the data signals thereto, this register is first cleared by means of a command enable CLEAR $C_O$ appearing on the output conductor 624 coming from the 87N24 inverter. To produce this command enable, the inverter 94N24 must be fully enabled. For this condition to be met, it is necessary that T83 flip-flop be in its "1" state and also that the $I/O_2$ flip-flop V62 be in its "1" state. When the $I/O_2$ flip-flop is in its "1" state, a logical "0" appears on its output conductor 470 which is connected to one input of the 94N24 inverter by means of conductors 468 and 626. The resulting "1" signal on the output line 628 coming from NOR circuit 94N24 is applied to the input terminal of an inverter 95N24 to thus cause a "0" signal to appear on the conductor 630 which serves as a first input to NOR circuit 87N24. The remaining condition required for the production of the CLEAR $C_O$ command enable is that the inverter 03V36 located in the translator (FIGS. 22*a*–22*c*) be producing a "0" signal. This last mentioned inverter produces such a signal whenever the output mode of communication is being specified by the mode flip-flops contained in the translator.

Following the clearing of the $C_O$ register, the data contained in the Z-register must be transferred thereto. In order to effect this data transfer, the gates associated with the $C_O$ register must be enabled. The command enable TRANSFER Z to $C_O$ performs this function. In order to generate this command it is a requirement that the $I/O_2$ flip-flop and the T84 flip-flop be set and that the inverter 03V36 associated with the mode specifying flip-flop in the translator be outputting a logical "0." Under these conditions, the NOR circuits 92N31 and 93N31 are fully enabled so that "1" signals appear on the output lines 632 and 634.

At the time that the 94N24 inverter was enabled so as to ultimately cause the generation of the CLEAR $C_O$ command, the "1" output signal therefrom passed along a conductor 612 to set the DISABLE $I/O_2$ flip-flop V63.

During the time that the DISABLE $I/O_2$ flip-flop is set the *e*-designator timing chain continues to run. At the time when the T90 flip-flop is set by means of a "1" signal appearing on the conductor 520 it outputs on "0" signal on a conductor 638 connected to the "1" side thereof and this signal is applied as a first input to the NOR circuit 90N54. The other input to this last mentioned NOR circuit comes by way of conductors 618 and 640 from the "1" side of the DISABLE $I/O_2$ flip-flop V63 and since at this time this flip-flop is set, NOR circuit 90N54 is enabled and outputs a "1" to the input terminal of inverter 91N54. The resulting "0" output signal on the line 642 passes through NOR circuit 94N54 and is inverted thereby to cause a "1" output signal on a line 644, provided the inverter 03V36 associated with the mode specifying flip-flops of the translator is outputting a logical "0." When an Output request is being processed, inverter 03V36 outputs a "0" signal and hence a "1" appears on line 644 and serves as the command enable SEND OUTPUT ACKNOWLEDGE.

The same signal on line 644 also appears on a conductor 646 which is the command enable RESET OUTPUT REQUEST ONE-SHOTS.

This completes the description of the operation of the input-output control circuits for the INTERNALLY SPECIFIED INDEX output mode.

Before describing the operation of the control circuits when the Input-Output section is operating in its EXTERNALLY SPECIFIED INDEX OR ADDRESS modes, the means employed for determining which of these modes will be operative will be described.

Referring to FIGS. 12*n* and 12*p* there is shown a row of NOR circuits indicated generally by the numeral 648, there being one such circuit for each communication channel. While the equipment required for only six channels is actually illustrated in these figures, it should be understood that a greater or fewer number of such channels may be employed. The NOR circuit for each channel, in turn, provides an output signal which serves as an input for a set of two gated amplifier circuits. For example, the NOR circuit 650 associated with channel 2 provides an output connection to the two gated amplifiers 652 and 554. The other inputs to the gated amplifier circuits come by way of a pair of control lines from the peripheral equipment connected to the communication channel. These special bit input terminals are labeled A and B respectively in FIGS. 12*n* and 12*p*. Depending on the signals appearing at these inputs, the Input-Output section will operate in one of three possible modes as indicated in the table shown below.

TABLE I

| A | B | Mode |
|---|---|---|
| 0 | 1 | Ext. Sp. Index |
| 1 | 0 | Ext. Sp. Add. |
| 1 | 1 | Int. Sp. Index |

The gated amplifier circuits indicated generally by the numberal 656 not only control the application of the special bits to the remaining portion of the address specifying circuitry, but also adapt the signal level employed between the peripheral equipment and the computer to the signal level employed within the computer itself so as to make the two compatible. The outputs from those gated amplifiers are interconnected with a set of NOR circuits 12V66, 12V67, 14V66 and 14V67 in such a manner that a translation of these signals takes place. The signals appearing at the output of this last mentioned set of NOR circuits are fed to respective inputs of a set of inverters 13V66, 13V67, 15V66 and 15V67 which in turn provide signals to still another lever of NOR circuits 16V66, 16V67 and 18V67. As will be seen, when the output from NOR circuit 16V66 is a logical "0," the Input-Output section will operate in the EXTERNALLY SPECIFIED INDEX mode whereas if the output from the NOR circuit 18V67 is a logical "0," the Input-Output section will operate in its EXTERNALLY SPECIFIED ADDRESS mode. As has already been mentioned, when the output signals from the NOR circuits 17V66 and 17V67, which are respectively connected to the NOR circuits 16V66 and 18V67, are "0" signals, the computer is made to operate in the INTERNALLY SPECIFIED INDEX mode. As an example, assume that the peripheral equipment on channel 2 is operating in the EXTERNALLY SPECIFIED INDEX mode such that special bit A is a "0" and special bit B is a "1," the input to the OR INVERTER 650 comes from the priority network when the channel presenting an Output request and having the highest priority is determined. In other words, an incoming request is processed by the sub-priority network to determine the type of request which will be honored and then the priority network selects one channel on which this request is present, and causes a "1" signal to be applied to one of the inverter circuits 648 associated with this selected channel. The "1" signal coming in on the channel 2 input line is inverted by NOR circuit 650 such that a "0" signal appears at one of the input terminals of each of the NOR circuits 652 and 654. Since it has been assumed that the other input to NOR circuit 652 on the special bit line is a "0," this circuit will be fully enabled and will cause a "1" signal to appear on its output conductor 658. Because it has been assumed that the special bit input B is a "1" signal, NOR circuit 654 will have a "0" on its output conductor 660. Only one channel can be operating at a time (the channel as determined by the priority network) and therefore the remaining gated amplifiers 656 will all be producing "0" signals on their respective output lines. A "1" signal appearing on conductor 658 causes a "0" signal to appear on the output conductor 662 of the 14V66 inverter and this signal is inverted so that a "1" signal appears on the conductor 664 connected to the output of NOR circuit 15V66. NOR circuit 16V66 inverts this logical "1" input and hence a "0" signal appears at the output conductor 666. The output from NOR circuit 18V67 will be a "1" signal under the assumed conditions, since only NOR circuit 14V66 had a logical "1" signal applied thereto. As already mentioned, a "0" appearingly only at the output of NOR circuit 16V66 is effective to cause the equipment to operate in the EXTERNALLY SPECIFIED INDEX mode. By following this same type of analysis and by choosing the other combinations of special bits illustrated in Table I, different combinations of signals will appear at the output terminals of the NOR circuit 16V66 and 18V67 so as to cause the equipment to operate either in the EXTERNALLY SPECIFIED ADDRESS mode or the INTERNALLY SPECIFIED INDEX mode. The manner in which these last mentioned output signals are used to determine the mode of operation will become apparent presently when the details of the input-output control circuits are described for the EXTERNALLY SPECIFIED INDEX and EXTERNALLY SPECIFIED ADDRESS modes.

EXTERNALLY SPECIFIED INDEX—INPUT MODE

Referring now to the timing diagrams of FIGS. 15*a* and 15*b* and again to the illustration of the input-output control circuits of FIGS. 12*a* through 12*p*, the details of the operation of the circuits in the EXTERNALLY SPECIFIED INDEX mode will be described.

The timing chain is initiated in the same manner as before. That is, at the $\phi 2$ time following the closing of the Master Clear switch 399 and the Run switch 401, the NOR circuit 13V60 becomes fully enabled and outputs a "1" signal on the conductor 402 and this signal appears at the junction 404. The signal then first passes by way of a conductor 406 and through the OR circuit 410 to set the T80 flip-flop of the *e*-designator timing chain. Secondly, the "1" appearing at junction 404 passes via conductor 408 and through OR circuit 412 to set the SCAN flip-flop to its "1" state. With the SCAN flip-flop now set, a "0" signal appears at the junction 416 and passes from there through conductor 418 to a first terminal of NOR circuit 90N11. Because the T80 flip-flop is now set, a "1" signal apears at the "0" side thereof and is conveyed by means of the conductor 420 to an input of NOR circuit 03T80. This "1" signal is inverted so that a "0" signal appears on the output conductor 422 of NOR circuit 03T80. This last mentioned conductor is connected to a second input of NOR circuit 90N11. Both inputs to this inverter being "0's," a "1" signal appears on its output conductor 424 and serves as the command enable CLEAR PRIORITY and SUB-PRIORITY.

At time $\phi 4.0$ the NOR circuit 13T81 becomes fully enabled, emitting a "1" signal on its output conductor 426. This signal is effective to set the V91 flip-flop and the T81 flip-flop.

The "0" signal appearing at the output junction 416 of the SCAN flip-flop V60 passes by way of conductor 428 to a first input terminal of NOR circuit 90N13. The second input of this NOR circuits comes by way of conductor 430 which is connected to the "1" side of the T81 flip-flop. It can be seen then, that NOR circuit 90N13 is enabled and produces a "1" signal on conductor 432. This signal is the command enable SEND REQUEST TO SUB-PRIORITY.

At time $\phi 2.1$ the "0" signal appearing at the output from the "1" side of the T81 flip-flop passes through and is inverted by the NOR circuit 13T82. The resulting "1" signal at junction 434 is carried by conductors 436 and 438 to clear the T80 flip-flop. This "1" signal also passes through the conductor 440 to set the T82 flip-flop to its "1" state.

At $\phi 1.2$ the logical "0" signal appearing at the "1" side of the T82 flip-flop is inverted by NOR circuit 13T83. The resulting"1" signal developed on its output conductor 442 sets the T83 flip-flop. Conductor 446 carries the resulting "0" signal appearing at junction 444 to a first input terminal of NOR circuit 90N24. NOR circuit 90N24 also receives a "0" signal from the "1" side of the SCAN flip-flop by way of conductors 414, 428 and 448. It is therefore fully enabled and outputs a "1" signal on conductor 452 connected to the input of inverter 91N24. The resulting "0" output from inverter 91N24 is applied to a first input terminal of NOR circuit 89N24. The second input to this last mentioned NOR circuit comes from the output of the 20V51 inverter connected to the Input flip-flop in the sub-priority network (FIGS. 20*a* and 20*b*). The resulting "1" signal apearing on conductor 458 is the command enable serving to gate the Input requests to priority.

The timing chain continues to run and at time $\phi2.2$ NOR circuit 13T84 becomes enabled producing a "1" signal on conductor 464 to set the T84 flip-flop to its "1" state. Simultaneously, NOR circuit 12T82, connected to the "0" side of the T81 flip-flop, emits a "1" signal on its output conductor 462 to clear the T82 flip-flop.

At time $\phi3.2$ NOR circuit 13T85 is fully enabled and generates a signal on its output conductor 472 setting the T85 flip-flop. At time $\phi2.3$ NOR circuit 13T86 outputs a "1" signal on conductor 476 which sets the T86 flip-flop. Next, at time $\phi3.3$ the "0" signal provided at the "1" side T86 flip-flop passes through and is inverted by NOR circuit 13T87 to effect a "1" signal on conductors 482 and 484. This sets the T87 flip-flop. This same signal passes by way of conductor 482 to the "0" side of the T85 flip-flop to clear it.

The "0" output from the "1" side of the T87 flip-flop passes by way of conductor 486 to one input terminal of NOR circuit 23V16 associated with the memory access flip-flop. Another input to this last mentioned NOR circuit comes from the output of NOR circuit 03V60 by way of conductor 487 and when the SCAN flip-flop is set, it is a "0" signal. Still another input to the NOR circuit 23V16 comes from inverter 22V16. In order to effect a "0" output from this last mentioned inverter, it is necessary that request of some type be present in the priority network. If so, a "1" signal is applied to one of the input terminals of NOR circuit 22V16. At $\phi2.4$ then, NOR circuit 23V16 becomes fully enabled and outputs a signal effective to set the memory access flip-flop.

The foregoing operation is identical to that which occurred during the INTERNALLY SPECIFIED INDEX mode. At this point in the EXTERNALLY SPECIFIED INDEX mode, the supplementary timing chain comprised of the flip-flops V66 and L70 through L73 shown on FIGS. 12*f* and 12*g* comes into play. This timing chain is used only in the EXTERNALLY SPECIFIED INDEX and ADDRESS modes. It differs from the *e*-designator timing chain in that it is used only once during each data word transfer. For the INTERNALLY SPECIFIED INDEX mode it may be recalled that it took three passes through the *e*-designator timing chain to complete a data word transfer. When either of the other two modes are in operation, it takes the three main timing chains plus the supplementary chain.

In the EXTERNALLY SPECIFIED INDEX mode the supplementary timing chain will be initiated at the end of the first main timing chain in which a request is detected.

The first flip-flop in the supplementary chain, that is, flip-flop L70, is initially set by means of the "1" signal appearing at the output of the NOR circuit 13L70. The output from 13L70 is applied by way of conductor 668 to a junction point 670. From there the signal follows conductor 672 and passes through OR circuit 674 to effect the setting of the L70 flip-flop.

In order for NOR circuit 13L70 to be fully enabled, several conditions must be met. First of all, the mode specifying circuitry must be detecting special bit inputs indicative of the EXTERNALLY SPECIFIED INDEX mode (see Table I). As has already been explained, when such is the case, NOR circuit 16V66 outputs a "0" signal along conductors 676 and 678 to a first input to NOR circuit 13L70. Secondly, the memory access flip-flop V16 must be set. When this is so, a "0" signal appears on its output conductor 498 and passes by way of a conductor 680 to a second input of NOR circuit 13L70. A third condition which must be satisfied before flip-flop L70 can be set is that the memory is available for use by the Input-Output section. When available, a flip-flop in the memory timing chain (not shown) is set and the resulting "0" signal is applied to the input terminal 682 of NOR circuit 13L70. Finally, if the Input-Output section is not locked out by a command enable generated during the A-sequence, at time $\phi4.4$ NOR circuit 13L70 will become fully enabled setting the L70 flip-flop. It should be understood that whenever the main control section of the computer is executing an Input or an Output Buffer Instruction a "1" signal will be sent from the A-sequence to NOR circuit 13L70 to disable it, thereby preventing a data transfer by the Input-Output section unit the completion of the execution of the Input or Output Instruction. The output from NOR circuit 13L70 also passes from junction 670 by way of a conductor 684 to set the V66 flip-flop to its "1" state. The setting of the V66 flip-flop causes a "1" signal to be applied to the conductor 600 connected to its "0" side. This signal appears at a junction 686. From there, the "1" signal is carried via a conductor 688 to the conductor 519. The signal on conductor 519 is the command enable PROGRAM LOCKOUT. As mentioned previously, this command enable prevents the main control section of the computer from processing further instructions until the memory is again available after the completion of the current data transfer.

The signal which was used to set the V66 and L70 flip-flops is also conveyed by way of a conductor 690 to the NOR circuit 10V30 associated with the I/O translator (FIGS. 22*a*–22*c*). This signal is a command enable which at time $\phi1.5$ clears the translator of its previous contents.

When the L70 flip-flop is in its set condition a logical "1" appears on the output conductor 692 connected to its "0" side. This "1" signal serves as the command enable TRANSFER CHANNEL ADDRESS TO TRANSLATOR. The translator is at this time loaded with the address of the particular channel selected by the priority network.

At time $\phi2.5$ the "0" signal appearing on the conductor 694, connected to the "1" side of the L70 flip-flop, passes through NOR circuit 13L71 and is inverted so that a logical "1" appears at the junction 696. From this junction the "1" signal follows a conductor 698 to clear the memory access flip-flop. A conductor 700 also connected to the junction 696 carries the "1" signal to the input to the "1" side of the L71 flip-flop thereby setting it. The setting of the L71 flip-flop causes a "1" signal to be applied to the conductor 702. This signal serves as the command enable CLEAR Z-REGISTER. This enable clears out the previous contents of the Z-register, preparing it for the later acceptance of new information.

Next, at $\phi4.5$ the "0" signal appearing at the output of the "1" side of the L71 flip-flop is inverted by NOR circuit 13L72 to produce a "1" signal at the junction point 704. From there, this signal, first of all, passes by way of a conductor 706 to the "0" input terminal of the L70 flip-flop to thereby reset it to its "0" state. Secondly, the output signal appearing at junction 704 passes via conductor 708 to set the L72 flip-flop.

The "0" output from the "1" side of the L72 flip-flop passes through NOR circuit 13L73 at time $\phi2.6$ causing a "1" signal to appear at the junction 710. From junction 710 this signal passes by way of a conductor 712 to clear the L71 flip-flop, and by way of a conductor 714 to set the L73 flip-flop.

When the L73 flip-flop is in its set condition, a "1" signal appears on the conductor 716 connected to the "0" side thereof. This signal is conveyed by way of a conductor 718 to selected bit positions in the lower half of the Z-register. Also, at this same time a logical "0" signal appearing at the output line 720 connected to the "1" side of the L73 flip-flop is inverted by NOR circuit 02L73 to produce a "1" signal on conductor 722. The command enable signals appearing at this time on conductors 718 and 722 are effective to permit the transfer of the lower 15 bits of data on the selected channel to the Z-register. It should be recalled that in the EXTERNALLY SPECIFIED INDEX mode the lower 15 bits of the data word coming from the peripheral equipment are address representing signals specifying the address in memory where the index word to be used may be found.

The logical "0" signal appearing on output conductor 720 also passes by way of conductor 724 to a junction point 726 (FIG. 12*b*) and from there along a conductor 728 to a first input of NOR circuit 15V61. Another input to this circuit comes from the output of NOR circuit 16V66 in the mode specifying circuits by way of conductor 676. It should be recalled that when the apparatus is operating in the EXTERNALLY SPECIFIED INDEX mode, NOR circuit 16V66 outputs a "0" signal. At time $\phi$4.6 NOR circuit 15V61 becomes enabled and produces a "1" signal on its output conductor 730. This signal passes through OR circuit 732 to set the $I/O_1$ flip-flop V61 in the *t*-designator. Except for the clearing out of the L72 and L73 flip-flops which takes place in due course, this completes the supplementary timing chain cycle and initiates the $I/O_1$ cycle.

At time $\phi$2.7 NOR circuit 13T80 is enabled and outputs a "1" signal on the conductor 524 which passes through OR circuit 410 to set the T80 flip-flop. One of the enables required to set the T80 flip-flop comes from NOR circuit 05V60. Since this circuit is connected to the conductor 514 attached to the "0" side of the $I/O_1$ flip-flop, and since at this time the $I/O_1$ flip-flop is in its set condition, it receives a "1" signal by way of the conductor 734.

With the T80 flip-flop set, a "1" signal appears on conductor 420 thereby causing a "0" signal to appear on the output conductor 422 of NOR circuit 03T80. This logical "0" is one of the enables required by NOR circuit 19V61. The other enable to it is applied by way of conductor 530 which is connected to the output of NOR circuit 18V61. In order for the signal appearing on conductor 530 to be a "0," it is required that one of the inputs to 18V61 by a "1" signal. NOR circuit 17V61 is fully enabled at this time by a "0" signal coming from the "1" side of the $I/O_1$ flip-flop via conductor 526, and by a logical "0" signal from inverter 17V67 connected to the input of NOR circuit 17V61 by way of the conductor 518. It therefore oututs a "1" signal on conductor 528. Whenever the Input-Output section is operating in the EXTERNALLY SPECIFIED INDEX mode, the special bit inputs A and B (FIGS. 12*n* and 12*p*) on the particular channel will be such that the output from NOR circuit 17V67 is always a "0" signal. With all of its inputs maintained at the "0" level, NOR circuit 19V61 emits a logical "1" command enable INITIATE MEMORY signal on its output conductor 532. This signal starts the memory timing chain (not shown) running concurrently with the *e*-designator timing chain. It should be recalled that at time $\phi$1.7 the supplementary timing chain forced the transmission of the externally provided address for an index word to the lower half of the Z-register. In order to access the index word itself, it is necessary that the address contained at this time in the lower half of the Z-register be transferred to the storage address register or S-register. The command enable for effecting this transfer appears on a conductor 736 connected to the output of NOR circuit 93N11. When the T80 flip-flop is set, NOR circuit 03T80 emits a "0" signal to one input of NOR circuit 93N11. The other input to this circuit comes by way of a conductor 738 connected to the "1" side of the V66 flip-flop in the supplementary timing chain. By referring to the timing diagram of FIGS. 15*a* and 15*b* it can be seen that the V66 flip-flop was set at time $\phi$4.4 and still remains in its set condition. Since the memory is running and an address is in the S-register, the contents loca'ed at this address (the index word) is read out from memory and held in the Z-register.

At phase time 4.7 the NOR circuit 13T81 becomes fully enabled, producing a "1" signal on the output conductor 426. This signal sets the T81 flip-flop in the *e*-designator. On the next succeding $\phi$2 time, the "0" signal from the output of the "1" side of the T81 flip-flop is inverted by NOR circuit 13T82, setting the T82 flip-flop. The T82 flip-flop being set, a "0" signal is applied by way of a conductor 740 to a first input terminal of NOR circuit 89N21. Another input to this NOR circuit comes by way of conductor 558 which receives the inverted output from the "0" side of the $I/O_1$ flip-flop V61. Because flip-flop V61 is set, the signal on conductor 558 is a "0." The final input to NOR circuit 89N21 comes from the output of NOR circuit 19V67 by way of conductors 536 and 540. When the apparatus is operating in its EXTERNALLY SPECIFIED INDEX mode NOR circuit 19V67 is outputting a logical "0" signal. NOR circuit 89N21 is now fully enabled to produce the command enable INCREMENT $Z_L$. During the restore portion of the memory timing chain, the incremented index word is replaced in memory at the address contained in the S-register.

At the same time that the incrementing flip-flop is set in the $Z_L$ counter (FIG. 28) by the command enable INCREMENT $Z_L$, the DISABLE $I/O_1$ flip-flop in the *t*-designator was also set. The signal for setting the DISABLE $I/O_1$ flip-flop is developed by NOR circuit 94N21 and is carried by way of the conductor 554. When the T82 flip-flop is set 94N21 is fully enabled.

A signal continues down the timing chain and at the $\phi$3 time following the setting of the T86 flip-flop, NOR circuit 13T87 becomes fully enabled, setting the T87 flip-flop and clearing the T85 flip-flop. When the T87 flip-flop is set, a "0" appears on its output conductor 486. This signal is applied as a first input to NOR circuit 94N42. A second input to it comes from the "1" side of the DISABLE $I/O_1$ flip-flop V64 via conductors 564, 566 and 568. The final input to Nor circuit 94N42 comes from the output of NOR circuit 17V67 by way of the conductors 518 and 562. Because all of these inputs are simultaneously "0" signals, a "1" signal appears on conductor 570 to clear the translator. On the next succeeding phase time ($\phi$2.11) the translator is again reset to the same channel number.

At the following $\phi$2 time NOR circuit 13T88 becomes fully enabled to produce a logical "1" output signal on the conductor 488. This signal appears at the junction 490 and passes through conductor 494 to set the T88 flip-flop. This "1" signal also follows conductor 492 to clear the T86 flip-flop.

When the T88 flip-flop is set, it outputs a "0" signal on the conductor 496 which is connected by conductor 578 to a first input terminal of NOR circuit 94N51. The other inputs to this inverter come from NOR circuits 19V67 and 17V67 by way of the conductors 536 and 518, respectively. With the apparatus operating in the EXTERNALLY SPECIFIED INDEX mode, these last two inputs are "0"'s. Hence, NOR circuit 94N51 supplies a "1" signal to inverters 87N51 and 95N51. The signal appearing at the output of inverter 95N51 passes through inverter 96N51 at time $\phi$1.12 and then progresses by way of conductor 584 and the OR circuit 412 to again set the SCAN flip-flop V60. Simultaneously, the output from inverter 87N51 is ANDED together with a signal from the translator in NOR circuit 85N51 so as to produce a command enable on a conductor 586 RESET INPUT REQUEST. This signal goes to the input request one-shot circuit (FIG. 19) on the selected channel to clear it.

Another logic block which becomes fully enabled at the time during which the T88 flip-flop is set is the NOR circuit 86N51. This circuit receives its input signals from the "1" side of the DISABLE $I/O_1$ flip-flop by way of conductors 564, 566 and 567, from the "1" side of the T88 flip-flop, from the output of NOR circuit 19V67, and finally from the output of inverter 20V51 located in the sub-priority network (FIGS. 20*a* and 20*b*). NOR circuit 86N51 is fully enabled by these signals and emits a "1" signal on its output conductor 744. This is the command enable CLEAR INPUT ACKNOWLEDGE and is effective to clear the input acknowledge flip-flop which was set at the completion of the next preceding input data transfer.

At phase time 1.12 which follows the setting of the T88 flip-flop, the input active flip-flop on the selected channel is cleared, provided that the contents of the lower half of the Z-register is equal to that of the upper half. If this condition is satisfied, NOR circuit 93N51 becomes fully enabled to output a "1" signal on the conductor 588. As can be seen from FIG. 12*e*, NOR circuit 93N51 has three input terminals, all of which must be held at 0 volts (a logical "0") in order to generate the command enable CLEAR INPUT ACTIVE FLIP-FLOP. A first input to this NOR circuit comes from the Input flip-flop of the sub-priority network (FIG. 20*b*). This signal is a "0" provided the Input flip-flop is in a set condition. It can be seen that if some other type of request other than an Input Request is being honored at this time, the signal to clear the input active flip-flop will not be generated.

At time $\phi$1.12 NOR circuit 96N51 becomes enabled and produces a "1" signal on its output conductor 584. This conductor leads to an input terminal of OR circuit 412 and this "1" signal set sthe SCAN flip-flop. The setting of this flip-flop starts a third pass through the input-output control circuits. At time $\phi$2.12 the inverted output from the "0" side of the SCAN flip-flop which appears on conductor 505 (FIG. 12*h*) is ANDED together with the output from the T90 flip-flop appearing on the conductor 503. NOR circuit 12T80 is therefore enabled, outputting a "1" signal which passes through OR circuit 410 to set the T80 flip-flop. With the flip-flop in its set condition, a "1" signal appears on the conductor 420 connected to the "0" side thereof. This signal passes through the inverters 03T80 and 90N11 to produce a "1" signal on the output conductor 424. This signal serves as the command enable CLEAR PRIORITY AND SUB-PRIORITY. At this point the Input-Output section is free to accept and process other requests.

The output from the "1" side of the T80 flip-flop is now a "0" signal and is applied as a first input to NOR circuit 95N11. The second input to NOR circuit 95N11 comes by way of the conductors 592 and 470 from the "1" side of the $I/O_2$ flip-flop V62. Since the V62 flip-flop is set at this time, NOR circuit 95N11 is enabled and generates the command enable TRANSFER $Z_L$ to S. Since the present contents of $Z_L$ is the index word, when it is transferred to the S-register it will result in the data being stored at the address indicated by the index word.

Next, the memory is again initiated by the generation of a "1" output on conductor 532. In order for this signal to appear, it is necessary that both the inputs to the NOR circuit 19V61 be "0" signals. The first input to this inverter is the inverted output from the "0" side of the T80 flip-flop. Its second input comes from the output of NOR circuit 18V61 by way of conductor 530. Since the $I/O_2$ flip-flop is set a '1" signal appears on its output conductor 746 and provides the second input to NOR circuit 18V61. This inverter changes the "1" input to a "0" output signal on the conductor 530. Now that the memory has been initiated, the memory timing chain outputs a signal to clear the Z-resigter.

As indicated on the timing diagrams (FIGS. 15*a* and 15*b*), at the same time that the memory control circuits clear out the Z-register, NOR circuit 96N21 becomes enabled and outputs a "1" signal on the conductor 598. This signal serves as the command enable DISABLE MEMORY $Z_U$. As has already been discussed, this signal goes to a flip-flop associated with the memory timing chain and when it is set, it destroys anything read out of memory to the upper half of the Z-register during this particular memory reference. This prohibits data read from memory into the Z-register from interfering with the data which is to be later transferred to the Z-register from the peripheral equipment.

At time $\phi$1.14 the T82 flip-flop is in a set condition and is outputting a "0" on the conductor 740. This signal appears as one input to NOR circuit 95N21. A second input to this NOR circuit comes from the "1" side of the $I/O_2$ flip-flop via conductors 470 and 471. As is indicated by the timing diagram, the $I/O_2$ flip-flop is set at this time. Hence, a "0" is applied to the second input terminal of NOR circuit 95N21. The final input to this last mentioned NOR circuit comes from the I/O translator flip-flop V34 (FIG. 22*c*) and this flip-flop is set whenever the Input-Output section is processing an Input Request. Hence, a "1" signal appears on an output conductor 606 connected to the output from NOR circuit 95N21. This signal passes through and is inverted by it and a "0" signal appears at the input of inverter 97N21. The resulting output signal on conductor 608 is a "1" and is the command enable TRANSFER DATA TO $Z_U$. This signal goes to the gates associated with the upper half of the Z-register and is effective to permit the passage of the data signals from the input amplifiers to the flip-flops in the upper half of the Z-register. The memory timing chain now operates to store the data representing signal into the memory at the address specified by the index word now contained in the S-register. The data has now been received by the computer and stored in the upper half of the memory register specified by the index word. The lower half of this memory register remains unchanged.

The timing chain continues to run. When the T83 flip-flop is set, it outputs a logical "0" signal on a conductor connected to a first input terminal of NOR circuit 94N24. The second input to this circuit comes from the "1" side of the $I/O_2$ flip-flop by way of the conductors 470, 468 and 626. Because this flip-flop is set the signal appearing on these lines is a "0." NOR circuit 94N24 becomes fully enabled and a "1" signal appears on its output conductor 612 which sets the DISABLE $I/O_2$ flip-flop V63. When the T88 flip-flop is subsequently set, a "1" signal appears on the output conductor 614 connected to the "0" side thereof. This signal is inverted by NOR circuit 03T88 to produce a "0" signal on the conductor 616 providing an input to the NOR circuit 97N51. A second input to this NOR circuit comes from the "1" side of the DISABLE $I/O_2$ flip-flop by way of conductor 618. The third logical "0" input for NOR circuit 97N51 comes from the mode flip-flop in the I/O translator. As has already been mentioned, the V34 flip-flop is set and outputs a logical "0" signal whenever the Input-Output section is processing an input data transfer. It can be seen then that NOR circuit 97N51 is fully enabled at this time, and causes a "1" signal to appear on its output conductor 620. This signal is the command enable SEND INPUT ACKNOWLEDGE. This causes the Input Acknowledge signal to be sent to the peripheral device to advise it that the computer has sampled the data lines and stored the information in memory.

This completes the discussion of the operation of the control circuits when the computer is operating in its EXTERNALLY SPECIFIED INDEX input mode.

EXTERNALLY SPECIFIED INDEX-OUTPUT MODE

Because the manner in which the control circuits operate in the EXTERNALLY SPECIFIED INDEX output mode is substantially similar to their operation in the EXTERNALLY SPECIFIED INDEX input mode, it is felt to be unnecessary to again trace through the circuits in great detail. Only the generation of signals unique to the output mode will be described. In accordance with the foregoing statement the operation of the control circuits for the output mode is identical to that of the input mode through the point during the $I/O_1$ cycle when the index word is read out of memory, held in the Z-register, incremented, and replaced into memory.

Referring to the timing diagrams of FIGS. 16*a* and 16*b*, at time $\phi$1.12 the T88 flip-flop is set and a "0" signal appears on the conductors 496 and 578. This signal is applied as a first input to NOR circuit 94N51. A second input to this NOR circuit comes by way of the conductor 536 from the output of NOR circuit 19V67. When operating in the EXTERNALLY SPECIFIED INDEX mode, the output from 19V67 is a "0" signal. The final input to NOR circuit 94N51 comes from the output of NOR circuit 17V67 by way of conductors 518, 562, and 579. The output from NOR circuit 17V67 is likewise a logical "0" signal whenever the special bit inputs A and B are set to cause operation in the EXTERNALLY SPECIFIED INDEX mode. Inverter 94N51 is therefore fully enabled and outputs a "1" signal on the conductor 582. This "1" signal is inverted by NOR circuit 95N51 causing a "0" signal to appear on the conductor 746. This signal serves as a first input to NOR circuit 91N51. The other input to this circuit comes from a flip-flop in the I/O translator. When the apparatus is performing an output buffer transfer this translator flip-flop is set. NOR circuit 91N51 is therefore fully enabled and outputs a "1" signal on the conductor 748. This is the command enable CLEAR OUTPUT ACKNOWLEDGE and is effective to remove the Output Acknowledge signal generated toward the end of a previous output buffer transfer.

At this same time, if the Z-register comparator is indicating that $Z_L$ is equal to $Z_U$, NOR circuit 89N51 (FIG. 12*e*) becomes fully enabled to produce the command enable CLEAR OUTPUT ACTIVE FLIP-FLOP on the conductor 622. To insure that this signal is only generated during an output data transfer, one of the conditions which must be satisfied to fully enable NOR circuit 89N51 is that the Output flip-flop in the sub-priority network (FIG. 20*b*) be set so that the output from NOR circuit 21V52 associated with the Output flip-flop is a logical "0" signal. At time $\phi$1.13 both the T80 flip-flop, in the *e*-designator and the $I/O_2$ flip-flop in the *t*-designator are set to fully enable NOR circuit 95N11. The resulting signal on the conductor 590 is the command enable which effects a transfer of the lower 15 bits of the Z-register to the S-register. It may be recalled that at this time $Z_L$ contains the index word. When the memory timing chain is initiated, the contents of the memory at the address specified by the index word is read out to the Z-register. The memory timing chain is initiated at the instant that the T80 flip-flop is set because at this time NOR circuit 19V61 becomes fully enabled. The manner in which the inputs for 19V61 are generated has already been described in connection with the description of the operation of the input-output control circuits for the EXTERNALLY SPECIFIED INDEX input mode.

The timing chain continues to run and at time $\phi$1.14 the NOR circuit 13T83 becomes fully enabled outputting a "1" signal on the conductor 442 to set the T83 flip-flop. The $I/O_2$ flip-flop V62 being set, a logical "0" signal is applied by way of the conductors 470, 468 and 626 to a first input terminal of NOR circuit 94N24. The other input to this circuit comes from the "1" side of the T83 flip-flop. Hence 94N24 is enabled and outputs a "1" signal on conductor 628. This signal passes by way of a conductor 612 to the set terminal of the DISABLE $I/O_2$ flip-flop causing it to switch states. This same signal is inverted by NOR circuit 95N24 so that a logical "0" signal appears on conductor 630 connected to a first input terminal of NOR circuit 87N24. The other input to this last mentioned NOR circuit comes from the translator flip-flop (FIGS. 22*a*–22*c*) at time $\phi$4.14 and causes the command enable CLEAR $C_O$ to be generated on the conductor 624. This signal prepares the $C_O$ register for the subsequent transfer of data to it from the Z-register.

When the T84 flip-flop is set, NOR circuit 90N31 becomes enabled and outputs a "1" signal to the input of NOR circuit 91N31. The resulting "0" output from this last mentioned inverter is applied to a first input terminal of inverters 92N31 and 93N31. The other inputs for these two circuits come from a flip-flop in the translator and are logical "0" 's whenever the apparatus is operating in an output mode. These two inverters therefore become enabled to generate the command enable TRANSFER Z TO $C_O$ on the conductors 632 and 634. The data signals originally contained at the address specified by the index word address supplied by the peripheral equipment are therefore transferred to the output register where they are accessible to the peripheral equipment.

In order to inform the peripheral equipment on the selected channel that data is available, the input-output logic next generates a commond enable SEND OUTPUT ACKNOWLEDGE on the conductor 644. This same signal also passes along the conductor 646 and serves as the command enable RESET OUTPUT REQUEST ONE-SHOT. The exact manner in which these last mentioned command enables are generated has previously been described and therefore it is felt to be unnecessary to repeat it here.

This completes the description of the operation of the control circuits for the output mode when the address of the index word is supplied by the peripheral equipment. The next mode to be considered is the EXTERNALLY SPECIFIED ADDRESS mode wherein the address where data signals are to be stored in the memory or read out from the memory are supplied by the peripheral equipment.

EXTERNALLY SPECIFIED ADDRESS—INPUT MODE

Referring first to FIGS. 12*n* and 12*p*, the manner in which the mode designating circuits force operation in the EXTERNALLY SPECIFIED ADDRESS mode will be described. As is indicated in Table I, when the special bit inputs A and B are "1" and "0" respectively, the mode designating circuits product enabling signals and disabling signals for the input-output control circuits causing the desired type of operation. For example, assume that on channel 10 the special bit input to the gated amplifier 752 is a "1" signal and that to gated amplifier 754 is a "0" signal. When the "1" signal from the priority network is applied to the NOR circuit 756 the amplifier 752 will output a "0" signal on its output conductor 758, whereas amplifier 754 will output a "1" signal on its output conductor 760. The "1" signal on conductor 760 causes NOR circuit 12V67 to output a "0" signal on the conductor 762 while NOR circuit 12V66 outputs a logical "1" signal on the conductor 764. The output signal on conductor 762 is again inverted by NOR circuit 13V67 causing a "1" signal to be applied to a first input of NOR circuits 16V67 and 18V67. NOR circuit 16V66 at this time has "0" signals on both of its input terminals causing a "1" signal to appear at the junction 666. NOR circuit 17V66 inverts this "1" signal causing a "0" signal to appear on its output conductor 508. At this time NOR circuits 16V67 and 18V67 are both outputting "0" signals so that a "0" signal appears at the junctions 766 and 768. The signal at junction 768 is again inverted by NOR circuits 17V67 and 19V67, causing "1" signals to appear on the conductors 518 and 536 respectively.

As will be seen in the following description, the signals described in the foregoing paragraph, when applied to the various inverters and flip-flops in the I/O control circuits will force the computer to read out or store data signals from or at an address supplied by the peripheral device on the selected channel.

Referring now to the timing diagrams of FIG. 17*a* and 17*b*, when the Start button 399 and the Run button 401 are momentarily depressed, the V91 flip-flop (FIG. 12*a*) will be cleared. At phase 2.0 NOR circuit 13V60 becomes fully enabled producing a "1" signal on its output conductor 402. This signal appears at junction 404. From there it passes first along conductor 406 and through the OR circuit 410 to set the T80 flip-flop. The "1" signal at junction 404 also passes by way of the conductor 408 and through OR circuit 412 to set the SCAN flip-flop V60. When the SCAN flip-flop is set, it outputs a "0" signal on the conductor 414. This "0" signal appears at the junction 416 and from there, passes by way of a conductor 418 to a first input terminal of NOR circuit 90N11. The other input to this NOR circuit is the inverted output from the "0" side of the T80 flip-flop. Since this flip-flop is currently set, it will be a "0" signal. Circuit 90N11 is now fully enabled and emits a "1" signal on the conductor 424. This is the command enable CLEAR PRIORITY AND SUB-PRIORITY.

At time $\phi$ 4.0 the "0" signal appearing at the "1" side of the T80 flip-flop passes through and is inverted by NOR circuit 13T81 causing a "1" signal to appear on its output conductor 426. This signal sets both the V91 and the T81 flip-flops. When the T81 flip-flop is set, NOR circuit 90N13 becomes fully enabled to generate the command enable SEND REQUESTS TO SUB-PRIORITY on its output conductor 432.

At time $\phi$ 2.1 the output signal from the "1" side of the T81 flip-flop passes through and is inverted by NOR circuit 13T82 causing a "1" signal to appear at the junction 434. This signal follows conductors 436 and 438 back to the clear terminal of the T80 flip-flop and resets it. The signal at junction 434 also passes by way of conductor 440 to set the T82 flip-flop. At time $\phi$ 4.1 NOR circuit 12T81 becomes fully enabled causing a "1" signal to appear on its output conductor 441. This signal is effective to clear the T81 flip-flop. At time $\phi$ 1.2 the logical "0" signal appearing on conductor 740 connected to the "1" side of the T82 flip-flop passes through and is inverted by NOR circuit 13T83 producing a "1" signal on the conductor 442 which sets the T83 flip-flop. When this last mentioned flip-flop is in its set condition it outputs a "0" signal to the junction 444 and along the conductor 446 to a first input terminal of NOR circuit 90N24. The other input to this last mentioned NOR circuit comes from the "1" side of the SCAN flip-flop by way of conductors 448 and 428. Because the SCAN flip-flop is currently set, NOR circuit 90N24 outputs a "1" signal on the conductor 452. This signal is inverted by NOR circuit 91N24 to produce a "0" signal at the junction point 454. Because it has been assumed that an Input Request has been honored by sub-priority, it can be seen that NOR circuit 89N24 is enabled to output a "1" signal on the conductor 458. This "1" signal serves as the command enable GATE REQUESTS TO PRIORITY.

At time $\phi$ 2.2 the "0" signal appearing at junction 444 is inverted by NOR circuit 13T84 producing a logical "1" signal on conductor 464 to set the T84 flip-flop to its "1" state. Simultaneously, NOR circuit 12T82 becomes fully enabled and outputs a "1" signal on the conductor 462, clearing the T82 flip-flop. Next, at time $\phi$ 3.2 the "0" signal appearing on the output conductor 466 of the T84 flip-flop passes through and is inverted by NOR circuit 13T85 to set the T85 flip-flop.

The T83 flip-flop is cleared at time $\phi$ 1.3 when the 12T83 inverter becomes fully enabled to output a "1" signal on the conductor 474. At $\phi$ 2.3 the "0" signal from the "1" side of the T85 flip-flop is gated through NOR circuit 13T86 producing a "1" signal on the conductor 476 which sets the T86 flip-flop. This "1" signal also passes by way of conductors 478 and 480 to clear the T84 flip-flop.

The timing chain continues to run with the various *e*-designator flip-flops being set and cleared in a definite order. At time $\phi$ 2.4 NOR circuit 23V16 becomes enabled producing a "1" signal on the conductor 489 to set the memory access flip-flop. The other enables required for setting the memory access flip-flop have already been fully described in connection with the other modes of operation and it is not deemed necessary to again explain their generation.

When the memory access flip-flop is set it outputs a "0" signal which passes along conductor 498 to a first input terminal of NOR circuit 90N51. The other input to this last mentioned NOR circuit comes from the "1" side of the T88 flip-flop. Since this flip-flop was set at time $\phi$ 2.4 NOR circuit 90N51 is fully enabled and emits a "1" signal on the conductor 500 leading back to the clear terminal of the SCAN flip-flop (FIG. 12*h*). This completes the SCAN cycle and initiates the $I/O_1$ cycle.

The $I/O_1$ flip-flop is set by the "1" output from NOR circuit 13V61 (FIG. 12*i*) which passes through conductor 504 and OR circuit 732. One input to NOR circuit 13V61 comes from the output of NOR circuit 17V66 (FIG. 12*p*) by way of conductor 508. As has been previously explained, when the apparatus is operating in the EXTERNALLY SPECIFIED ADDRESS mode the output from NOR circuit 17V66 is a "0." A second input to NOR circuit 13V61 comes from the "1" side of the memory access flip-flop. As is indicated by the timing diagram, this flip-flop is set at this time and outputs a "0" signal on the conductor 506. Again, if no requests had been detected during the SCAN mode, the memory access flip-flop V16 would not have been set and the SCAN flip-flop would have remained in its set condition.

Assuming that a request has been detected and the $I/O_1$ flip-flop has been set, NOR circuit 03V61 outputs a logical "0" signal to a first input terminal of NOR circuit 57H04. However, when the Input-Output section is operating in the EXTERNALLY SPECIFIED ADDRESS mode, NOR circuit 17V67 is producing a "1" signal on its output conductor 518. This signal is applied as a second input to the NOR circuit 57H04 and therefore disables or prevents the generation of the command enable PROGRAM LOCKOUT at this time. In the EXTERNALLY SPECIFIED ADDRESS mode, the memory is not required by the Input-Output section at this time and is therefore left available to the main control.

The timing chain continues to run and at time $\phi$ 2.6 the NOR circuit 13T82 (FIG. 12*b*) outputs a logical "1" signal which passes by way of conductors 436 and 550 to clear the memory access flip-flop V16. At this same time, the output from 13T82 also passes by way of conductor 440 to set the T82 flip-flop. When T82 is set, NOR circuit 94N21 has all its input terminals at the "0" level and hence, a "1" signal appears on conductor 554. It passes to the set terminal of the DISABLE $I/O_1$ flip-flop. When the DISABLE $I/O_1$ flip-flop is set it outputs a "0" signal on conductor 564 which appears at a junction 565. From there it is conveyed over conductor 770 to a first input terminal of NOR circuit 86N24. Another input to this inverter comes from the junction 766 which is directly connected to the output from NOR circuit 16V67. When the system is operating in the EXTERNALLY SPECIFIED ADDRESS mode the signal appearing at junction 766 is a "0" and is applied by way of a conductor 772 to the input of NOR circuit 86N24. Because the T83 flip-flop is set at this time, the output from inverter 03T83 is a "0." Hence, at $\phi$ 4.7 NOR circuit 86N24 is fully enabled and outputs a "1" signal on the conductor 774. This signal passes along this conductor and through an OR circuit 776 to again set the memory access flip-flop.

As the timing chain continues to run, at time $\phi$3.8 inverter 13T87 outputs a "1" signal on the conductor 482 to clear the T85 flip-flop and on the conductor 484 to set the T87 flip-flop. A "0" signal passes along conductor 486 to the junction 778, and from there, along conductor 780 to a second input terminal of NOR circuit 11V61 when the T87 flip-flop is set. This inverter is fully enabled and outputs a "1" signal on conductor 782. The signal passes through the OR circuit 784 connected to the clear terminal of the $I/O_1$ flip-flop V61. This signal both clears the $I/O_1$ flip-flop and initiates the supplementary timing chain. The supplementary timing chain now runs concurrently with the *e*-designator timing chain.

In order to start the supplementary timing chain running it is necessary that the 15L70 inverter be fully enabled. A first input to this inverter comes from the output of NOR circuit 02V61 (FIG. 12*h*) by way of a conductor 786. Since at this time the $I/O_1$ flip-flop is cleared, the output appearing on this last mentioned conductor will be a "0". A second input to NOR circuit 15L70 is from the memory timing chain and is a logical "0" whenever the memory is available for use by the Input-Output section. Still another input to NOR circuit 15L70 is the inverted output from the "0" side of the DISABLE $I/O_1$ flip-flop. More specifically, as shown in FIG. 12*j*, the NOR circuit 03V64 is connected by means of a conductor 788 to the "0" side of the V64 flip-flop. Because this flip-flop is set at this time, a "1" signal appears on conductor 788 causing a logical "0" signal to appear at the junction 790 at the output of NOR circuit 03V64. This "0" signal passes over conductor 792 to one of the input terminals of NOR circuit 15L70. Yet another condition which must be satisfied before the supplementary timing chain can be initiated is that the apparatus be operating in the EXTERNALLY SPECIFIED ADDRESS mode. When this is so, a "0" signal appears at junction 766 and passes by way of conductor 772 to the junction 794. From there, the "0" signal passes through a conductor 796 to an input of 15L70. The final input to NOR circuit 15L70 comes from the "1" side of the V66 flip-flop by way of a conductor 798. The manner in which the V66 flip-flop is set has been described previously in connection with the EXTERNALLY SPECIFIED INDEX mode of operation and therefore is not explained in detail again here. At phase 4.8 the NOR circuit 15L70 has all its inputs at a logical "0" level and therefore outputs a "1" signal on the conductor 800 which passes through OR circuit 674 to set the L70 flip-flop to its "1" state. The "1" signal appearing on conductor 800 also appears on a conductor 802 and serves as the command enable CLEAR TRANSLATOR. The setting of the L70 flip-flop also causes a "1" signal to appear on the conductor 692. This signal is the command enable subsequently employed to transfer the channel address from the priority network to the translator.

At time $\phi 2.9$ NOR circuit 13L71 becomes fully enabled and outputs a "1" signal. It passes over a conductor 700 to set the L71 flip-flop. This same signal also passes over the conductor 698 to clear the DISABLE $I/O_1$ flip-flop. It also passes through the OR circuit 552 connected to the "0" side of the memory access flip-flop thereby resetting it.

Because the L71 flip-flop is now set, a "0" signal is applied to a first input terminal of NOR circuit 15L71. The other input to this last mentioned inverter comes from the output of NOR circuit 16V67 by way of conductors 772, 796, and 804. As already mentioned, 16V67 outputs a "0" when the system is operating in the EXTERNALLY SPECIFIED ADDRESS mode. The resulting "1" output on conductor 806 is a command enable used to clear the Input Acknowledge signal produced on a previous input buffer transfer. At the time during which the L71 flip-flop is set, a "1" signal appears on the output conductor 702 connected to the "0" side thereof. This signal is the command enable CLEAR Z-REGISTER employed to remove any data signals previously stored therein.

At time $\phi 4.9$ the "0" signal appearing at the "1" side of the L71 flip-flop is gated through NOR circuit 13L72, the resulting "1" signal on conductor 708 being used to set the L72 flip-flop. This signal is also conveyed over conductor 706 to clear the L70 flip-flop. Next, at time $\phi 2.10$ NOR circuit 13L73 is enabled and outputs a "1" signal on the conductors 712 and 714. The signal on conductor 712 clears the L71 flip-flop while the signal on conductor 714 is employed to set the L73 flip-flop. The "0" signal resulting at the "1" side of the L73 flip-flop is inverted by NOR circuit 02L73 causing a logical "1" signal to appear on the conductor 722. Also, the "1" signal generated at the "0" side of the L73 flip-flop appears simultaneously on the conductor 718. The signal on this line is the command enable which gates the lower 15 bits of the data (coming from the peripheral equipment on the selected channel) into the lower half of the Z-register. In the EXTERNALLY SPECIFIED ADDRESS mode these 15 bits are address representing signals and specify the location in memory where the data on the upper 15 data lines are to be stored.

The "1" signal appearing on the conductor 716 coming from the "0" side of the L73 flip-flop is inverted by NOR circuit 03L73 causing a "0" signal to appear on conductor 808. This signal is applied as a first input to NOR circuit 17L73. Another input to this last mentioned NOR circuit comes by way of conductor 810 from the junction point 768 connected to the output of the inverter 18V67. As has been mentioned previously, NOR circuit 18V67 outputs a "0" signal when the computer is operating in the EXTERNALLY SPECIFIED ADDRESS mode. The first input to NOR circuit 17L73 comes from the Input mode flip-flop V34 in the translator shown in FIG. 22*c* and is a "0" signal whenever the Input-Output section is processing an input data transfer. Inverter 17L73 is therefore fully enabled at this time and outputs a "1" signal on the conductor 812 serving as the command enable RESET INPUT REQUEST ONE-SHOT.

The "0" output from the "1" side of the L73 flip-flop passes by way of conductor 724, to a junction 726 (FIG. 12*i*) and from there to a first input terminal of inverter 13V62. A second input to this same inverter comes by way of the conductor 814 from the output of NOR circuit 18V67. This last mentioned inverter outputs a "0" signal when the system is operating in the EXTERNALLY SPECIFIED ADDRESS mode. At $\phi 4.10$ then NOR circuit 13V62 becomes fully enabled and outputs a "1" signal which passes through OR circuit 574 to set the $I/O_2$ flip-flop. The output from inverter 13V62 also passes by way of a conductor 816 and through the OR circuit 412 to set the SCAN flip-flop to its "1" state.

At time $\phi 2.11$ the T80 flip-flop is again set. A first enable which permits the setting of the T80 flip-flop comes from the output of NOR circuit 05V60 by way of conductor 818. This signal is a "0" signal, provided one of the inputs to NOR circuit 05V60 is a "1" signal. It is apparent that since the $I/O_2$ flip-flop is currently set, the signal appearing on conductor 746 connected to the "0" side thereof is a "1" signal. From junction 820 this "1" signal passes via conductor 822 to one input of 05V60. Provided that the memory is available for use by the Input-Output section at this time, NOR circuit 13T80 outputs a "1" signal to set the T80 flip-flop. When this flip-flop is set NOR circuit 90N11 becomes fully enabled producing a "1" signal on conductor 424 to clear the priority and sub-priority networks.

Because the $I/O_2$ flip-flop is set, a "1" signal appears on the conductor 746 and is applied to a first input of NOR circuit 18V61. This last mentioned NOR circuit therefore outputs a "0" on the conductor 530. NOR circuit 19V61 is fully enabled thereby and produces the command enable INITIATE MEMORY on its output conductor 532. NOR circuit 95N11 also is fully enabled by the setting of the T80 flip-flop to generate the command enable TRANSFER $Z_L$ to S on its output conductor 590. It may be recalled that during the time that the supplementary timing chain was running, the lower half of the Z-register was filled with address representing signals from the peripheral equipment. The command enable TRANSFER $Z_L$ to S therefore places the address of where the data is to be stored into the storage address register.

As the *e*-designator timing chain continues to run the T81 and T82 flip-flops will be set in the manner already described. When the T82 flip-flop is set, NOR circuit 95N21 becomes enabled since the $I/O_2$ flip-flop is set and is supplying a "0" signal to one of its inputs and the Input mode flip-flop V34 in the translator (FIG. 22*c*) will be supplying a logical "0" signal when an input buffer transfer is taking place. Hence, a "1" signal appears on the conductor 606 and is inverted by NOR circuit 96N21 to produce a command enable on the conductor 598 which sets a flip-flop in the memory circuits (not shown) termed the "disable memory to $Z_U$" flip-flop. It should be recalled from the previous description that when this flip-flop is set, any data read from the memory into the upper half of the Z-register will be destroyed. This prevents the data read from memory from later interfering with the data to be transferred to the Z-register from the peripheral equipment.

The "0" output from NOR circuit 96N21 is also applied to the inverters 97N21 and 98N21. The resulting logical "1" signals on their respective output conductors serve as the command enables TRANSFER DATA TO $Z_U$. The effect of this command enable is of course to gate the signals on the upper 15 data lines into the Z-register. These data signals are then written into memory at the address which is held by the S-register during the memory cycle currently in progress.

At time $\phi 1.13$ NOR circuit 13T83 will pass and invert the "0" signal appearing at the output from the "1" side of the T82 flip-flop so that a "1" signal appears on conductor 442 which sets the T83 flip-flop. The "0" output from the "1" side of the T83 flip-flop is one of the inputs required to enable NOR circuit 94N24. The other input to this inverter comes by way of conductors 470, 468 and 626 from the "1" side of the $I/O_2$ flip-flop. Inverter 94N24 is therefore enabled and a "1" signal appears on its output conductor 612. This signal sets the DISABLE $I/O_2$ flip-flop. When this flip-flop is set it outputs a "0" signal on the conductor 618 which is connected to a first input terminal of NOR circuit 97N51. At the time the T88 flip-flop is set, NOR circuit 03T88 connected to the "0" side thereof will output a "0" signal on the conductor 616. When an input buffer transfer is taking place, the Input mode flip-flop V34 in the translator is set and provides a "0" signal to NOR circuit 97N51. All of the inputs to 97N51 being "0"'s, it outputs a "1" signal on the conductor 620 which serves as the command enable SEND INPUT ACKNOWLEDGE. This enable will be sent to the Input Acknowledge circuitry which will, in turn, send the signal to the peripheral unit on the selected channel telling it that the date has been stored and that another request may be initiated.

This completes the input buffer transfer when operating in the EXTERNALLY SPECIFIED ADDRESS mode. Consideration will next be given to the manner in which the I/O control circuits operate for an output buffer transfer in the EXTERNALLY SPECIFIED ADDRESS mode.

EXTERNALLY SPECIFIED ADDRESS—OUTPUT MODE

The operation of the control circuits in the present mode is identical to that in the preceding mode until time $\phi 4.9$. That is, during the SCAN cycle the priority and sub-priority networks are first cleared and then the requests, if any, are gated thereto. The I/O translator flip-flops are cleared and then loaded with the channel address supplied by the priority network. The Z-register is also cleared of its previous contents to prepare it for later acceptance of the externally provided storage address.

By comparing the timing diagram of FIGS. 17*a* and 17*b* with those of FIGS. 18*a* and 18*b*, it can be seen that at time $\phi 4.9$ in the input buffer mode the Input Acknowledge generated during a previous input buffer transfer was cleared out. In the output mode, however, the previous Output Acknowledge is not cleared out until time $\phi 1.11$ at which time the NOR circuit 15L73 becomes fully enabled. NOR circuit 15L73 receives one of its inputs from the output of inverter 16V67 by way of a conductor 823. This signal will be a "0" signal when the special bit inputs are set to cause operation in the EXTERNALLY SPECIFIED ADDRESS mode. A second input to 15L73 comes from the V34 flip-flop located in the translator circuit and the signal will be a "0" when an output buffer is being processed. The final input for NOR circuit 15L72 comes from the "1" side of the L73 flip-flop which is currently set. As a result, a logical "1" signal appears on the conductor 824 which serves as the command enable CLEAR OUTPUT ACKNOWLEDGE.

In the same manner as was done in the foregoing mode, at time $\phi 1.11$ the address representing signals appearing on the lower 15 data lines coming from the peripheral equipment are gated into the lower half of the Z-register. Next, the contents of $Z_L$ are transferred to the storage address register (S-register). Now, when the memory timing chain is initiated the contents of the memory at the specified address will be read into the Z-register.

NOR circuit 87N24 (FIG. 12*c*) becomes fully enabled to produce the command enable CLEAR $C_O$ on its output conductor 624. To insure that $C_O$ is only cleared on an output data transfer, one of the conditions necessary for the generation of this command enable is that the mode flip-flop V36 (FIG. 22*c*) be set. This flip-flop is set whenever an output buffer transfer is in process. On the next succeeding phase NOR circuit 90N31 becomes fully enabled causing a "1" signal to be applied to the input of inverter 91N31. This last mentioned inverter supplied "0" signals to inverters 92N31 and 93N31. Provided that the mode flip-flop V36 is set, these last mentioned inverters will be fully enabled to generate the command enable TRANSFER Z to $C_O$. The data contained in the Z-register is thus placed in the output register where it is accessible to the peripheral equipment.

Finally, at time $\phi 4.16$ the inverter 94N54 becomes fully enabled, generating a "1" signal on the conductors 644 and 646. The signals on these conductors are used to energize the output acknowledge circuits and to reset the output request one-shot on the selected channel. The Output Acknowledge signal informs the peripheral equipment that data is available to it in the $C_O$ register and that it may sample it at will.

This completes the description of the input-output control circuits for the various modes of operation. Consideration will next be given to the details of those circuits illustrated in FIGS. 4*a* through 4*c* which are not considered conventional.

REQUEST CIRCUITS

FIG. 19 illustrates the circuitry employed at the interface between the peripheral equipment and the Input-Output section of the computer. The apparatus shown in FIG. 19 is for only a single channel, but identical circuits are employed for each of the Input, Output and External Interrupt Request channels used in the system.

When the peripheral equipment has data on the lines available to the computer, it informs the computer by sending a control signal called an Input request. Similarly, when the peripheral equipment can accept data, it informs the computer by sending a control signal called an Output request. The External Interrupt request provides a means whereby a peripheral device may direct the computer to accept data from it.

The request one-shot 840 is initially conditioned by being set to its "1" state. The "1" signal for performing this function comes from the input-output control circuits and is applied to the conductor 842. The signal passes through the OR circuit 844 to reset all of the request one-shots in anticipation of a waiting Input, Output or External Interrupt Request. Under normal operating conditions, prior to the completion of a previous input or output buffer transfer, the request one-shot on the then selected channel has been reset or cleared. When the request signal on the line drops, the input to the request amplifier 846 becomes a "0" signal. The amplifier merely changes the signal level and performs no inversion. The output from amplifier 846 is therefore also a "0" signal which is inverted to a "1" signal by the NOR circuit 848. The "1" output on the conductor 850 appears at a junction 852, and from there passes by way of conductor 854 through OR circuit 844 to set the request one-shot.

Now, when a new request is transmitted to the computer, the signal appearing on the conductor 856 is a logical "1." The output from amplifier 846 is also a "1" signal and forces the output from NOR circuit 848 to a "0." The "0" signal has no effect on the request one-shot, but it does pass by way of conductors 858 and 860 to a first input of a NOR circuit 862.

As has already been explained, before a request can be transmitted to the sub-priority network, it is a requirement that the input or output active flip-flop associated with the channel in question be set. When this flip-flop is set, a "0" signal appears on the conductor 864 and is applied to the junction 866. From there the signal follows conductor 868 to a second input terminal of NOR circuit 862. Because the request one-shot for the channel under consideration has been previously set, a "0" signal appears on its output conductor 870, and is applied to the junction 872. A conductor 874 connects this point to a third input terminal of NOR circuit 862. Hence, it is fully enabled to output a "1" signal on the conductor 876. This signal is applied to one of the input lines in the sub-priority network (FIGS. 20*a* and 20*b*).

Since at any time there may be Input or Output Requests on more than one channel, a signal must also be transmitted to the priority network so that the channel to be honored may be established. This is the function of the NOR circuit 878. Three of the enable signals required by NOR circuit 878 are the same three that enabled NOR circuit 862. In other words, the "0" signals appearing at the junctions 866 and 872 are also applied by way of the conductors 880 and 882 to a pair of inputs on NOR circuit 878. In addition, a command enable from the input-output control circuits is required. It may be recalled that at the time during the SCAN sequence that the T83 flip-flop is set, the command enable GATE REQUEST TO PRIORITY is generated at the output of NOR circuit 89N24 for an Input Request and at the output of NOR circuit 97N24 for an Output Request. This command enable is a "1" signal and is applied to the NOR circuit 884 by way of a conductor 886. This signal is inverted by NOR circuit 884 and a "0" signal appears on its output conductor 888. At the following phase 4 time the NOR circuit 878 is fully enabled and transmits a "1" signal on the conductor 890 to the priority network to set the designated flip-flop.

Since, it is a requirement of the system that for each word buffered into the computer there must be a separate request, a provision must be made to reset the request gates following each request. The command to reset the request one-shot which in turn controls the gate, is generated by the *e*-designator timing chain. For an Input Request, the command enable for resetting the one-shot is generated at the output of NOR circuit 85N51 on conductor 742 (FIG. 12*e*). The command enable is generated at the output of NOR circuit 94N54 for an Output Request. The "1" signal is applied to the NOR circuit 892 causing a "0" signal to appear on its output conductor 894. This "0" signal is applied as a first input to a NOR circuit 896. A second input to this NOR circuit comes from the translator and enters on line 898. As will be explained more fully later on, a "0" signal appears only on the line associated with the particular channel currently being honored in the priority network. At $\phi 1$ time then, the NOR circuit 896 will be fully enabled to output a "1" signal on conductor 900 which clears the request one-shot to ready it for the next request on that channel.

SUB-PRIORITY NETWORK—FIG. 20

The sub-priority network accepts the various request signals to determine which mode of operation is to be processed by the Input-Output section at a particular time. The network is composed of a plurality of working circuits, each one with its associated flip-flop and gates. When a request is to be processed by the sub-priority network, the designated flip-flop for the selected mode of operation is set by enables from both the request gates discussed previously, and from the SCAN cycle. When one mode of operation is selected by sub-priority, it disables all other modes having lower priority at that instant. For example, if an Input Request and an External Interrupt Request are simultaneously entered into the sub-priority circuits, the External Interrupt flip-flop will be set, and its output will disable the Input Request circuits.

Before proceeding with the explanation of the remainder of the sub-priority network, the means employed for the time sharing of requests will be discussed. In the sub-priority network the Output mode has precedence over the Input mode so it is conceivable that the computer could be locked out of an Input mode if several Output Requests are simultaneously present on several channels. A time-share circuit is incorporated into the sub-priority network to prevent this. As will be subsequently shown, when an Input mode or an Output mode of operation is being processed by the Input-Output section, its associated flip-flop in the translator (FIG. 22) is set. Before the input or output buffer transfer operation is completed, i.e., during the DISABLE $I/O_1$ and/or $I/O_2$ sequence, the SCAN flip-flop is set for a second time to its "1" state. The input-output logic is at that time free to examine the waiting requests and process them through sub-priority. If an Output Request is currently being processed, then the Output flip-flop V36 in the translator is set and a "1" signal appears on the conductor 902 (FIG. 20*a*) and is applied to the inverter 12V54. A "0" signal therefore appears on its output conductor 904 which is connected to a first input terminal of NOR circuit 12V52. Since the $I/O_2$ flip-flop is also currently set, a "1" signal is provided on the conductor 906. Since this line receives its signal from the "0" side of the $I/O_2$ flip-flop, inverter 12V58 outputs a logical "0" signal to the junction 908. From there, the signal follows conductor 910 to a second input terminal of NOR circuit 12V52. This circuit is therefore fully enabled and emits a "1" signal on its output conductor 912. This conductor, in turn, is connected to a first input terminal of the NOR circuits 13V52 and 17V52. This "1" signal disables these last mentioned inverter gates, thus preventing Output Requests from following one another. The sub-priority network is therefore free to process an Input Request which may have been waiting. Similarly, if the immediate preceding request had been of the Input type, the mode designating flip-flop V34 of the translator circuits would be outputting a "0" signal on the conductor 914. Again, the $I/O_2$ flip-flop would be set so as to output a "1" signal on conductor 906. This last mentioned signal is inverted by NOR circuit 12V58 so that a "0" signal appears at junction 908. The signal at this junction follows conductor 916 to a second input terminal of NOR circuit 12V59. This NOR circuit is enabled and outputs a "1" signal on conductor 918 connected to a first input of inverter gates 13V51 and 17V51. This "1" signal disables these two gates, preventing the sub-priority network from immediately processing another Input Request. This prevents Input Requests from following one another and allows Output Requests to be processed or interleaved between Input Requests.

The outputs from the external interrupt one-shots (FIG. 4b) are connected into either NOR circuit 24I80 or 24I88. It may be recalled that the preferred embodiment of the present invention employs 12 input and 12 output channels, and hence, the total number of input lines to the NOR circuits 24I80 and 24I88 is 12. Similarly, the signals from the output one-shots are connected to the input terminals of the NOR circuits 24O40 and 24O46. Likewise, the output signals from the input one-shots enter the sub-priority network and are applied to NOR circuits 24I40 and 24I48.

At the start of the *e*-sequence timing chain NOR circuit 90N11 contained therein, outputs a "1" signal on the conductor 424 (CLEAR SUB-PRIORITY), clearing the Input flip-flop V51, the Output flip-flop V52 and the External Interrupt flip-flop V55 contained in the sub-priority network. It may be recalled that immediately following the clearing of the sub-priority flip-flops, the command enable SEND REQUESTS TO SUB-PRIORITY is generated by the *e*-designator timing chain. This signal enters the sub-priority network on the conductor 920 and is changed to a "0" signal by inverter 12V55. This "0" signal is simultaneously applied to the inverter gases 17V51, 13V51, 17V52, 13V52, 17V55 and 13V55 by means of the bus 922. Assume that Input Requests are present on one or more of the input lines to NOR circuits 24I48 and/or 24I40. These last mentioned two inverters will output logical "0" signals on their conductors 924 and 926. Provided that the previously honored request was not also an Input Request, the signal on conductor 918 will be a "0." Hence, a time $\phi3$ following the generation of the command enable on conductor 920, inverter gates 17V51 and/or 13V51 will be fully enabled and will output "1" signals which pass through OR gate 928 to set the Input flip-flop V51. The signal appearing on the conductor 930 is therefore a logical "0." It neither the Output flip-flop V52 or the External Interrupt flip-flop V55 are in a set state, logical "0" signals will be applied to the remaining inputs of NOR circuit 19V51. However, if one of the other flip-flops is set, disabling signals will be presented to this last mentioned inverter. The fact that inverter 19V51 is controlled by both the Output flip-flop V52 and the External Interrupt flip-flop V55 makes the Input Request mode subordinate to the other two modes. In other words, if either the V52 flip-flop or the V55 flip-flop are set, the NOR circuit 19V51 cannot be fully enabled so that an Input Request cannot be processed.

Assuming for the moment that only Input Requests are present NOR circuit 19V51 will be enabled and will output a "1" signal on the conductor 936. This "1" signal is, in turn, inverted by NOR circuit 20V51 such that a "0" signal appears on the conductor 938. This signal is applied to various NOR circuits in the input-output control circuits previously described to thereby effect operation in an output mode. The destinations for the "0" signal on conductor 938 are listed in the legend along side thereof in FIG. 20a.

The logical "1" output signal from NOR circuit 19V51 also passes by way of a conductor 940 to an inverter 15V06 associated with the priority network (FIG. 21).

Inverter 15V06 is one of six NOR circuits (15V00–15V06) connected to the output terminals of the flip-flops contained in the priority network. As will be described more fully hereinbelow, inverters 15V00 through 15V03 perform a translation so as to develop an address in binary code of the particular channel having the highest priority. The inverters 15V04 and 15V06 complete the channel address by outputting signals indicative of the type of request currently being honored by the sub-priority network. The "1" input to inverter 15V06 causes a "0" signal to appear on its output conductor. Since at this time the External Interrupt flip-flop V55 and the Output flip-flop V52 are both in a cleared condition, NOR circuit 15V04 outputs a "1" signal on its output conductor. This combination of signals on the output conductors from 15V04 and 15V06 designates an input mode of communication.

In substantially the same manner as has been described for an Input Request, the Output flip-flop V52 and its associated inverters and gates accept Output Requests and produce signals for causing the Input-Output section of the computer to operate in an output mode of communication. One or more of the 12 communications channels may simultaneously be presenting Output Request signals to the computer. If so, "1" signals will be applied to one or more of the input terminals of the NOR circuits 24O40 and/or 24O46. Logical "0" signals appear on their output conductors 942 and 944. Provided that the next preceding request to be processed was not also an Output Request, NOR circuit 12V52 in the time share circuit will be outputting a "0" signal on the conductor 912 connected to a first input terminal of NOR circuits 13V52 and 17V52. Now, when the command enable SEND REQUEST TO SUB-PRIORITY is generated by the I/O control circuits at the following time $\phi3$, a "1" signal will appear on conductor 946 and/or 948 to set the Output flip-flop. The "1" signal appearing on the conductor 932 disables the inverter 19V51 thereby giving an Output Request priority over an Input Request. The "0" signal appearing on conductor 950 is applied to a first input terminal of inverter 19V52. As long as no External Interrupt Request is present the signal appearing on conductor 934 connected to the output of NOR circuit 02V55 will be a "0" so that inverter 19V52 will be fully enabled. The logical "1" signal resulting on the output conductor 952 of this inverter is applied by way of the conductor 954 to the inverters 15V04 and 15V06 in the priority network to specify an Output mode of communication. The signal appearing on conductor 952 is also inverter by NOR circuits 20V52 and 21V52 to generate "0" enabling signals on the conductors 956 and 958. These last mentioned signals are transmitted to various inverters in the input-output control circuits to effect operation in the output mode. The signal on conductor 956 also is applied to the translator to set the Output mode flip-flop V36 to its "1" state.

The operation of the circuits in sub-priority for causing an External Interrupt Request to be honored is similar in all respects to the apparatus for honoring Input Requests and Output Requests, and therefore a detailed description of the operation of these circuits is deemed unnecessary.

PRIORITY NETWORK—FIG. 21

The priority network is used to determine the channel priority and to set up the special address for a particular mode of operation. As is illustrated in FIGS. 21a through 21d, the priority network is comprised of 12 flip-flops and associated gates interconnected in such a manner so as to be able to designate a specific channel number from 2 through 13. Because of the manner in which the configuration is wired the higher numbered channels have priority over the lower numbered channels. The network specifies a particular channel by which one or more of the flip-flops V02 through V13 are set. Also, the priority network is concerned with the outputs from the already mentioned NOR circuits 15V03 through 15V00 which provide the translation for the designated channel.

It may be recalled that during the SCAN cycle at the start of the *e*-designator timing chain, a clear command is generated. This signal from NOR circuit 90N11 enters the priority circuit by way of a conductor 960 and is applied either directly or through an OR circuit to the "0" input terminal of each of the flip-flops V02 *through* V13.

Following the determination by the sub-priority network of a mode of operation, request signals are gated into the priority network to determine the channel to use this selected mode of operation. The command enable GATE REQUESTS TO PRIORITY comes from one of the NOR cricuits 89N24, 92N24 or 97N24 depending on which of these circuits receives an enabling signal from the sub-priority network. As has been mentioned, the outputs from these inverters go to the request gates (see FIG. 19) and permit the request signals of the type determined by sub-priority to be applied to one or more of the priority flip-flops. For example, if the sub-priority network determines that an Output Request is to be honored and peripheral devices on channels 3, 5 and 8 are simultaneously presenting Output Request signals to the computer, logical "1" signals will be gated in on the conductors 968, 970 and 972 of the priority network.

In explaining the operation of the priority network it is felt to be expedient to assume one type of request on several channels and then trace the resulting signals through the network to thereby show the manner in which a binary coded address for one specific channel having highest priority results. In accordance with the foregoing statement, assume that the sub-priority network has determined that an Input Request is to be processed and that upon the generation of the command enable GATE REQUESTS TO PRIORITY logical "1" signals appear on the conductors 962, 964 and 966. As has already been mentioned, the priority network operates to give top priority to the highest numbered channel having the type of request currently being honored by sub-priority. The logical "1" input on conductor 966 (channel 10) passes through the OR circuit 974 to set the flip-flop V10 to its "1" state. The resulting logical "1" signal appearing at the "0" side thereof passes from the junction 976 by way of a conductor 978 and through an OR circuit 980 to also set the auxiliary flip-flop V08. The "1" signal appearing at the junction 976 also passes by way of a conductor 982 to a first input terminal of NOR circuit 15V01 so that a "0" signal appears on its output conductor 984.

The "1" signals on the conductors 964 and 962 would normally pass through their respective OR circuits 986 and 988 to set the V07 and V05 flip-flops to their "1" state. However, since the V08 flip-flop is set, a "1" signal appears on the output conductor 990 of inverter 04V08 connected to the "1" side of the V08 flip-flop. this signal passes via conductor 992 to a first input terminal of the OR circuits 994 and 996. The "1" signal passes through these OR circuits to the "0" side of the V07 and V05 flip-flops to thereby hold them in their cleared state.

The "1" signal appearing at the "0" side of the V08 flip-flop passes by way of a conductor 998 to one input terminal of NOR circuit 15V03. As a result, a "0" signal appears on the output conductor 1000 of this inverter. By tracing the various conductors connected to the input terminals of NOR circuits 15V00 and 15V02, it will be seen that they are all carrying "0" signals under the assumed conditions thereby causing "1" signals to appear on their respective output conductors 1002 and 1004. The output signals from the NOR circuits 15V00 through 15V06 therefore form the code combination 010101. The lowest order 4 bits of this combination are the complement of the channel address while the highest order 2 bits are employed to specify the particular mode of operation being performed. By complementing the lowest 4 bits it can be seen that the combination will read 1010 (decimal 10). This corresponds to the original assumption of an Input Request appearing on the conductor 966 associated with channel 10. It can be seen then, that the designated channel number is a function of the outputs from inverters 15V00 through 15V03, with the full mode address being a function of the outputs from inverters 15V00 through 15V06. Since the outputs from the 15VXX circuits are transmitted to gate circuits in the S-register, in the interrupt storage register, and the translator, the enable output is a "0." In this manner, when a "1" signal appears in the address, it appears as a "0" output from a 15VXX circuit; and conversely a "0" in the address appears as a "1" output from a 15XX circuit. The full mode address is loaded into the S-register so that then the address can be referenced in memory. As has already been mentioned, the command to send the address to the S-register is generated during $I/O_1$ sequence at the time when the inverter 96N11 is enabled.

The Interrupt address is loaded into the interrupt storage register (not shown) to be held for use during a subsequent A-sequence. The command to send the interrupt address to the storage register is generated during the SCAN cycle when the T86 flip-flop in the *e*-designator timing chain is set. The designated channel number is loaded into the translator flip-flops to generate enable signals required during the processing of a request. The command to send the channel number to the translator is generated during the DISABLE $I/O_1$ sequence when NOR circuit 94N42 is enabled.

Another inverter in the priority network which becomes fully enabled under the assumed conditions is NOR circuit 21V11 which has one input thereof connected to the output from the "1" side of the V10 flip-flop. Its other input is connected by means of a conductor 1006 to the "0" side of the V11 flip-flop. Because this last mentioned flip-flop is cleared under the assumed conditions, the signal appearing on conductor 1006 is a "0." Hence, a "1" signal appears on the conductor 1008 connected to the output of NOR circuit 21V11. As is indicated in the legend on FIGS. 21*b* and 21*c* this signal goes to the mode specifying circuitry of FIGS. 12*n* and 12*p* and is used to gate the special bit inputs (A and B) on the selected channel.

In the description of the input-output control circuits it was mentioned that one of the enables required for setting the memory access flip-flop V16 comes from the priority network. Under the assumed conditions, the "1" signal which appears on conductor 990 connected to the output of NOR circuit 04V08 is the signal which permits the setting of the memory access flip-flop. If no requests had been present, none of the lines in the priority network leading to the memory access flip-flop would be carrying "1" signals and the control circuits would remain in the SCAN mode.

Table II indicates the particular flip-flops which will be set as well as the particular 15VXX inverters which will be outputting "0" signals when requests appear on a given channel. For example, a request on channel 7 causes flip-flop V07 and auxiliary flip-flops V04, V05 and V06 to be set so that NOR circuits 15V00, 15V01 and 15V02 will be outputting "0" signals. The flip-flop V04 will output a "1" signal to the NOR circuit 22V16 for setting the memory access flip-flop.

TABLE II PRIORITY SETUP

| Selected Channel | Channel FF Set | Auxiliary FF's Set | Active 15V— Circuit(s) ("0" Output) | Memory Access FF enable |
|---|---|---|---|---|
| 2 | V02 | | 15V01 | V02 |
| 3 | V03 | V02 | 15V01, 15V00 | V02 |
| 4 | V04 | | 15V02 | 00V04 |
| 5 | V05 | V04 | 15V02, 15V00 | 00V04 |
| 6 | V06 | V04 | 15V02, 15V01 | 00V04 |
| 7 | V07 | V04, V05, V06 | 15V02, 15V01, 15V00 | 00V04 |
| 8 | V08 | | 15V03 | 00V08 |
| 9 | V09 | V08 | 15V03, 15V00 | 00V08 |
| 10 | V10 | V08 | 15V03, 15V01 | 00V08 |
| 11 | V11 | V08, V09, V10 | 15V03, 15V01, 15V00 | 00V08 |
| 12 | V12 | | 15V03, 15V02 | 00V12 |
| 13 | V13 | V12 | 15V03, 15V02, 15V00 | 00V12 |

It is felt that the foregoing example considered in view of the above table is sufficient to explain the operation of the priority network and that it is unnecessary to further describe the various elements and connections thereof.

TRANSLATOR—FIG. 22

The translator used in the Input-Output section of the computer provides a unique translation for a certain specific channel that is being utilized or specified. The translation effectively takes place in a register comprised of the 4 flip-flops V30 through V33. The outputs from the 4 flip-flops are interconnected in a predetermined manner with a set of NOR circuits to provide the enable signals required to operate certain circuits in the Input-Ouput section. Also associated with the translator are a pair of flip-flops V34 and V36 which, when set, designate an input mode or an output mode of operation.

As was mentioned in the introductory portion of the specification, during the execution of an input buffer, an output buffer or an external function instruction, the 4 bits making up the *j** designator are loaded into the translator. The resulting translation causes a signal to be developed on a set of lines associated with the particular channel specified by *j. During the A-sequence a "0" signal is applied to the conductor 1010 connected to a first terminal of NOR circuit 11V32. At the following phase 1 time this inverter becomes fully enabled and outputs a "1" signal on its output conductor 1012 which passes through the OR circuit 1014 to clear the V30 flip-flop. This same signal passes by way of the bus 1016 to an input terminal of the OR gates 1018, 1020, and 1022**. Hence, the entire translator is cleared. Subsequently, but still during the A-sequence, in which one of the above mentioned instructions is obtained from memory and placed in the Z-register, a command to transfer *j to the translator enters on a conductor 1024. This signal also passes along the bus 1026 so that it is applied to a first input terminal of NOR circuits 15V30 through 15V33. Another input to these NOR circuits comes from the Z-register stages 20 through 23** which currently hold the value of *j. (Reference to the instruction word format of FIG. 3 clearly illustrates the point.) At a phase 2 time then, the NOR circuits 15V30 through 15V33** become fully enabled to gate the 4 bits of *j through the OR circuits 1028 through 1034 to set one or more of the translator flip-flops V30 through V33**. Whether or not a particular one of these flip-flops is set depends on the signal ("1" or "0" bit) coming from the Z-register.

Assuming that an input buffer instruction is being processed and the 4 bits of *j are 0011 (decimal 3), flip-flops V30 and V31 will be set during the A-sequence whereas flip-flops V32 and V33 will remain cleared. The "0" output from the "1" side of the V30 flip-flop passes through the NOR circuit 1036 so that a "1" signal appears on the conductor 1038 and is applied to one input terminal of NOR circuit 34V00. The "1" signal appearing at the output of the "0" side of the V30 flip-flop passes by way of conductor 1040 to one input terminal of NOR circuit 32V00. The inverted output from the "0" side of the V30 flip-flop passes via conductor 1042 so that a "0" signal is applied to an input terminal of NOR circuit 33V00. Similarly, the "1" signal appearing at the output of the "0" side of the V31 flip-flop passes over conductor 1044 to another input terminal of NOR circuit 34V00. The "0" signal appearing at the output of NOR circuit 1046 passes over conductor 1048 to a junction 1050. From there the "0" signal follows conductor 1052 to an input to NOR circuit 32V00, and by way of a conductor 1054, to a second input to NOR circuit 33V00. The "1" signal appearing at the output of the "1" side of the V32 flip-flop is inverted by NOR circuit 1056 causing a "0" signal to be applied by way of conductor 1058 to still another input terminal of NOR circuit 33V00. A conductor 1060 conveys the "0" output signal from the "0" side of the V32 flip-flop to a third input terminal of NOR circuit 32V00. NOR circuit 1062 inverts the "0" signal coming from the "0" side of the V32 flip-flop causing a "1" signal to be applied by way of conductor 1064 to the third input terminal of NOR circuit 34V00. Finally, because the V33 flip-flop is cleared, a "0" signal appears on the conductor 1066 connected to the output of NOR circuit 1068. This signal passes to junction 1070 and over conductor 1072 to the last input terminal of NOR circuit 33V00. The "0" signal appearing at the output from the "0" side of the V33 flip-flop passes by way of conductor 1074 to the fourth input terminal of NOR circuit 32V00**.

It can be seen that the only inverter having all "0" signal inputs thereto is NOR circuit 33V00. The remaining inverters, i.e., 32V00 and 34V00 each have at least one input having a "1" signal thereon. The output from NOR circuit 33V00 passes to the input active flip-flop for channel 3 to set it to its "1" state thereby rendering this channel active.

While FIGS. 22*a* through 22*c* illustrate the interconnections from the translator flip-flops to the inverters for only three channels, it should be understood that in the actual embodiment of the invention nine additional inverters (XXV00) are provided so that the various possible code combinations obtainable from the selective setting of the 4 flip-flops can uniquely select one channel out of 12. It is felt to be within the realm of ordinary skill in the art for one to visualize how the other nine NOR circuits may be interconnected with the flip-flops to provide the desired translation.

In addition to the translation of the *j** designator of the instruction word, the translator also operates on the channel address generated in the priority network during a buffer transfer. As illustrated, in FIG. 22*a* the inverter 10V30 receives "1" signals from the *e*-designator timing chain and from the supplementary timing chain. The manner in which these "1" signals are developed has already been described. The resulting "0" signal appearing on the output conductor 1076 from the NOR circuit 10V30 is applied to a first input terminal of the NOR circuits 11V30 and 1078. At the time $\phi 1$ following the generation of the command enable on one of the input lines to 10V30, the inverters 11V30 and 1078 become fully enabled, emitting "1" signals on the respective output conductors 1080 and 1082. The signal on conductor 1080 first passes through the OR circuit 1014 to clear the V30 flip-flop. Secondly it passes over the bus 1084 and through the OR circuits 1018, 1020 and 1022 to clear out the other three translator flip-flops. The "1" signal on conductor 1082 also passes along conductor 1086 so that both the Input mode flip-flop V34 and the Output mode flip-flop V36 are cleared.

After having been cleared by a command from the input-output control circuits, the translator flip-flops can now be loaded with the channel address provided by the priority network. The data input to the inverters 13V30 through 13V33 is from the inverters 15V00 through 15V03 of the priority network. It may be recalled that the outputs from these last mentioned inverters define a specific channel on which an input or an output operation is taking place. The outputs from the 15V00 through 15V03 circuits enable or disable the 13V30 through 13V33 circuits according to the channel specified. At the phase 2 time following the generation of the command enable TRANSFER CHANNEL ADDRESS TO TRANSLATOR, the inverters 13V30 through 13V33 output signals which pass through the OR circuits 1028 through 1034 to set one or more of the flip-flops V30 through V33. The manner in which the translation takes place has already been described in connection with the *j** designator and it is felt to be unnecessary to again trace the manner in which one specific channel is uniquely selected. The legend appearing at the top of FIG. 22*b* indicates the destination for the output signals from the translator.

The mode flip-flops V34 and V36 (FIG. 22*c*) indicate, when set, that an Input or an Output Request is being processed by the Input-Ouput section. The manner in which these flip-flops are initially cleared has been previously explained. When the command enable is generated by the *e*-designator timing chain or the supplementary timing chain to load the translator, it is also utilized as an enable to set one of the mode flip-flops. The other enable to the NOR circuits 1088 and 1090 is from the sub-priority network (FIGS. 20*a* and 20*b*). The particular flip-flop to be set is dependent up on the type of request currently being processed by sub-priority. If it is an Output Request, NOR circuit 1090 will be fully enabled and the Output mode flip-flop V36 will be set. If it is an Input Request, NOR circuit 1088 becomes fully enabled causing the Input mode flip-flop V34 to be set. The output signals from the mode flip-flops are all utilized by the input-output control circuits illustrated in FIGS. 12*a*–12*p* in a manner already described.

Another source of address signals for the translator is the interrupt address storage register. Because this register is similar to the other registers explained herein, it is felt to be unnecessary to describe it in detail. As was mentioned in the introductory portion of the specification, the interrupt address storage register is loaded with the special address generated in the priority network and it is held therein for use during a subsequent A-sequence. It is during the A-sequence that a command enable is applied to the conductor 1092 in the translator to fully enable selected ones of the NOR circuits 17V30 through 17V33. Whether or not one of these NOR circuits is enabled depends on the type of signal (logical "1" or "0") coming from the interrupt address storage register. A "1" signal is emitted from the NOR circuits having all "0" signals applied thereto, and it passes through the OR circuit 1028 through 1034 to set the translator flip-flops. The output signals from these flip-flops are connected to the set of NOR circuits 32V00 through 34V00 so that the translation results in a signal being developed on their output lines, corresponding to the channel number generated in the priority network. In the case of an External Interrupt, the designation is for a channel on which the honored interrupt request has occurred. Since the outputs from the interrupt storage address register flip-flops depend initially upon the inputs from the inverters 15VXX circuits in priority, the translator flip-flops V30 through V33 are set according to the channel on which the interrupt has occurred.

As indicated by the legend at the top of FIG. 22*b*, the signal coming from the translator when an External Interrupt request is being processed passes to the external interrupt one-shot circuit on the designated channel and is one of the enables required to clear the one-shot in anticipation of another External Interrupt Request which might follow on the same channel. The signal also passes to the data input amplifiers for the selected channel and is employed as an enabling signal to permit the transfer of the 30 bit interrupt code to the Z-register for subsequent storage in the memory. It may be recalled that this 30 bit word generally identifies the type of fault which caused the generation of the External Interrupt control signal.

ACTIVE FLIP-FLOP—FIG. 23

Each of the 12 input and output channels has an active flip-flop associated with it. Any time this flip-flop is set, the channel is active or capable of handling input or output data. When the flip-flop is in a cleared condition, the channel is inactive and not capable of handling data.

As was mentioned, the control of initially setting a channel active belongs to the main computer program. It may be recalled that during the execution of an Input Buffer Instruction or an Output Buffer Instruction in the A-sequence, the *j designator is transmitted to the translator to designate the channel which is to be set active. During the D-sequence a command enable is generated to set the channel active and this signal is applied by way of a conductor 1094 to a NOR circuit 1096. This signal is ANDED along with the enabling signal from the translator and phase 1 signal from the clocking circuits, to fully enable the NOR circuit 1098**. This last mentioned circuit outputs a "1" signal to set the active flip-flop to its "1" state. The resulting "0" signal appearing at the output of the "1" side of the active flip-flop is applied to the input or output request gate for the selected channel.

Once set, the channel remains active until the initial and terminal addresses of the index word are equal. It should be recalled that during the DISABLE $I/O_1$ sequence if the contents of the lower half of the Z-register is equal to that of the upper half, NOR circuits 93N51 or 89N51 becomes enabled. The resulting command enable to clear the active flip-flop is applied to the conductor 1100 and is inverted by the NOR circuit 1102. The resultin "0" signal is applied to a first terminal of the NOR circuit 1104. The translator at this time holds the channel number of the designated channel. At the following $\phi 1$ time, therefore, NOR circuit 1104 outputs a "1" signal which passes through the OR gate 1106 to clear the active flip-flop.

EXTERNAL FUNCTION AND OUTPUT ACKNOWLEDGE CIRCUITS—FIG. 24

When an output buffer transfer has been completed so that the data signals are contained in the $C_O$ register, the computer follows later by sending a control signal to the peripheral device on the selected channel. In the case of a normal output buffer the Output Acknowledge signal informs the peripheral unit that the data is available. In the case of an External Function, the control signal informs the peripheral unit to sample the data line.

In FIG. 24 there is shown a flip-flop O83 which is the means employed to determine whether it will be an Output Acknowledge signal or an External Function signal which will be sent out on the selected channel. The command enable SEND OUTPUT ACKNOWLEDGE from inverter 91N54 passes through and is inverted by the NOR circuit 13O38 at $\phi 4$ time to set the O83 flip-flop. When this flip-flop is set a "1" signal appears at the junction 1108. This "1" signal is conveyed by way of the conductor 1110 to the input of an inverter 18O62. The resulting "0" output signal on the conductor 1112 provides one of the enables required for the output acknowledge amplifiers 30Y02, 30Y03, etc. The logical "1" signal appearing at the junction 1108 passes through NOR circuit 03O83 so that a "0" signal is applied by way of the conductor 1114 to the input terminal of inverter 20O62. The "1" signal appearing on the output conductor 1116 from this inverter is effective to disable the external function amplifiers 41Y02, 41Y03, etc.

When the computer is in an output mode and has set the data line, the translator holds the designated channel number. The "0" ouput from the translator is one of the enables required by the 13OXX inverters to set its associated flip-flop. For example, if channel 2 is the selected channel, NOR circuit 32V02 located in the translator is outputting a "0" signal which is applied by way of the conductor 1118 to a first input terminal of NOR circuit 13O62. At the time in the *e*-designator timing chain when the inverter 94N54 is fully enabled, the command enable SEND OUTPUT ACKNOWLEDGE is applied to the conductor 1120. This signal is inverted by NOR circuit 12O62 so that a "0" signal is applied by way of conductor 1122 to a second input terminal of the NOR circuit 13O62 and others similarly disposed. At the following $\phi 4$ time the NOR circuit 13062 will be fully enabled and will output a "1" signal on its conductor 1124 to set the O62 flip-flop. None of the other flip-flops can be fully enabled at this time because only one channel may be selected at a time by the translator. With the flip-flop O62 set a "0" signal is developed on its output conductor 1126 which fully enables the output acknowledge amplifier 30Y02. If the ouput buffer had been performed on channel 3 it would have been inverter 13O63 which would have been fully enabled so that the OUTPUT ACKNOWLEDGE signal would be sent from the amplifier 30Y03.

In the case of an External Function signal, when the computer executes the External Function Instruction, a signal is developed in the A-sequence timing chain (not shown) which passes to the "0" input terminal of flip-flop O83 by way of the conductor 1128. A "0" signal appears at junction 1108 when the O83 flip-flop is cleared. This signal passes by way of conductor 1110 and through inverter 18O62 to produce a "1" signal on conductor 1112, disabling the output acknowledge amplifier. The "0" signal which appears at junction 1108 is inverted by NOR circuit 03O83 and again inverted by NOR circuit 20O62 so that a "0" signal appears on the conductor 1116. The external function amplifiers 41Y02, 41Y03, etc. are therefore partially enabled. The A-sequence timing chain also outputs a "1" signal on the conductor 1130 during the execution of an External Function Instruction. Inverter 12O62 therefore outputs a "0" signal on its conductor 1122 to partially enable the NOR circuits 13O62, 13O63, etc. It may be recalled that during the execution of the External Function Instruction, the $j^*$ portion of the instruction word is loaded into the translator flip-flops so that control signals are developed on only those lines associated with the selected channel. One of the lines coming from the translator is connected to an input of the inverters 13OXX. Therefore, at phase 4 time only the inverter receiving a signal from the translator will be fully enabled to set its associated flip-flops. For example, if the $j^*$ designator is 0011 (decimal 3) the translator will output a "0" signal to the conductor 1132 connected to the 13O63 inverter on channel 3. With the O63 flip-flop set only external function amplifier 41Y03 will be fully enabled to output the External Function signal to the peripheral unit on channel 3.

The Output Acknowledge signal remains on the line until it is cleared by the next data transfer sequence. It may be recalled that when the Input-Output section is operating either in the INTERNALLY or EXTERNALLY SPECIFIED INDEX mode during the DISABLE $I/O_1$ sequence, the NOR circuit 91N51 (FIG. 12*e*) becomes fully enabled thereby producing a command enable CLEAR OUTPUT ACKNOWLEDGE. This signal is applied by way of the conductor 1134 connected to one input of NOR circuit 10O62. This circuit inverts the "1" signal causing a "0" signal to be applied to an input of inverter 11O62. At the following $\phi 1$ time circuit 11O62 is fully enabled and outputs a "1" signal on conductor 1136 to clear the output acknowledge and external function flip-flops. When operating in the EXTERNALLY SPECIFIED ADDRESS mode, NOR circuit 15L73 in the supplementary timing chain outputs the command enable CLEAR OUTPUT ACKNOWLEDGE to the NOR circuit 11O62 by way of conductor 1138. During the execution of an external function instruction the B-sequence timing chain outputs a signal to clear the external function flip-flops. The signal from the B-sequence is applied to NOR circuit 10O62 by way of conductor 1140.

INPUT ACKNOWLEDGE CIRCUITS—FIG. 25

The Input Acknowledge signal is the means employed by the computer to inform the peripheral unit on the selected channel that the computer stored the data and that it is now capable of accepting another word. FIG. 25 illustrates a typical input acknowledge circuit for a single channel. It may be recalled that at the time during the DISABLE $I/O_1$ sequence when the T88 flip-flop is set, the inverter 86N51 becomes fully enabled and generates the command enable CLEAR INPUT ACKNOWLEDGE flip-flops. This signal is applied to the NOR circuit 10I60 so that a "0" signal appears on its output conductor 1142 to partially enable NOR circuit 11I60. At the next following phase 4 time 11I60 is fully enabled generating a "1" signal which clears the input acknowledge flip-flop. The flip-flop was originally set on the preceding input buffer transfer.

When the computer is in an input mode and has sampled the data lines, the translator has already been loaded with the designated channel number. The "0" output from the translator is one of the enables required by the 13I60 circuit. The command enable SEND INPUT ACKNOWLEDGE is generated by the *e*-sequence timing chain during the DISABLE $I/O_2$ sequence when the output from NOR circuit 97N51 is a "1" signal. The NOR circuit 12I60 of FIG. 25 inverts this signal causing a "0" signal to be applied to a second input terminal of NOR circuit 13I60. At the following $\phi 1$ time, this last mentioned inverter becomes fully enabled, setting the input acknowledge flip-flop on the channel specified by the translator. With the flip-flop set, the input to the control line driver or amplifier 10Y00 is a "0" signal. The Input Acknowledge signal is now on the control line running to the peripheral unit and will remain there until the next input transfer.

SIMPLIFIED Z-REGISTER AND BUFFER COMPARATOR STAGES

The memory communications register or Z-register is comprised of a set of 30 bistable stages and functions as a portal between the memory and other parts of the computer. FIG. 26 illustrates the hardware required for implementing only two stages of the Z-register. Because the remaining stages of the Z-register are substantially identical to those shown, they have been omitted from the drawing for the sake of simplicity. The reason for illustrating stages Z09 and Z24 is that they occupy the same relative bit positions in the lower half and the upper half of the Z-register, respectively. As will be described subsequently, the buffer comparator compares the output from the corresponding stages of $Z_L$ and $Z_U$ and when equality is detected a signal is generated to terminate the buffer transfer on the selected channel. To further simplify the drawing of FIG. 26, only the inputs and outputs from the Z-register which are utilized by the Input-Output section of the computer are illustrated.

The stages of the Z-register are capable of being cleared by signals coming from the memory timing chain, thus preparing them for later reception of data from the memory or from the other registers of the computer. The stages of $Z_L$ are cleared by a command enable from the supplementary timing chain so that address representing signals can be transferred thereto when the Input-Output section is operating in the EXTERNALLY SPECIFIED INDEX or ADDRESS MODE.

FIG. 27 illustrates a typical gated amplifier for supplying data signals to one stage of the Z-register. Similar equipment is provided for each stage of the Z-register. It may be seen that the translator provides the gating signals required by the data input gated amplifiers. Hence, the data signals coming from a piece of external equipment can be applied to the Z-register by way of only one channel at a time.

The data bits are gated into the Z-register by means of the command enables TRANSFER DATA TO $Z_U$ and TRANSFER DATA TO $Z_L$ which come from NOR circuits 98N21 and 92N21 of the I/O control circuits, respectively. These command enable signals are applied to the conductors 1144 and 1146 of the Z-register. The inverters 14Z20 and 14Z05 invert these command enable signals causing "0" signals to appear on the conductors 1148 and 1150. Provided that the data signal coming from the peripheral device on the selected channel in the 9th bit position is a "1" signal so that the output from the NOR circut 1152 (FIG. 27) is a "0" signal, NOR circuit 15Z09 will be fully enabled at time $\phi 1$, outputting a "1" signal to set the 9th stage of the Z-register. If the data bit from the peripheral device had been a "0" signal, NOR circuit 1152 would have been fully enabled and hence a "1" signal would have been applied to the input terminal of NOR circuit 15Z09. This signal would disable this last mentioned inverter and stage Z09 would have remained cleared. Data bits are loaded into the other stages of the Z-register in substantially the same manner.

As has already been described, the Z-register provides an output to various registers in the computer. These registers include the $C_O$-register which is the interface between the computer and the peripheral equipment during an output buffer transfer operation. Also, the Z-register feeds signals to the storage address register (S-register) so that index words extracted from memory or the externally provided address signals may be used to read and/or write data signals from or into the memory. Since only the lower 15 stages of the Z-register ever contain address representing signals, these are the only stages which provide an output to the S-register. The Z-register also provides a connection to the incrementing circuits so that the index words can be incremented by one before being replaced in their buffer control register in the memory. The details of this incrementing circuitry will be described later on in the specification. Finally, each stage of the Z-register provides outputs to the buffer comparator.

FIG. 26 illustrates the circuitry required for comparing the contents of corresponding stages in the lower and upper half of the Z-register. Assuming first that the content of stage 9 is equal to that of stage 24 (say both logical "0"'s), the signals applied to the input terminals 1154 and 1156 of NOR circuit 30Z09 will be "0" and "1," respectively. Under the assumed condition the signals applied to input terminals 1158 and 1160 of NOR circuit 32Z09 will be a "0" and a "1," respectively. Therefore, both inverters 30Z09 and 32Z09 will be outputting "0" siganls to NOR circuit 33Z09 causing a "1" signal to appear on its output conductor 1162. Inverter 33Z04 connected to the output of inverter 33Z01 will therefore output a "0" signal to the input terminal of inverter 33Z06. Provided that the output from the other stages of the comparator are also logical "0" signals, indicating an equality between corresponding bits in the upper and lower half of the Z-register, NOR circuit 33Z06 will be fully enabled and will output a "1" signal on the conductor 1164. Inverter 33Z07 converts this "1" signal to a logical "0" so that when equality is detected between all stages, a "0" signal will be supplied to the inverters 89N31 and 93N31 in the input-output control circuits. It may be recalled that when the input to these last mentioned NOR circuits from the buffer comparator are "0" signals, a command enable is generated to clear the active flip-flop on the selected channel involved. By tracing the signal flow through the comparator stages illustrated when it is assumed that stages 9 and 24 of the Z-register both contain "1" signals, it will be seen that NOR circuit 33Z04 will still be outputting a "0" signal.

Now if it is assumed that the contents of corresponding stages in $Z_U$ and $Z_L$ are different (say Z24=1 and Z09=0), the output from NOR circuit 33Z04 will be a "1" signal serving to disable NOR circuit 33Z06. More specifically, the signals appearing on the input terminals 1154 through 1160 will be 1, 1, 0 and 0 respectively. It can be seen that under the assumed conditions NOR circuit 32Z09 will be fully enabled and will output a "1" signal to the input of NOR circuit 33Z01. The signal appearing on conductor 1162 will now be a "0" and hence the output from NOR circuit 33Z04 will be a logical "1" signal. This signal disables the NOR circuit 33Z06 so that a logical "1" signal is generated in the output of NOR circuit 33Z07. This "1" signal when applied to the appropriate inverters in the input-output control section prevents the generation of the command enable signals employed to clear the active flip-flops. Therefore, only when the contents of the lower half of the Z-register are equal to the contents of the upper half will the active flip-flops be cleared.

Z-REGISTER INCREMENTING CIRCUITS—FIG. 28

It may be recalled that when the Input-Output section of the computer is operating in either the INTERNALLY or EXTERNALLY SPECIFIED INDEX mode, each time that a data transfer takes place the index word associated with the particular channel involved is read out from the memory to the memory communications register (Z-register). After the index word is transmitted to the S-register, it is incremented and restored back into the memory at the address from which it was originally obtained. FIG. 28 illustrates by means of a logical block diagram the apparatus required for incrementing the contents of the Z-register as these contents are replaced in the memory. While for the sake of simplicity only the hardware required for 3 stages of the Z-register is illustrated, it should be understood that identical circuits are provided for each stage thereof. The output signals from the inverters 28Z– – are applied to the memory inhibit generators (not shown). When a "1" signal appears on one or more of the lines 1164, 1166 or 1168, a "1" signal is prevented from being written into the memory from this particular bit location in the Z-register. In order to output a "1" signal on the lines 1164 through 1168, it is a requirement first that at least one of the inputs to the NOR circuits 38Z– – be a "1" signal, and secondly that a "0" signal appear on the inhibit bit enable line 1770. When both of the inputs to the 38Z– – inverters are "0" signals they become fully enabled and permit the writing of a "1" signal into the memory.

Considering for a moment the inputs to the inverters 25Z01 and 26Z01, it can be seen that in order to produce "1" signals on their respective output conductors 1172 and 1174, the inputs to these inverters must all be logical "0" signals. A first input to NOR circuit 26Z01 comes from an inverter connected to the "1" side of the Z-register stage involved. More specifically, the inverter 26Z01 in FIG. 28 is supplied with an input signal from the NOR circuit 02Z01 which is an inverter connected to the output from the "1" side of the second stage (Z01) of the Z-register. The second input to inverter 26Z01 is applied by way of conductor 1176. This conductor is the means employed for propagating a carry signal from a lower order stage of the incrementing circuits. A "1" signal appears on the conductor 1174 only when the second stage of the Z-register is cleared and when no carry signal is being propagated from the lower order stage.

The inverter 25Z01 has 3 input connections, all of which have to be at the "0" level in order to output a "1" signal on conductor 1172. In order for the signal appearing on conductor 1178 to be a "0," it is necessary that the INCREMENT $Z_L$ control flip-flop be set. When this flip-flop is set by the command enable INCREMENT $Z_L$ coming from inverter 94N21 in the input-output control circuits, the inverter 03G10 connected to the "0" side of the control flip-flop will be outputting a "0" signal on its conductor 1180. This signal passes along the bus 1182 to which the conductor 1178 is connected. A second input to NOR circuit 25Z01 comes from the inverter 05Z01 which is connected to the "1" side of the second stage of the Z-register. Only when the second stage is cleared will the signal appearing at the output of NOR circuit 05Z01 be a logical "0." The final input to NOR circuit 25Z01 comes from the inverter 03Z00. This inverter is connected to the "1" side of the first stage of the Z-register. When the first stage of the Z-register is in its cleared condition, inverter 03Z00 is outputting a "0" signal. In general then, to fully enable the 25Z– – inverter, associated with a particular Z-register stage, it is necessary that the INCREMENT $Z_L$ control flip-flop be set, that the corresponding stage of the Z-register in question be cleared, and that all lower order stages of the Z-register also be cleared. Only when these conditions are satisfied will a "0" signal appear on the conductor 1172.

As an aid in the understanding of the operation of the incrementing circuit, an example of its operation will now be given. Assuming that the first, second and third stages of the Z-register contain the bits 1, 1, and 0 respectively (decimal 3) and further assuming that the INCREMENT $Z_L$ control flip-flop is set, NOR circuits 25Z00 and 25Z01 will be fully enabled while inverters 26Z00, 26Z01, 25Z02, and 26Z02 will be disabled. Logical "1" signals therefore appear on the conductors 1184 and 1172 while "0" signals appear on the conductors 1186, 1174, 1188, and 1190. The only one of the 38Z– – inverters to be fully enabled is 38Z02. Provided that the inhibit enable line 1170 is maintained at the logical "0" level, conductors 1164 and 1166 will have "1" signals thereon while conductor 1168 carries a "0" signal. Since the presence of a "1" signal on the conductors 1164 through 1168 prevents a "1" signal from being written into the memory, the code group which will be restored is 001 (decimal 4). It can be seen that this number is one greater than the number which was originally assumed to be in the Z-register.

If, in the above example, the INCREMENT $Z_L$ control flip-flop had remained cleared, the data appearing on conductors 1164 through 1168 would have been 001 so that the data word 110 binary 3 would have been restored into the memory. In other words, the data from the Z-register is written into the memory unaltered.

This completes the description of the unconventional circuits employed in the Input-Output section of the computer. The remaining circuits illustrated in FIGS. 4*a* through 4*c* which have not been described in detail are felt to be well known in the art so that a detailed description of them and their operation is unnecessary.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a communication system for transferring information between data handling devices at remote sites and digital data processing equipment at a central site, the combination comprising: a plurality of data handling devices; a digital computer comprising means for storing digital signals, certain of said signals representing data and others representing index words, register means associated with said storage means, and a plurality of communication channels adapted to convey data, address representing signals and control signals between said computer and said plurality of data handling devices; priority determining means in said computer for recognizing said control signals from said channels, so that said data and address representing signals can be transmitted only on the particular channel having the higher priority at a given time; means responsive to the output of said priority determining means for transferring said address representing signals from the device on said particular channel to said register means; memory selection means responsive to the presence of said address representing signals in said register means for extracting the index word from the location in said storage means specified by said address signals; and means including said memory selection means for subsequently storing said data signals at the location specified by said index word.

2. In a communication system for transferring information between data handling equipment at remote sites and digital data processing equipment at a central site, the combination comprising: a digital computer including memory means for storing signals representing both information and data control words; at least one input and output communication channel, containing a plurality of lines electrically intermediate remotely located data handling devices and said computer; means for applying signals representing data being transmitted to a first set of said plurality of lines in said channel and for simultaneously applying signals representing the address in said memory means of said data control word for said channel to other lines in said channel; and means in said computer for conveying said signals to said memory means so that said data signals are stored in said memory means at a location specified by the data control word located at said address.

3. A digital data processing system comprising: at least one data handling device; a digital computer including means for storing signals representing both information and data control words, and register means associated with said storage means; a cable containing a plurality of lines including at least one control line for connecting said data handling device to said computer; means for simultaneously applying signals representing data to be transferred to a first set of said plurality of lines in said cables and for applying signals representing the address in said storage means of said data control words to the other lines in said cables; gating means connected intermediate to said lines in said cables and said register means for transferring said data signals and said address signals from said device to predetermined stages of said register means upon receipt of control signals on said control line; means responsive to the presence of said address signal in said register means for extracting said data control words from said storage means; and means for storing said data signals in said storage means at the location specified by the extracted data control word.

4. In a data processing system, the combination comprising: a plurality of data handling devices; a digital data processing machine having means for storing signals representing both information and data control words, first and second register means each comprised of a plurality of interconnected bistable stages associated with said storage means, gating means, and means connecting the output of said gating means to said first register means; means connecting said plurality of data handling devices to an input of said gating means for applying data signals and signals representing addresses to said gating means; means for first permitting selected ones of said gating means to pass only said address representing signals to corresponding stages of said first register means; means including control means for transmitting said address representing signals to said second register means; means responsive to the presence of said address representing signals in said second register means for extracting a data control word from the storage location specified by said address and placing it in said first register means; means for incrementing said data control word and replacing it in said storage means at said address; and means for subsequently enabling the remaining gating means to pass said data signals to said first register means so that they can be stored in said storage means at the location specified by said data control word.

5. In an input-output section of a digital computer, the combination comprising: a digital computer comprising means for storing signals representing both data and data index words, register means associated with said storage means, a plurality of input and output channels adapted to convey both information and control signals to or from said computer; means for applying signals representing addresses and a request control signal to said channels; priority determining means in said computer for recognizing said request signals from said channels such that said address representing signals can be sent from only the particular channel having the higher priority at a given time; gating means connected into said channels and responsive to the output of said priority determining means for first transferring said address representing signals from said particular channel to said register means, means connected to said register means for extracting the data control word from the location in said storage means specified by said address signals and means including further gating means connected between said channels and said register means for subsequently controlling the transmission of said data signals from or to the location in said storage means specified by said data control word.

6. In a communications system for transferring information between data handling equipment at remote sites and digital data processing equipment at a central site, the combination comprising: a digital computer including storage means for storing signals representing data and signals representing index words; register means associated with said storage means; a plurality of data handling devices including means for presenting request control signals to said computer for requesting said computer to transmit signals representing data to a particular one of said plurality of devices; means for selectively conveying signals representing the address in said storage means of a particular index word from the particular device requesting transmission to said register means; memory location selection means responsive to the presence of said address representing signals in said register means for extracting said particular index word from said storage means; control means; means including said memory location selection means responsive to said control means for subsequently extracting data representing signals located at the address in said storage means specified by said index word and placing them in said register means; and means for transmitting said data representing signals from said register means to said particular one of said devices.

7. In an input-output section for a digital computer the combination comprising: a digital computer including storage means for storing signals representing data and signals representing index words; a plurality of registers associated with said storage means, and gating means; a plurality of data handling devices adapted to assume communication with said computer each having means for requesting said computer to transmit data signals to it; means including said gating means for selectively conveying signals representing the address in said storage means of a particular index word unique to a particular device requesting transmission to a first of said plurality of registers; memory location selection means including a second of said plurality of registers responsive to the presence of said address representing signals in said first register for reading out said particular index word from said storage means into said first register; means including said memory location selection means therefor for subsequently extracting data representing signals located at the address in said storage means specified by said index word contained in said first register and placing them in said first register means; means for transmitting said data representing signals from said first register to a third of said plurality of registers; and means for supplying a signal from said computer to said particular one of said devices to permit the transfer of the signals contained in said third reigster to said device.

8. In a communication system for transferring information between data handling equipment at remote sites and digital data processing equipment at a central site, the combination comprising: at least one data handling device; a digital computer including memory means for storing information represented by binary signals and register means; means for conveying the signals representing information along with signals representing addresses of locations in said memory from said data handling device to said computer; means for first selectively gating said address representing signals from said device to said register means; and means responsive to the presence of said address representing signals in said register means for writing said information representing signals into the location in said memory specified by said address representing signals.

9. An input-output section for a digital data processor comprising: a plurality of data handling devices; a digital computer including memory means for storing information represented by electrical signals, gating means, and register means; means for conveying said signals representing information and signals representing addresses of locations in said memory in parallel fashion from said plurality of peripheral devices to said computer; means including said gating means for first selectively gating said address representing signals from only one of said plurality of devices to said register means; and means responsive to the presence of said address representing signals in said register means for subsequently gating the information signals from said one device into the location in the memory specified by said address signals.

10. In a digital data processor the combination comprising: a plurality of data handling devices; a digital computer including magnetic core memory means for storing signals representing data, register means associated with said memory means, and priority determining means; a plurality of communication channels adapted to convey address representing signals, said data representing signals, and control signals between said computer and said data handling devices connected thereto; means including said priority determining means responsive to said control signals for first selectively gating said address representing signals from the particular one of said channels having the highest priority at a particular time to said register means; and means responsive to the presence of said address representing signals in said register for subsequently gating said signals representing data from said particular one of said channels to the location in said memory means specified by said address representing signals.

11. A digital data processing system comprising: a digital computer including memory means for storing information represented by electrical signals, gating means, and register means; a plurality of data handling devices; means for conveying signals representing addresses of locations in said memory from said plurality of data handling devices to said computer; means including said gating means for first selectively gating the address representing signals from only one of said plurality of devices to said register means; means responsive to the presence of said address signals in said register means for subsequently placing the contents of the memory at the address specified by said address signals in said register means; and means for transmitting said memory contents to said one of said plurality of devices.

12. In a digital computer, the combination comprising: memory means for storing coded information; first register means comprised of a plurality of bistable stages arranged to communicate with said memory means; second register means connected to selected stages of said first register means; a plurality of communications channels each containing a plurality of data signal lines and control lines for conveying data signals and control signals from and to data handling devices connected to said channels; gating means disposed between said data lines and said first register means; priority determining means responsive to signals on said control lines for determining which one of several modes of operation is to be permitted at a particular time and for determining the particular channel over which data is to be transmitted; means connecting said priority determining means to said gating means for enabling the transmission of data on selected lines of said particular channel to said first register means; means for governing the transmission of said data from selected stages of said first register to said second register means and for initiating the operation of said memory means, the arrangement being such that the contents of the memory register at the address specified by the signals in said second register means are transmitted to said first register means; an output register; control means for enabling the transmission of the contents of said first register means to said output register; and means for impressing a signal on a control line on said particular channel for advising the data handling device connected thereto that data is available to it in said output register.

13. In a digital data processing system, the combination comprising: a plurality of data handling devices; a digital computer including memory means for storing information represented by electrical signals, priority determining means responsive to request signals from one or more of said data handling devices for selecting only one of said devices at a time for communication with said computer, gating means and register means; means for transmitting said signals representing information and signals representing addresses of locations in said memory from said plurality of peripheral devices to said computer; means connecting said priority determining means and said register means to said gating means for selectively gating said address representing signals from the selected one of said plurality of data handling devices to said register means; and memory location selection means connected to said register and adapted to receive said address representing signals from said register means for selecting a particular memory location from which said information is to be obtained or into which said information is to be entered.

References Cited by the Examiner

UNITED STATES PATENTS

| | | | |
|---|---|---|---|
| 2,968,027 | 1/1961 | McDonnell et al. | 340—172.5 |
| 3,029,414 | 4/1962 | Schrimpf | 340—172.5 |
| 3,061,192 | 10/1962 | Terzian | 235—157 |
| 3,063,036 | 11/1962 | Reach et al. | 340—172.5 |
| 3,079,082 | 2/1963 | Scholten et al. | 235—157 |

FOREIGN PATENTS

| | | |
|---|---|---|
| 875,695 | 8/1961 | Great Britain. |

R. C. BAILEY, *Primary Examiner.*

MALCOLM A. MORRISON, *Examiner.*

P. J. HENON, *Assistant Examiner.*